United States Patent
Gurries et al.

(10) Patent No.: US 9,912,181 B2
(45) Date of Patent: *Mar. 6, 2018

(54) ADAPTIVE CHARGING TECHNIQUE AND CIRCUITRY FOR A BATTERY/CELL USING MULTIPLE CHARGE CIRCUITS AND TEMPERATURE DATA

(71) Applicant: Qnovo Inc., Newark, CA (US)

(72) Inventors: Mark Gurries, San Jose, CA (US); Fred Berkowitz, Los Gatos, CA (US); Nadim Maluf, Los Altos, CA (US); David Bruce Koons, Los Gatos, CA (US); Miroslav Zmrzli, San Francisco, CA (US)

(73) Assignee: Qnovo Inc., Newark, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 14/557,504

(22) Filed: Dec. 2, 2014

(65) Prior Publication Data

US 2015/0137741 A1 May 21, 2015

Related U.S. Application Data

(63) Continuation of application No. 14/075,667, filed on Nov. 8, 2013, now Pat. No. 8,907,631.

(Continued)

(51) Int. Cl.
*H02J 7/00* (2006.01)
*G01K 13/00* (2006.01)

(52) U.S. Cl.
CPC ............ *H02J 7/0052* (2013.01); *G01K 13/00* (2013.01); *H02J 7/0073* (2013.01); *H02J 7/0077* (2013.01); *H02J 7/0091* (2013.01); *Y10T 307/50* (2015.04)

(58) Field of Classification Search
CPC ........ H02J 7/091; H02J 7/0091; H02J 7/0052; H02J 7/0077; Y10T 307/50

(Continued)

(56) References Cited

U.S. PATENT DOCUMENTS 6,094,033 A 7/2000 Ding et al.
6,841,974 B2 1/2005 Dykeman (Continued)

FOREIGN PATENT DOCUMENTS

CN 1744373 A 3/2006
CN 2779703 Y 5/2006

(Continued)

OTHER PUBLICATIONS

U.S. Notice of Allowance dated Aug. 14, 2014 in U.S. Appl. No. 14/075,667.

(Continued)

*Primary Examiner* — Nathaniel Pelton
*Assistant Examiner* — Johali Torres Ruiz
(74) *Attorney, Agent, or Firm* — Weaver Austin Villeneuve & Sampson LLP

(57) ABSTRACT

A system to recharge a battery including a first current-voltage source to generate a first signal, a second current-voltage source to generate a second signal, a first inductor-capacitor circuit to generate the first DC current-voltage signal using the first signal, a second inductor-capacitor circuit to generate the second DC current-voltage signal using the second signal, wherein the first and second inductor-capacitor circuits are spaced apart by a predetermined distance. The system also includes a temperature sensor adapted to generate temperature data during the charging operation, and control circuitry configured to: (i) determine whether the first temperature data is out-of-specification, and (ii) generate one or more control signals to adjust the (Continued)

first and second DC current-voltage signals, in response to the first temperature data being out-of-specification.

23 Claims, 49 Drawing Sheets

Related U.S. Application Data

(60) Provisional application No. 61/860,382, filed on Jul. 31, 2013.

(58) Field of Classification Search
USPC ....... 320/107, 138, 141, 150; 307/71, 80, 43
See application file for complete search history.

(56) References Cited

U.S. PATENT DOCUMENTS

| | | |
|---|---|---|
| 7,106,027 B2 | 9/2006 | Sakakibara |
| 7,135,836 B2 | 11/2006 | Kutkut et al. |
| 7,227,336 B1 | 6/2007 | Van Schalkwijk et al. |
| 7,477,041 B2 | 1/2009 | Le Gall et al. |
| 7,737,665 B2 | 6/2010 | Grewe et al. |
| 8,907,631 B1 | 12/2014 | Gurries et al. |
| 2004/0189251 A1 | 9/2004 | Kutkut et al. |
| 2006/0043928 A1 | 3/2006 | Nakosho et al. |
| 2006/0125449 A1 | 6/2006 | Unger |
| 2007/0046250 A1 | 3/2007 | Freiman et al. |
| 2007/0241732 A1 | 10/2007 | Luo et al. |
| 2008/0079398 A1 | 4/2008 | Li |
| 2010/0156355 A1 | 6/2010 | Bauerle et al. |
| 2012/0019214 A1* | 1/2012 | Hussain ......... H01L 31/035227 320/138 |
| 2012/0068668 A1 | 3/2012 | Kittell |
| 2012/0194141 A1 | 8/2012 | Shi et al. |

FOREIGN PATENT DOCUMENTS

| | | |
|---|---|---|
| CN | 101055987 A | 10/2007 |
| CN | 102130476 A | 7/2011 |
| CN | 202094665 U | 12/2011 |
| CN | 103036292 A | 4/2013 |
| JP | 2005051930 A | 2/2005 |
| JP | 2008005645 A | 1/2008 |
| JP | 4191209 B2 | 12/2008 |

OTHER PUBLICATIONS

U.S. Corrected Notice of Allowability dated Oct. 31, 2014 in U.S. Appl. No. 14/075,667.

CN Office Action dated Aug. 18, 2017 in CN Application No. 201410367066.4.

EP Search Report dated May 4, 2015 in EP Application No. 14177038.8.

Zhou, Z. et al., "High-frequency switch power source design and application examples," Dec. 31, 2008, pp. 309-310.

* cited by examiner

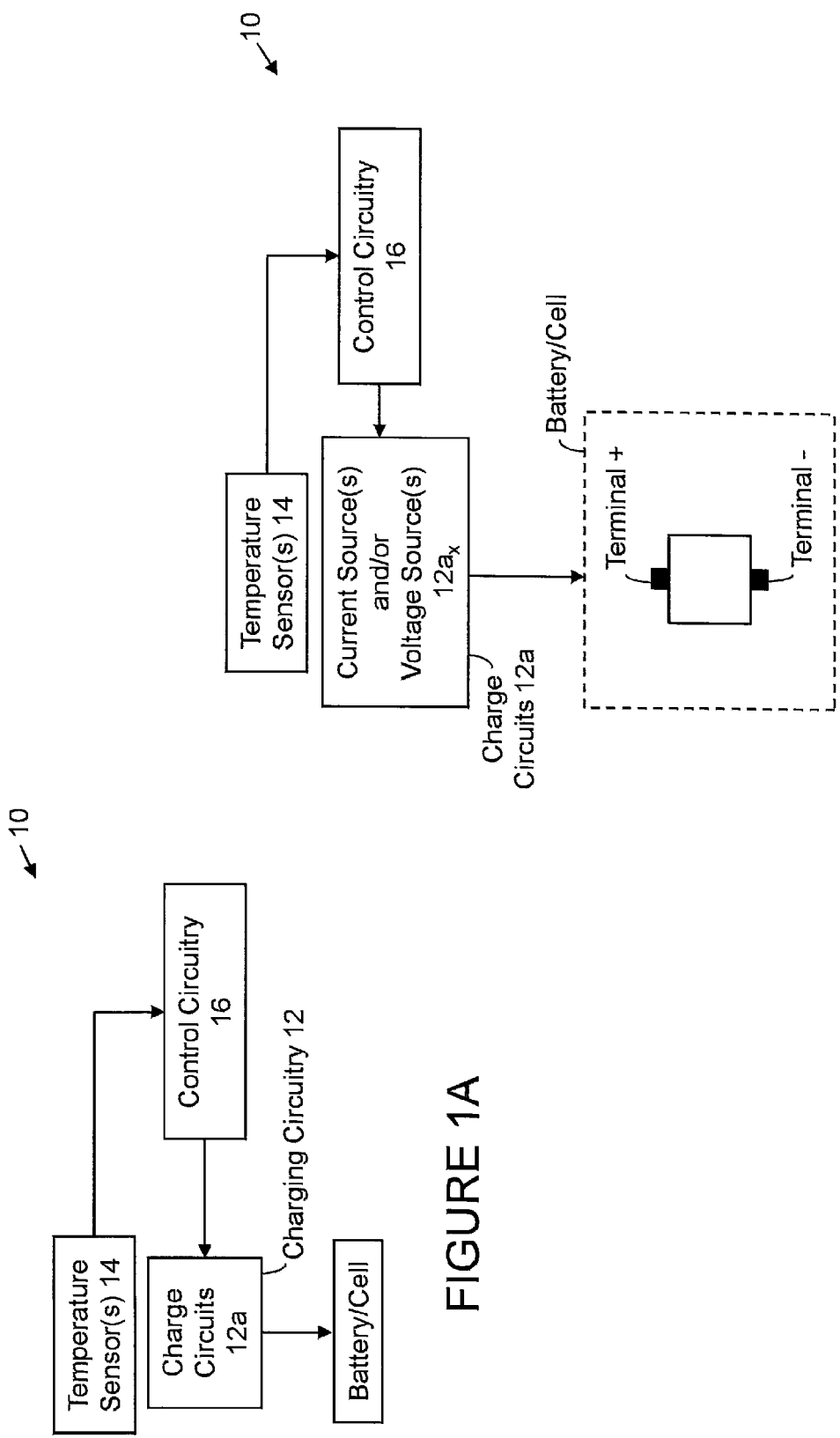

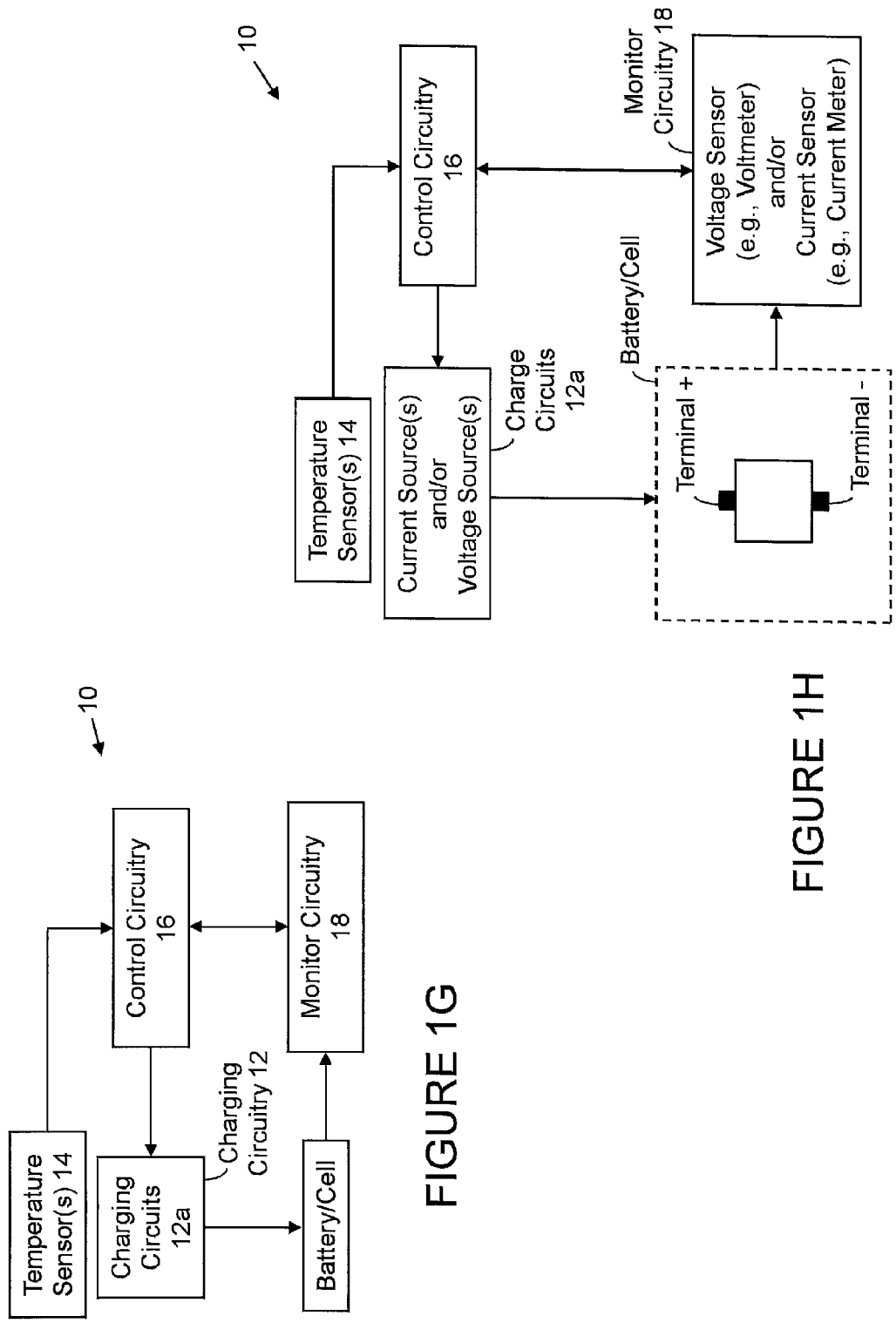

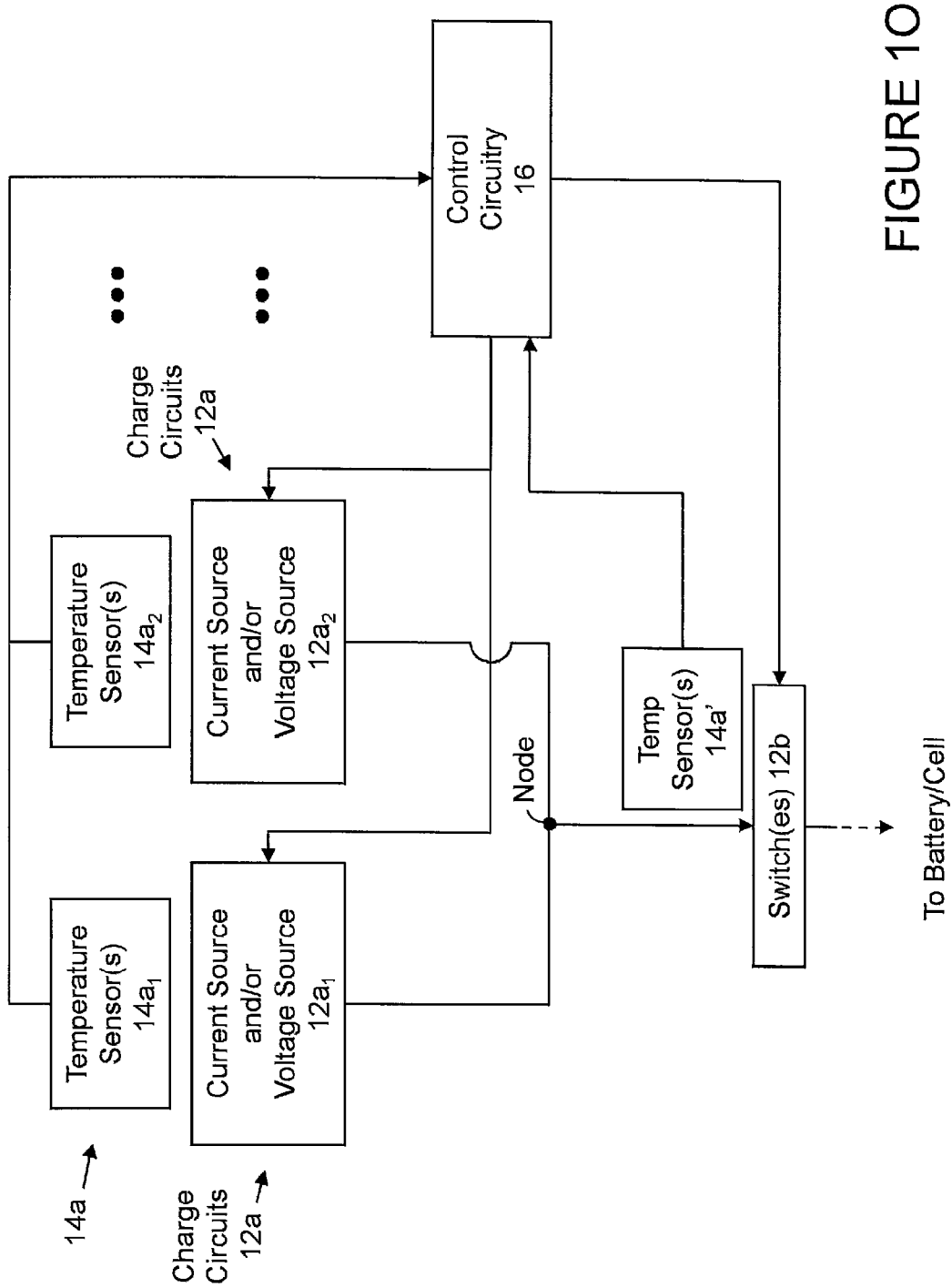

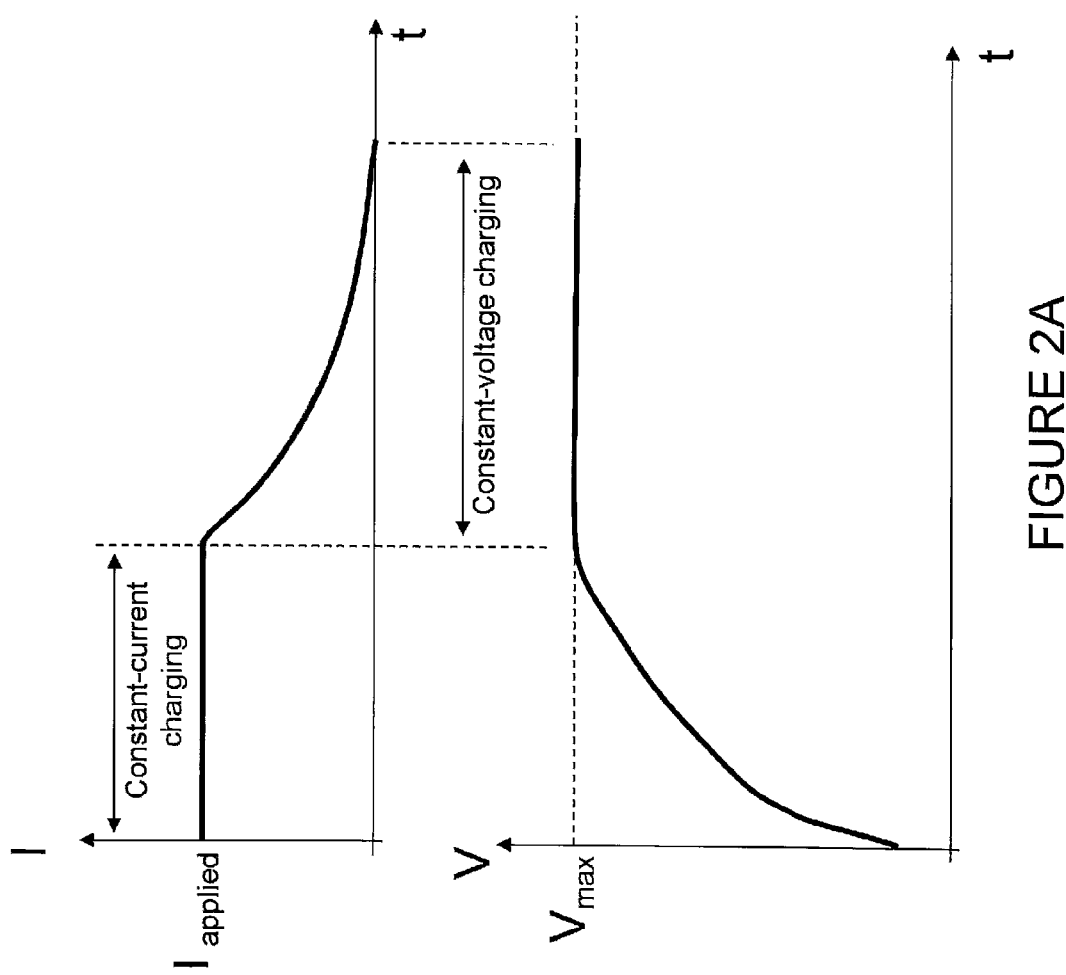

ADAPTIVE CHARGING TECHNIQUE AND CIRCUITRY FOR A BATTERY/CELL USING MULTIPLE CHARGE CIRCUITS AND TEMPERATURE DATA

RELATED APPLICATIONS

This application is a continuation of U.S. application Ser. No. 14/075,667 (U.S. Pat. No. 8,907,631) entitled "Adaptive Charging Technique and Circuitry for a Battery/Cell using Multiple Charge Circuits and Temperature Data", filed Nov. 8, 2013, which application claims priority to U.S. Provisional Application No. 61/860,382, entitled "Adaptive Charging Technique and Circuitry for a Battery/Cell using Multiple Charge circuits and Temperature Data", filed Jul. 31, 2013, which applications are incorporated herein by reference in their entirety.

INTRODUCTION

In one aspect, the present inventions relate to circuitry for and methods of adaptively charging or re-charging (hereinafter collectively "charging") a battery/cell using, among other things, a plurality of charge circuits and data which is representative of temperature of one or more (or all) of the charge circuits of the charging circuitry. In another aspect, the present inventions are directed to adaptively charging a battery/cell using data which is representative of an operating temperature and operating efficiency of, for example, one or more (or all) of the charge circuits of the charging circuitry. In yet another aspect, the present inventions are directed to adapting the operation of one or more (or all) of the charge circuits of the charging circuitry, during the charging operation of the battery/cell, based on an operating temperature and/or operating efficiency of such charge circuits.

For example, in one embodiment, circuitry and techniques according to certain aspects of the present inventions measure or monitor the operating temperatures of a plurality of the charge circuits and, in response thereto, control or instruct one or more (or all) of the charge circuits to adjust one or more characteristics of the corresponding output signal(s) when the associated temperature data is/are greater than a first predetermined value (for example, an upper limit), lower than a second predetermined value (for example, a lower limit), outside of a predetermined range, and/or differences between the temperature data associated with the two or more charge circuits exceed one or more predetermined values or ranges. The circuitry and techniques according to certain aspects of the present inventions may, in addition to employing data which is representative of or correlates to the operating temperature, further employ considerations of an efficiency of one or more (or all) of the charge circuits to determine the operating characteristics of the charge circuits.

For example, the circuitry and techniques of the present invention may adjust the operation characteristics of one or more (or all) of the charging circuits using operating temperature data and operating efficiency data (for example, an efficiency versus output current relationship of a DC-DC converter). Here, such circuitry and techniques may adjust the operation characteristics of a charging circuit to adjust or control the operating temperature and operating efficiency thereof. In this way, the control circuitry may (directly or indirectly) control the operating temperature and operating efficiency of one or more (or all) of the charge circuits of the charging circuitry in conjunction with the charging signal output by the charging circuitry and applied to the battery/cell.

In one embodiment, in the context of a constant-current, constant-voltage ("CCCV") charging technique and/or a step charging technique, the circuitry and techniques of the present inventions may adapt the charging operation, in accordance with data which is representative of or correlates to the temperatures of the charge circuits, by directly controlling the charge circuits and/or by indirectly controlling circuitry (for example, power management circuitry) that controls the charge circuits (for example, adjusting the amplitude of the voltage of and/or current applied to the battery/cell during the charging operation). In this way, circuitry monitors and controls the temperatures of the charge circuits and responsively adjusting one or more characteristics of the charging signal applied to the battery/cell during the charging operation via controlling the operation of the charge circuits based on or using data which is representative of or correlates to the temperatures of one or more (or all) of the charge circuits of the charging circuitry. Notably, the control circuitry may, in addition to employing data which is representative of or correlates to the temperature of one or more (or all) of the charge circuits, employ considerations of an efficiency of one or more (or all) of the charge circuits to determine, generate and/or apply control signals which define the operating characteristics of the charge circuits.

Similarly, in the context of a pulse current charging technique, the circuitry and techniques of the present inventions measure or monitor operating temperatures of the plurality of charge circuits and, in response thereto, control or instruct the charge circuits to adjust one or more characteristics of the charging signal (for example, the pulse width, amplitude and/or period of the voltage of and/or current applied to the battery/cell during the charging operation) when the data which is representative of the temperature of the charging circuitry is greater than a first predetermined value, lower than a second predetermined value, outside of a predetermined range and/or differences between the temperature data associated with the two or more charge circuits of the charging circuitry exceed one or more predetermined values or ranges. Here, control circuitry controls the temperature of one or more (or all) of the charge circuits by adjusting or controlling one or more operating conditions or characteristics of such charge circuits. As intimated above, the control circuitry may also determine generate and/or apply control signals which define the operating characteristics of the charge circuits based on or using characteristics of the aggregate charging signal applied to the battery/cell during the charging operation and data which is representative of the efficiency of one or more (or all) of the charge circuits.

For example, the control circuitry may adjust the operation characteristics of a first charging circuit to reduce the temperature thereof (which may reduce the amount of charging signal output by the first charging circuit and applied to the battery/cell as well as increase and/or change the efficiency of a DC-DC converter) and, in addition, adjust the operation characteristics of a second charging circuit to increase the amount of charging signal output by the second charging circuit and applied to the battery/cell (which may increase the operating temperature of the second charging circuit as well as maintain an efficiency of such circuit, for example, maintain the efficiency above a threshold or value). Here, the operating temperature (and/or efficiency) of the second charging circuit may be less than the operating temperature (and/or efficiency) of the first charging circuit; alternatively, the operating temperature (and/or operating efficiency) of the second charging circuit may be below a given threshold or value and the operating temperature (and/or operating efficiency) of the first charging circuit may be greater than a given threshold or value (which may or may not be the same threshold or value as mentioned above in relation to the second charging circuit). In this way, the control circuitry may (directly or indirectly) control the operating temperature and/or efficiency of one or more (or all) of the charge circuits of the charging circuitry and control and/or maintain the aggregate charging signal output by the charge circuits and applied to the battery/cell.

The control circuitry may receive the temperature data (for example, data which is in analog or digital form) from one or more temperature sensors disposed on, in and/or in thermal communication (i.e., where the temperature measured by the sensor(s) is/are related, representative of and/or correlated to) with one or more (or all) charge circuits of the charging circuitry. In a preferred embodiment, one or more temperature sensors are disposed on, in and/or in thermal communication of device(s) primarily responsible for significant and/or majority of heat generation—for example, an inductor in each charging circuit and/or the switching circuitry associated with the charge circuits. In this way, the temperature data is highly correlative to the operating temperature of the charge circuits.

The control circuitry may assess or evaluate the temperature data—for example, the control circuitry may determine, assess and/or evaluate whether such data of one or more (or all) of the charge circuits is/are greater than a first predetermined value (for example, an upper limit), less than a second predetermined value (for example, a lower limit), outside of one or more predetermined ranges and/or differences between the temperature data associated with the two or more charge circuits of the charging circuitry exceed one or more predetermined values or ranges (collectively hereinafter "out-of-specification"). That is, in those instances when control circuitry determines such temperature data are/is (hereinafter, in this context, collectively "is") out-of-specification—for example, the operating temperature of one or more of the charge circuits exceeds a predetermined value and differences between the temperature data associated with the two or more charge circuits of the charging circuitry exceed one or more predetermined values, the control circuitry may control such charging circuit(s) to adjust one or more operating characteristics of the charge circuits. In one embodiment, the control circuitry may adjust the operating characteristics of the charging circuit(s) having operating temperature(s) that exceed(s) a predetermined value—for example, reduce the charging signal output of such charging circuit(s) by a predetermined percentage—which, in one embodiment, may be determined based on an amount such temperature data is out-of-specification in relation to the associated charging circuit(s)—in order to adjust the operating temperature of such charging circuit(s).

In addition to the temperature considerations of the charge circuits (or in lieu thereof), the control circuitry may employ an operating efficiency of one or more (or all) of the charge circuits (for example, DC-DC conversion efficiency) in consideration of adjusting one or more operating conditions or characteristics of such charge circuits. For example, the control circuitry may monitor temperature data of one or more (or all) of the charge circuits and, based on or using an operating efficiency of such charge circuits, control the charge circuits to operate at a level or in a range that provides predetermined thermal and/or operational performance. In this embodiment, the circuitry and techniques of the present inventions assess an operating efficiency of one or more (or all) of the charge circuits in addition to (or in lieu of) an operating temperature and these are employed in controlling and/or establishing the operating characteristics of such charge circuits. Indeed, in one embodiment, the control circuitry may allocate or establish an operating condition of a plurality (or all) of the charge circuits which establishes a load distribution there between so that the charge circuits employ improved, enhanced and/or optimal operating characteristics from efficiency and thermal perspectives. Notably, the relationship(s) between operating efficiency, operating temperature and/or output signal of a charging circuit may be predetermined (for example, using empirical and/or theoretical data) and stored in, for example, memory of the control circuitry.

In another embodiment, the control circuitry may directly or indirectly control the charge circuits which are both out-of-specification and within-specification. In this regard, the control circuitry may, reduce the charge applied to the battery/cell by the charging circuit(s) which are out-of-specification (for example, reduce the charge applied to the battery/cell by a predetermined percentage—which, in one embodiment, may be determined based on an amount such temperature data is out-of-specification) and increase the charge applied to the battery/cell by the charging circuit(s) which are within-specification (for example, increase the charge applied to the battery/cell by a predetermined percentage—which, in one embodiment, may be determined based on an amount such temperature data is within-specification). In this way, the impact of the charging circuit(s) which are out-of-specification on the charging operation of the battery/cell is reduced, managed and/or controlled via providing or applying a charging signal to the battery/cell which, in the aggregate, is consistent with (for example, the same or substantially the same) a predetermined charging signal, sequence or operation. Here, the control circuits manage, determine and/or establish a "load balance" or "load allocation" between the plurality of the charge circuits to provide a predetermined charging signal to the battery/cell. Indeed, as mentioned above, the control circuitry may employ considerations of operating temperature and operating efficiency (for example, DC-DC conversion efficiency) of one or more (or all) of the charge circuits in controlling and/or establishing the operating characteristics of such charge circuits (and, as such, the "load balance" or "load allocation" between the plurality of the charge circuits).

In yet another embodiment, the control circuitry may directly or indirectly control the charge circuits in order to provide a predetermined charging signal to the battery/cell and/or maintain one or more (or all) of the charge circuits at or below predetermined operating temperature(s)—which may or may not be the same temperatures. Indeed, in one embodiment, the control circuitry may adjust one or more of the operating characteristics of one or more (or all) of the charge circuits (the outputs of which, in combination, charge the battery/cell) to provide and/or maintain one or more (or all) of the charge circuits at one or more predetermined operating temperatures. For example, the control circuitry may control certain charging circuit(s) (which are at or below a given temperature) to increase the charge applied to the battery/cell, and control other charging circuit(s) (which are above a given temperature) to decrease the charge applied by certain of the other charging circuit(s) in order to reduce the operating temperature(s) of the charging circuit(s). The control circuitry may also employ operating efficiency characteristics of one or more (or all) of the charge circuits in determining or controlling operating characteristics to be implemented by such charge circuits. In this way, the control circuitry may control, provide and/or maintain one or more (or all) of the charge circuits at one (or below one or more) predetermined operating temperatures based on or using (i) data which is representative of or correlates to the temperature of one or more (or all) of the charge circuits of the charging circuitry and (ii) data which is representative of an operating efficiency of one or more (or all) of the charge circuits. In this way, the control circuit determines or establishes a "load balance" or "load allocation" between the plurality of the charge circuits to provide a predetermined charging signal to the battery/cell having predetermined characteristics (for example, in the context of a pulse charging operation, a predetermined current pulse amplitude, pulse shape, period and/or duty cycle).

Notably, the multiple charging circuit architecture of the present inventions may also facilitate reducing the power loss of the charging system (relative to a single charging circuit architecture) by allocating the charging signal between a plurality of charge circuits. Here, the power loss of each device may be characterized as:

$$\text{Power Loss of the Charging Circuit} = Rcc \times Iout^2$$

where:
  Rcc is the resistance of the charging circuit
  Iout is the output current of the charging circuit Thus, the power loss of the charging circuitry of the present inventions (which includes a plurality of charge circuits), may be managed or controlled by allocating the charging signal (for example, charging current) generation between the plurality of charge circuits. For example, where the charging system includes two charge circuits, the reduction in power loss, relative to a single charging circuit architecture, may be 50% for the same total current (i.e., the load) to be generated and applied to the battery during a recharging operation. Moreover, the heat generated by each charging circuit during operation, which is related to the power loss of the charging circuit, may be similarly managed or controlled by allocating the current generation between the multiple charge circuits.

The adaptation of the control of the charging circuit(s) may be iterative in order to adjust the operating temperature of such charging circuit(s) (for example, iteratively adjust the output charge signal generated by the charging circuit by a predetermined percentage (for example, 1%, 2.5%, 5%, etc.) until the control circuitry determines the operating temperature data of the associated charging circuit is at or below a predetermined value and/or within-specification. Notably, the control circuitry may employ any algorithm or technique now known or later developed to manage, adjust or control the operating temperature of one or more (or all) of the charge circuits; all of which are intended to fall within the scope of the present inventions.

In one embodiment, the control circuitry adapts or adjusts the operating characteristics of charging circuit(s) upon detecting a rise of the operating temperature is above a predetermined value or limit (for example, where the control circuitry determines that the operating temperature(s) of such charging circuit(s) will be above, below or outside a predetermined absolute or relative value or limit (for example, relative to the operating temperature(s) of other charging circuit(s)). Here, the control circuitry may adjust the operating characteristics of such charging circuit(s) in order to control the temperature of such charging circuit(s)—for example, until the control circuitry determines the operating temperature data of the associated charging circuit is at or below a predetermined value and/or within-specification. The control circuitry may control certain other charge circuits to increase the output charge signal (which, in turn, will increase the operating temperature of such charging circuit) in the same or similar way as described above.

The temperature sensor(s) (for example, one or more thermistors, (proportional to absolute temperature) solid-state sensors and/or thermocouples) may be physically located/disposed/integrated on and/or in, or fixed to the charging circuitry—for example one or more of the charge circuits. In another embodiment, the temperature sensor(s) are disposed/integrated on and/or in or fixed to one or more substrates (preferably, one substrate) which is/are in thermal communication with one or more of the charge circuits. For example, the charge circuits and one or more temperature sensors may be disposed on a substrate (for example, a PCB) or physically coupled to the same structure (for example, heat sink). In one particular embodiment, the device(s) of the charge circuits which are responsible for generating a majority of the thermal energy and one or more temperature sensors may be disposed on a substrate or physically coupled to the same structure. In this way, one or more temperature sensor(s) provide data which is highly correlated with the temperature of the charge circuits (or, in one embodiment, one or more components thereof) and, as such, may more quickly and accurately measure, detect and/or monitor an operating temperature of the charge circuits during a charging operation of the battery/cell. As such, control circuitry, in response to such temperature data, may determine whether such data corresponding to one or more of the charge circuits (or portions thereof) is/are out-of-specification or within-specification (and, in addition thereto, the extent the data is out-of specification or within-specification), and generate suitable control signal to directly or indirectly control the output of the charging circuit(s) (for example, in the context of a pulse current charging technique, the pulse width, amplitude and/or period of the voltage of and/or current output by one or more of the charge circuits).

Notably, the temperature sensor(s) may consist of a single component (whether in integrated circuit or discrete form) or a multiplicity of components (whether in integrated circuit form, discrete form or otherwise), which are active and/or passive, and which provide data (whether in digital and/or analog form) which is representative of or correlative to a temperature of, for example, the charge circuits (or, in one embodiment, one or more components of each charging circuit). Any temperature sensor type or configuration now known or later developed is intended to fall within the scope of the present inventions.

As mentioned above, when the control circuitry determines the temperature data of one or more charge circuits (which may share components with one or more other charge circuits of the charging circuitry) is/are out-of-specification, the control circuitry may directly or indirectly control the charging circuitry to adjust one or more characteristics of the charging signal via control of the charge circuits thereof. For example, where a system includes conventional power management circuitry (for example, an application processor) to control/instruct the charging circuitry to generate and apply a certain voltage and/or current to a battery/cell, the control circuitry may indirectly control the charging circuitry via providing instructions or control signals to the conventional power management circuitry. Here, the control circuitry, based on or using an operating temperature data, may determine a change suitable to adjust the temperature of the charging circuitry (so that subsequently acquired data of the operating temperature of the charging circuitry is within-specification) and generate appropriate instructions or control signals. The conventional power management circuitry, in response to such instructions or control signals, adjusts one or more characteristics of the charging signal via direct control of the operation of the charging circuitry.

In other embodiments, the control circuitry is electrically coupled to the charging circuitry (and the charge circuits thereof) to directly control, for example, the amplitude of voltage and/or current output by the charging circuitry and/or, in the context of a pulse current charging technique, the pulse width, amplitude and/or period of the voltage of and/or current output by the charge circuits of the charging circuitry. In this way, the control circuitry directly controls one or more of the charge circuits via application of suitable control signals to adjust one or more characteristics of the charging signal output thereby (for example, the pulse width of the voltage and/or current signals applied to the battery/cell) so that the temperature data (which is representative of and/or correlated with the operating temperature of, for example, the charge circuits) is within-specification.

As noted above, in addition to the embodiments relating to temperature considerations of the charge circuits, or in lieu thereof, the control circuitry may employ an operating efficiency of one or more (or all) of the charge circuits (for example, DC-DC conversion efficiency) in consideration of adjusting one or more operating conditions or characteristics of such charge circuits. For example, the control circuitry may monitor temperature data of one or more (or all) of the charge circuits and, based on or using an operating efficiency of such charge circuits (for example, an efficiency-output charging signal relationship), control the charge circuits to operate at or above a level and/or in a range that provides predetermined operational efficiency performance. The control circuitry may adapt or control the charge circuits to operate in a suitable/desired thermal and operational efficiency and, in the aggregate, generate or provide charging signal output to the battery/cell that meets or is consistent with the predetermined charging signal, sequence or operation. In one embodiment, the control circuitry may adapt, allocate and/or establish an operation condition of a plurality (or all) of the charge circuits having a load distribution or allocation there between which provides enhanced and/or optimal operating characteristics (whether from an individual charging circuit and/or overall charging circuitry perspective) for a given charging sequence in conjunction with meeting thermal considerations of the charge circuits (for example, maintaining the charge circuits within specification). Thus, in this embodiment, the control circuitry employs consideration of operating temperature and operating efficiency of one or more (or all) of the charge circuits in order to generate a charging signal consistent with a predetermined charging sequence.

The two or more of the charge circuits may be the same type of circuits and/or different types of circuits. Moreover, two or more of the charge circuits may have the same and/or different thermal and/or efficiency characteristics. In one embodiment, all of the charge circuits are programmable and have a common programmable range with sufficient granularity of charging signal output to facilitate a multiple charging circuit embodiment. In one preferred embodiment, temperature sensor(s) are located or disposed on, in and/or in thermal communication (i.e., where the temperature measured by the sensor(s) is/are related, representative of and/or correlated to) with all of the charge circuits of the charging circuitry. In this way, the control circuitry has temperature information corresponding to all of the charge circuits of the charging circuitry.

The charge circuits (or various elements thereof, for example, voltage/current sources and/or inductor-capacitor circuits) may be physically located, spaced and/or arranged on a substrate so that during a recharging operation, one or more temperatures of the housing, substrate and/or charge circuits does not exceed a predetermined level or range (for example, exceed such temperature for a given amount of time). In one embodiment, the charge circuits (or selected elements thereof, for example, the inductor associated with each charging circuit), are located, spaced and/or arranged relative to each other so that the temperature of, for example, the housing or "case" (which is typically in contact with the user) of the electronic device (in which the charge circuits are located), does not exceed a predetermined level and/or range (for example, at any time during operation or for a given amount of time). In this way, the thermal profile of the plurality charging circuit architecture, during a recharging operation, is within specification.

In addition to a system and technique based on operating temperatures of charge circuits, or in lieu thereof, the present inventions may employ the temperature of the housing or case or substrate (for example, the substrate upon which the charging circuitry is disposed) in the device (for example, a portable or mobile device such as a mobile telephone, computer, (for example, laptop or tablet), or consumer electronic device (for example, a camera or music player)—hereinafter collectively "portable device" and/or "mobile device") during the charging operation of the battery/cell which powers the device (such housing or case of the device or such substrate in the device is hereinafter collectively "housing"). In one exemplary embodiment of this aspect of the inventions, the control circuitry employs data which is representative of the temperature of the housing of such device and, as discussed in detail herein, determines an appropriate response (for example, adjusts the operating characteristics of one or more (or all) of the charge circuits in order to reduce the temperature of the housing of the device). Such response may also consider the operating efficiency(ies) of the charge circuits when assessing and implementing an adjustment of the operating characteristics of the charging circuit(s) during the charging sequence. In this embodiment, the temperature sensor(s) may be in direct thermal communication with the housing of the mobile device to sense and generate data which is representative of temperature of such housing (or portions thereof).

Notably, the inventions described and illustrated herein may be implemented or employed with the inventions or embodiments described and/or illustrated in U.S. patent application Ser. Nos. 13/626,605, 13/657,841, 13/747,914, 13/836,235 and 61/814,188—all of which are hereby incorporated by reference herein. For the sake of brevity, many of the combinations and permutations are not described or set forth in detail herein, but are to be considered as falling within the scope of the present inventions.

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or elements in different figures are labeled similarly. It is understood that various combinations of the structures, components, and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

FIGS. 1A-1F illustrate, in block diagram form, exemplary embodiments of adaptive charging circuitry (which includes a plurality of charge circuits (which may share components)), in conjunction with a battery/cell, according to at least certain aspects of the present inventions, wherein temperature sensor(s) are located in thermal communication with the charging circuitry to generate data which is representative of an operating temperature of one or more of the charge circuits and control circuitry employs such data to adapt, adjust and/or control one or more characteristics of the output of the charging circuitry (i.e., charge or current applied to or injected into the battery/cell by one or more of the charge circuits), for example, when data which is representative of the temperature of one or more of the charge circuits is out-of-specification during a charging sequence, operation or cycle; notably, in one embodiment, one or more temperature sensors (for example, thermistors, solid-state sensors (for example, proportional to absolute temperature type) and/or thermocouples) are physically disposed/integrated on and/or in or fixed to one or more substrates which is/are in thermal conductivity with the charge circuits of the charging circuitry and, in another embodiment, one or more temperature sensors (for example, thermistors, solid-state sensors (for example, proportional to absolute temperature type) and/or thermocouples) are physically disposed/integrated on and/or in, or fixed to or on the charging circuitry; further, the charging circuitry of the exemplary embodiments illustrated in FIGS. 1D-1F include voltage source and/or current source and switch(es) which are suitable to implement a pulse current charging technique during the charging sequence, operation or cycle of the battery/cell; as noted above, the charge circuits may share components—for example, switch(es)—see FIG. 1E));

FIGS. 1G-1J illustrate, in block diagram form, exemplary embodiments of adaptive charging circuitry (which includes a plurality of charge circuits (which, as noted above, may share components)), in conjunction with a battery/cell and monitor circuitry having, for example, voltage and/or current sensors (for example, a voltmeter and/or a current meter) to determine, measure and/or monitor a voltage at the terminals of the battery/cell and/or a current through the battery/cell (both of which are related to the output of the charge circuits of the charging circuitry) wherein the voltage and current information may be employed, by the control circuitry, to further adapt, adjust and/or control one or more characteristics of the output of the charge circuits (i.e., charge or current applied to or injected into the battery/cell by one or more (or all) of the charge circuits), according to certain aspects of the present inventions; notably, the charging circuitry of the exemplary embodiments illustrated in FIGS. 1I and 1J include voltage source and/or current source and switch(es) which are suitable to implement a pulse current charging technique during the charging sequence, operation or cycle of the battery/cell; further, the exemplary embodiment illustrated in FIG. 1J includes monitor circuitry which implement one or more Kelvin-type measurement configurations wherein little to no current is employed or required to determine the voltage at the terminals of the battery/cell and/or the current through the battery/cell;

FIGS. 1K-1R illustrate, in block diagram form, exemplary embodiments of the charging circuitry, which includes a plurality of charge circuits, and one or more temperature sensors (for example, thermistors, solid-state sensors (for example, proportional to absolute temperature type) and/or thermocouples) which may be physically disposed/integrated on and/or in or fixed to one or more substrates which is/are in thermal conductivity with the charge circuits of the charging circuitry and, in another embodiment, one or more temperature sensors (for example, thermistors, solid-state sensors (for example, proportional to absolute temperature type) and/or thermocouples) are physically disposed/integrated on and/or in, or fixed to or on the charging circuitry, according to one or more aspects of the present inventions; as noted above, the charge circuits may share components—for example, switch(es)—see FIGS. 1M, 1O and 1Q));

FIG. 2A illustrates current and voltage of a battery/cell as a function of time illustrating the conventional charging method known as constant-current, constant-voltage (CCCV); notably, a conventional method to charge a rechargeable battery, including a lithium-ion type rechargeable battery, employs a CCCV technique, wherein the charging sequence includes a constant-current (CC) charging mode until the terminal voltage of the battery/cell is at about a maximum amplitude (for example, about 4.2V to 4.5V for certain lithium-ion type rechargeable batteries) at which point the charging sequence changes from the constant-current charging mode to a constant-voltage (CV) charging mode, wherein in the CV mode, a constant voltage is applied to the terminals of the battery/cell; in the CCCV technique, the charging circuitry often changes from the CC charging mode to the CV charging mode when the state of charge (SOC) of the battery/cell is at about 60-80%;

FIGS. 7B and 7D illustrate charging circuitry including voltage source(s) and/or current source(s) and switch(es) which are suitable to implement a pulse current charging technique;

Figure 1C:
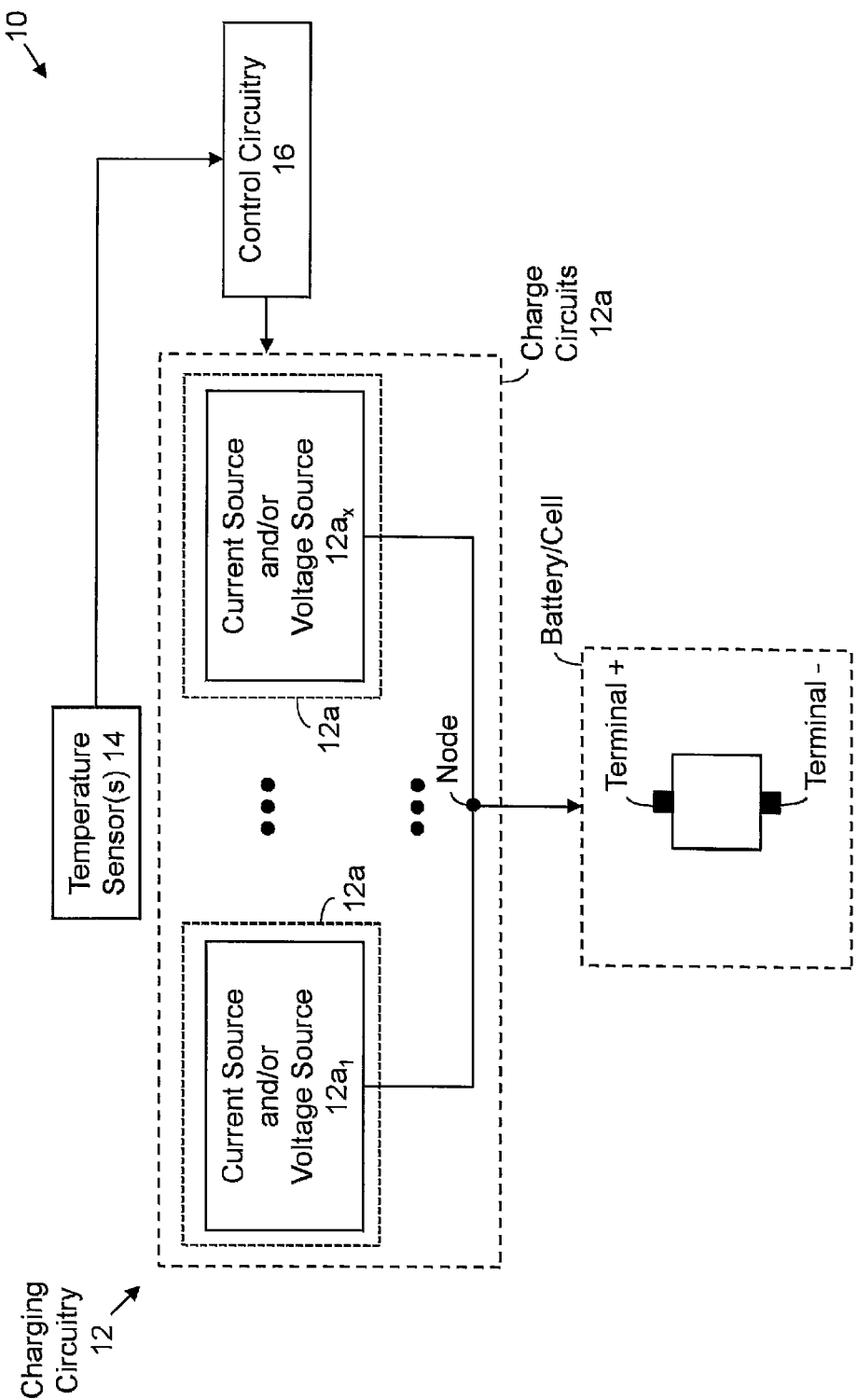
Figure 1D:
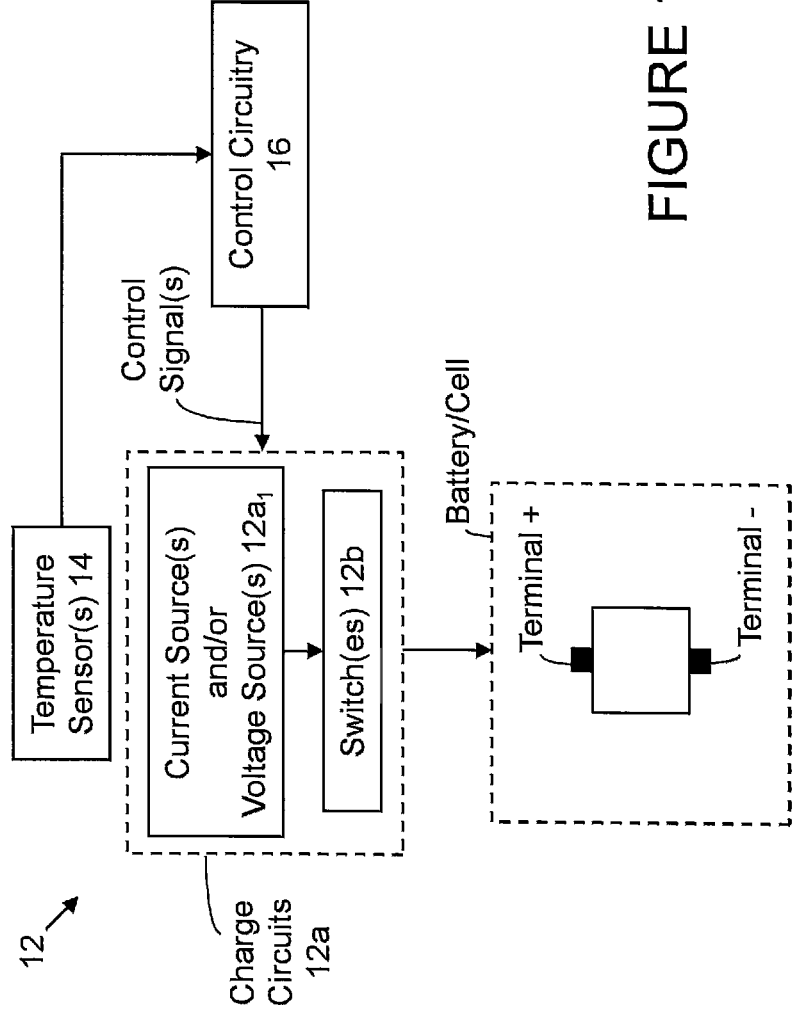
Figure 1E:
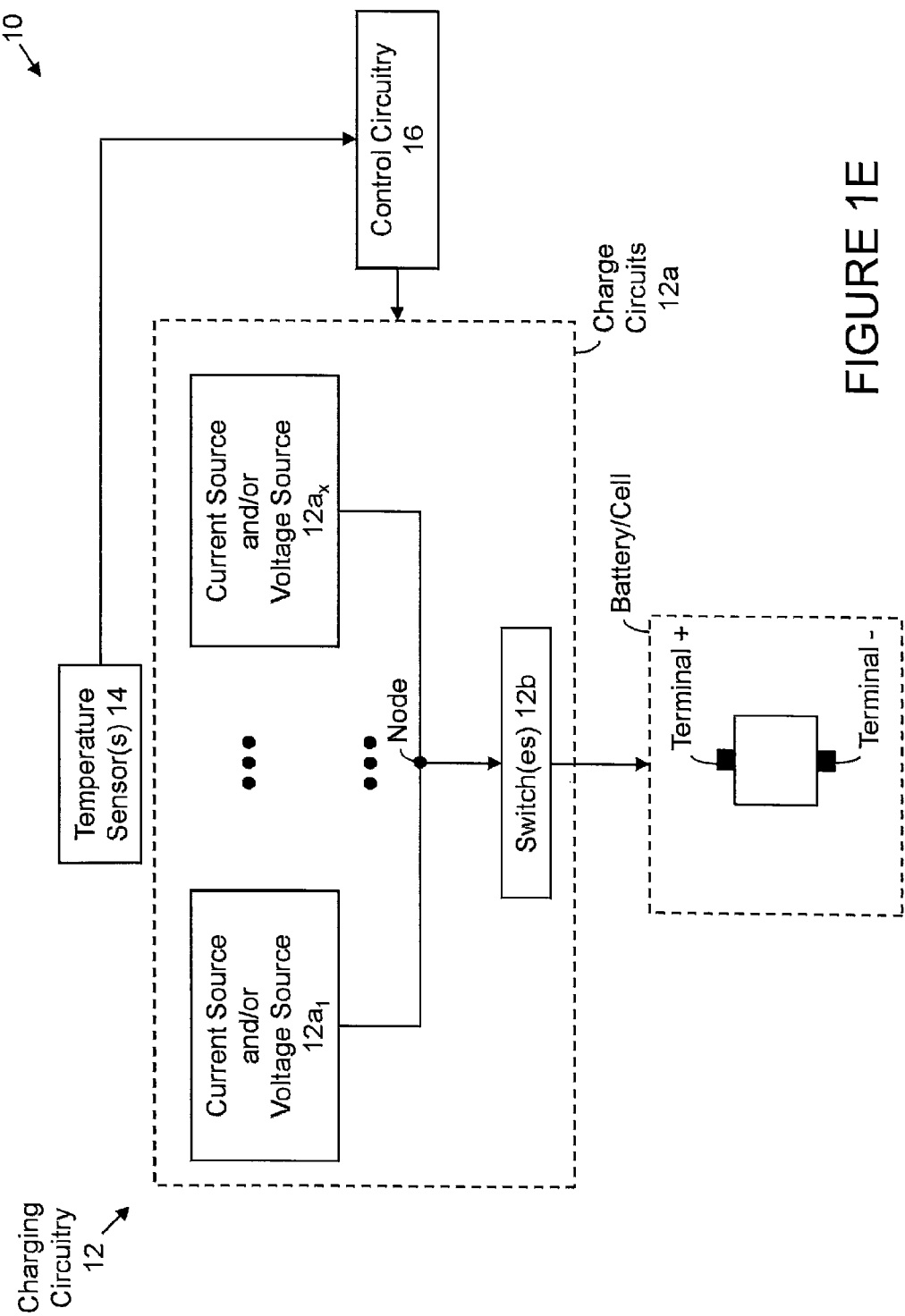
Figure 1F:
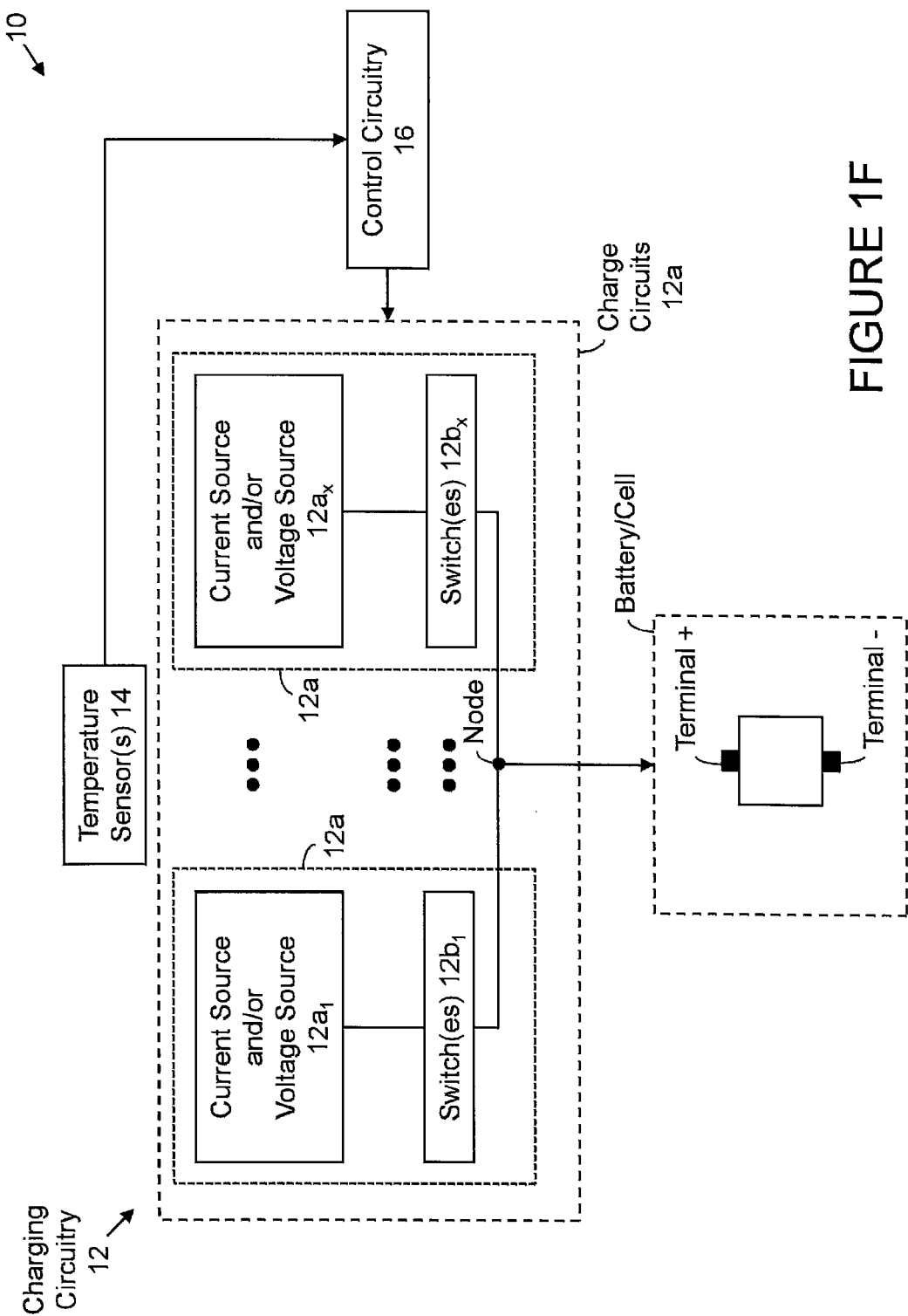
Figure 1I:
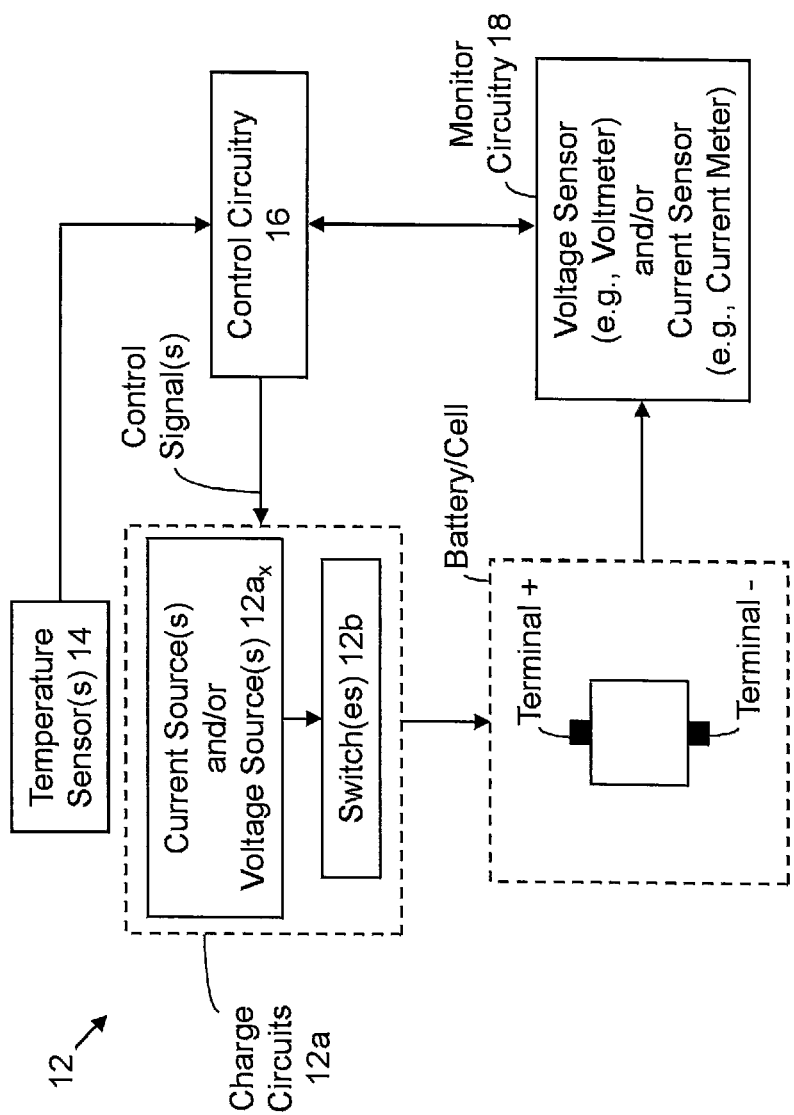
Figure 1J:
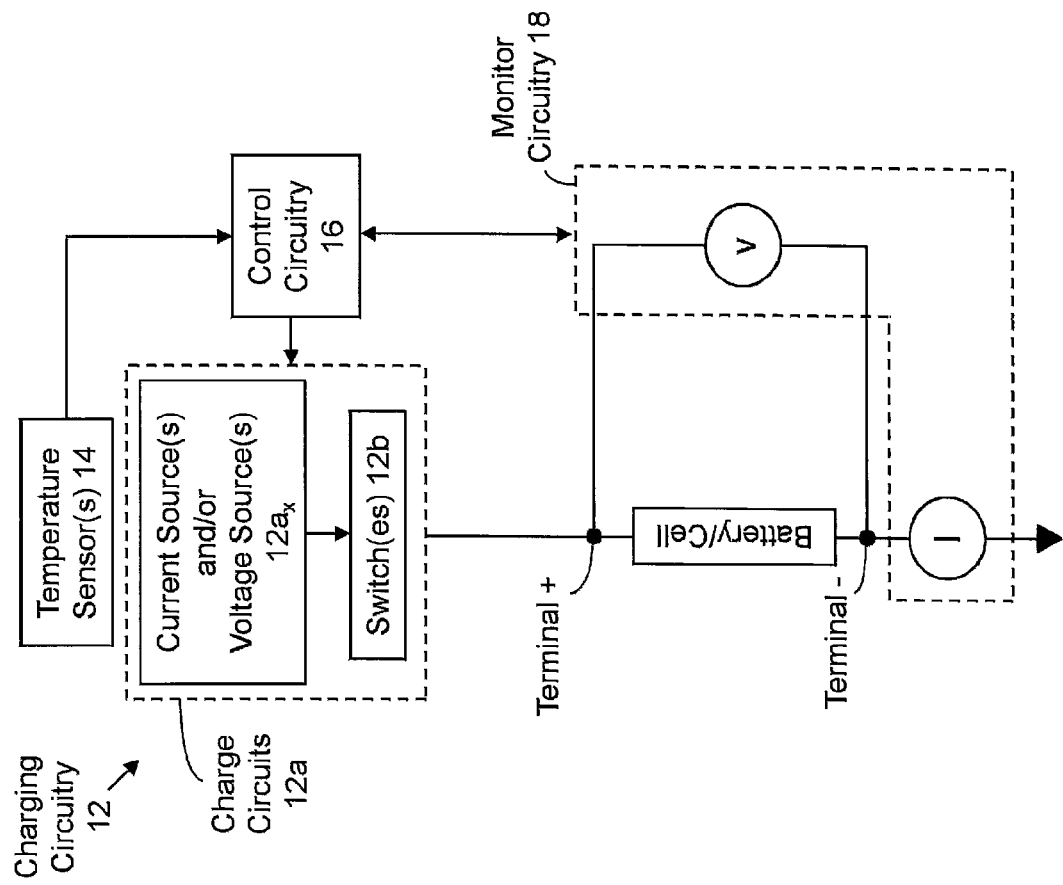

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

Moreover, many other aspects, inventions and embodiments, which may be different from and/or similar to, the aspects, inventions and embodiments illustrated in the drawings, will be apparent from the description, illustrations and claims, which follow. In addition, although various features and attributes have been illustrated in the drawings and/or are apparent in light thereof, it should be understood that such features and attributes, and advantages thereof, are not required whether in one, some or all of the embodiments of the present inventions and, indeed, need not be present in any of the embodiments of the present inventions.

DETAILED DESCRIPTION

In a first aspect, the present inventions are directed to adaptively charging a battery/cell using, among other things, data which is representative of an operating temperature(s) of, for example, one or more (or all) of the charge circuits of the charging circuitry and/or electronic device housing during, for example, the charging operation. In another aspect, the present inventions are directed to adaptively charging a battery/cell using data which is representative of an operating temperature(s) and operating efficiency(ies) of, for example, one or more (or all) of the charge circuits of the charging circuitry during, for example, the charging operation. In yet another aspect, the present inventions are directed to adapting the operation of one or more (or all) of the charge circuits of the charging circuitry, during the charging operation of the battery/cell, based on an operating temperature(s) of such charge circuits and/or electronic device housing and operating efficiency(ies) of such charge circuits. Of course, other aspects will be apparent from the description, drawings and claims hereof.

In one embodiment, in response to assessing (i) the operating temperature(s) of one or more (or all) of the charge circuits and/or temperature of the electronic device housing are out-of-specification and/or (ii) the operating efficiency(ies) of one or more (or all) of the charge circuits are below a predetermined level, outside of a predetermined range and/or above, below or outside a relative value or limit (for example, relative to the operating efficiency(ies) of other charging circuit(s)) (hereinafter collectively "out-of-specification"), the circuitry and techniques of the present inventions may adjust one or more operating characteristics of the charging circuit(s) to control or adjust the operating temperature of one or more (or all) of the charge circuits and/or temperature of the electronic device housing and operating efficiency of one or more (or all) of the charge circuits. The outputs of the charge circuits, in combination, comprise the charging signal (for example, voltage of and/or current) applied to the battery/cell during the charging operation. In one embodiment, control circuitry directly or indirectly instructs the plurality of charge circuits to adjust the amplitude of the voltage of and/or current applied to the battery/cell during the charging operation. In another embodiment, control circuitry instructs the charge circuits to adjust the pulse width, amplitude and/or period of the voltage of and/or current applied to the battery/cell during the charging operation (for example, when the system implements a pulse charging technique).

The control signals may be calculated based on or using (i) operating temperature of one or more (or all) of the charge circuits and/or temperature of the electronic device housing and/or (ii) operating efficiency of one or more (or all) of the charge circuits. For example, control circuitry, in response to determining temperature data of one or more (or all) of the charge circuits is out-of-specification (and, in one embodiment, the extent or amount the data is out-of specification) and/or the operating efficiency of such charge circuits is out-of-specification, generates suitable control signals to directly or indirectly control one or more (or all) of the charge circuits (for example, in the context of a pulse current charging technique, the pulse width, amplitude and/or period of the voltage of and/or current output by the charging circuitry and applied to the battery/cell during the charging operation). In this way, certain aspects of the present inventions adapt the operation of one or more (or all) of the charge circuits of the charging circuitry, during the charging operation of the battery/cell, to adjust the operating temperature of one or more (or all) of the charge circuits and/or temperature of the electronic device housing and/or (ii) operating efficiency of one or more (or all) of the charge circuits. Notably, the charge circuits (which may share some elements between them) output a charging signal to the battery/cell during the charging operation thereof.

The present inventions may employ one or more temperature sensors, for example, thermistors, solid-state sensors (for example, proportional to absolute temperature type) and/or thermocouples, to detect or measure a temperature which is representative of or correlates to the operating temperature of the charge circuits (and/or other thermal generating element/device) and/or the temperature of the electronic device housing during, for example, the charging operation. The temperature sensor(s) may be physically disposed/integrated on and/or in, or fixed to the charge circuits. In addition thereto, or in lieu thereof, the temperature sensor(s) may be disposed/integrated on and/or in or fixed to one or more substrates (preferably, one substrate) which is/are in thermal communication with the charge circuits. In addition thereto, or in lieu thereof, may be disposed/integrated on and/or in or fixed to the housing of the electronic device (for example, mobile telephone, laptop and/or tablet). For example, the charge circuits and one or more temperature sensor(s) may be disposed on a substrate (for example, a PCB) or physically coupled to the same structure (for example, heat sink) or physically coupled to the housing of the electronic device. In this way, these temperature sensor(s) provide data which is correlated with the temperature of the circuitry/device(s) (for example, the charge circuits (or, in one embodiment, one or more components thereof—for example, one or more inductors)) and/or the housing of the electronic device and, as such, accurately represents an operating temperature of such device(s)/circuits during operation and/or the temperature of that portion of the electronic device which is physically engaged by the user.

Notably, each temperature sensor may consist of a single component (whether in integrated circuit or discrete form) or a multiplicity of components (whether in integrated circuit form, discrete form or otherwise), which are active and/or passive, and which provide data (whether in digital and/or analog form) which is representative of or correlative to a temperature of, for example, the charging circuitry (or, in one embodiment, one or more components thereof). Indeed, any temperature sensor now known or later developed may be employed and is intended to fall within the scope of the present inventions.

In operation, based on or using the aforementioned temperature data, the control circuitry determines, assesses and/or evaluates whether such data (for example, data corresponding to the operating characteristics of the charge circuits) are greater than a predetermined upper limit, less than a predetermined lower limit and/or outside one or more predetermined ranges (that is, out-of-specification). In those instances when the control circuitry determines such temperature data is out-of-specification, the control circuitry may directly or indirectly control the charge circuits to adjust one or more operating characteristics based on or using such temperature data and/or operating efficiency of such charge circuits. For example, in one embodiment, the control circuitry may instruct the charge circuits to adjust or change the pulse width, amplitude and/or period of the voltage of and/or current generated and output by the charging circuitry linearly and/or by a predetermined percentage (for example, approximately 5%) in those instances, for example, where the system implements a pulse current charging technique. The control circuitry may repeatedly monitor the temperature data and repeatedly adapt the charge signals and thereby adjust the operating temperature of the charge circuits and/or the operating efficiency of the charge circuits so that the temperature and/or operating efficiency is within-specification (for example, iteratively adapt the charge signal generated by the charging circuitry by a predetermined percentage until the control circuitry determines the operating temperature and/or efficiency are/is within-specification).

The control circuitry may intermittently, continuously and/or periodically estimate, calculate, measure and/or determine a temperature of, for example, of one or more (or all) of the charge circuits and, in response, adapt, change and/or adjust one or more characteristics of the output charging signals of such charge circuits during the charging operation of the battery/cell. For example, the control circuitry may intermittently, continuously and/or periodically (and/or in response to a triggerable event (for example, when the voltage and/or current output by the charging circuitry changes in accordance with a predetermined charging sequence)) adapt, adjust and/or control the characteristics of the charge or discharge signals, packets and/or pulses (via controlling, for example, the shape, amplitude and/or duration of the signal output of the charging circuitry) based on whether (and/or the extent of) the operating temperature and/or operating efficiency of one or more (or all) of the charge circuits are out-of-specification.

Thus, in one embodiment, the adaptive charging techniques and/or circuitry intermittently, continuously, periodically and/or in response to a triggerable event measure or monitor the temperature of the charge circuits of the charging circuitry and/or the housing of the electronic device. Based thereon or using such temperature data, as well as efficiency data associated with the charge circuits, the adaptive charging techniques and/or circuitry may intermittently, continuously, periodically and/or in response to a triggerable event determine and/or adapt the charging operation of the battery/cell so that the operating temperature and/or operating efficiency of one or more (or all) of the charge circuits is/are within-specification (for example, over time and via multiple modifications to one or more characteristics of the charging signal).

Figure 2B:
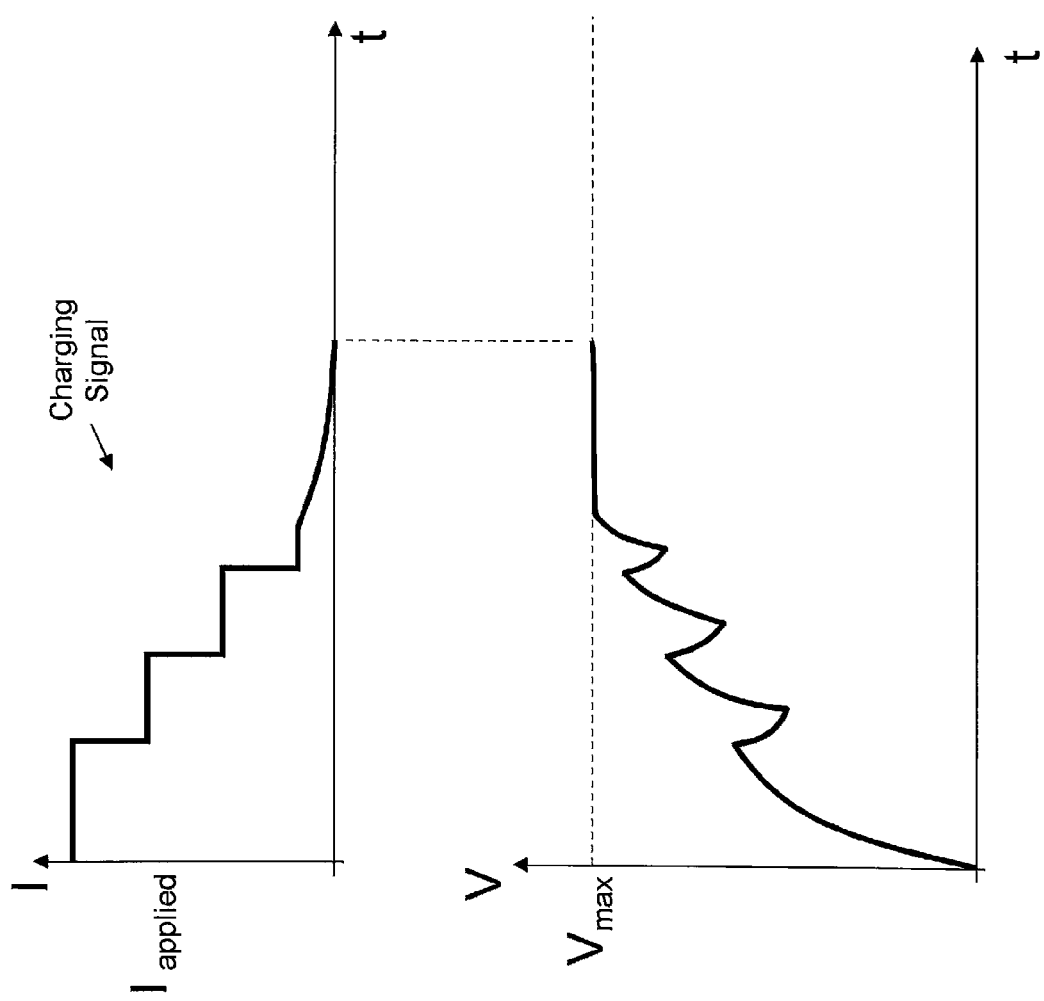
FIG. 2B illustrates current and voltage of a battery/cell as a function of time illustrating a charging method known as step-charging technique; notably, a step-charging process of a rechargeable battery, including a lithium-ion type rechargeable battery, employs a multiple step constant current (CC) charging mode until the terminal voltage of the battery/cell is at about a maximum amplitude (for example, about 4.2V to 4.5V for certain lithium-ion type rechargeable batteries) at which point the charging sequence changes from the constant-current charging mode to a constant-voltage (CV) charging mode, wherein in the CV mode, a constant voltage is applied to the terminals of the battery/cell.
Figure 3A:
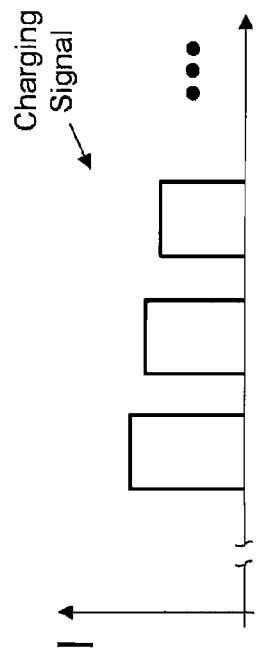
FIGS. 3A-3D illustrate exemplary waveforms illustrating a plurality of exemplary charging signals and discharging signals of an exemplary charging technique, wherein such charging signals may generally decrease according to a predetermined rate and/or pattern (for example, asymptotically, linearly or quadratically) as the terminal voltage of the battery/cell increases during a charging or recharging sequence, operation or cycle (see, FIGS. 3B and 3D); notably, a charging or recharging sequence, operation or cycle may include charging signals (which, in total, inject or apply charge into the battery/cell) and discharging signals (which, in total, remove charge from the battery/cell); moreover, a pulse charging sequence or operation may include a constant voltage (CV) phase after a period of pulse charging and/or upon charging the battery/cell to a predetermined state of charge.
Figure 3B:
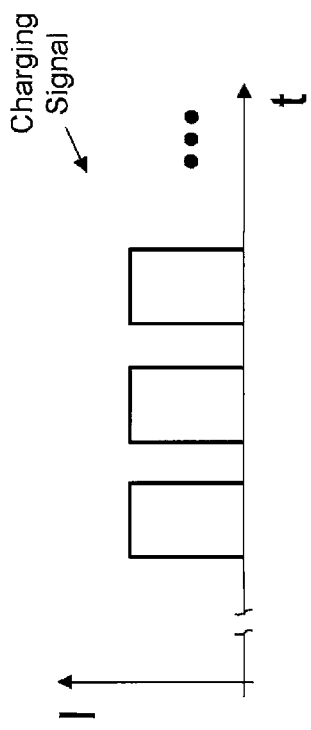
Figure 3C:
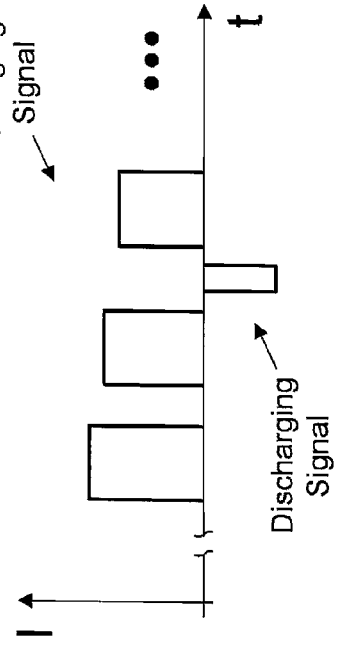
Figure 3D:
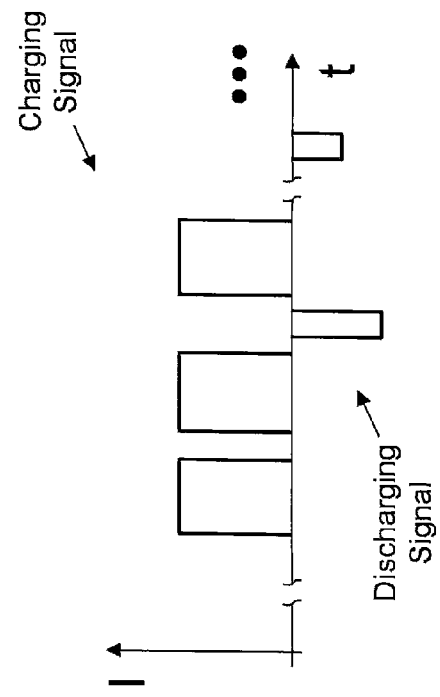
Figure 4A:
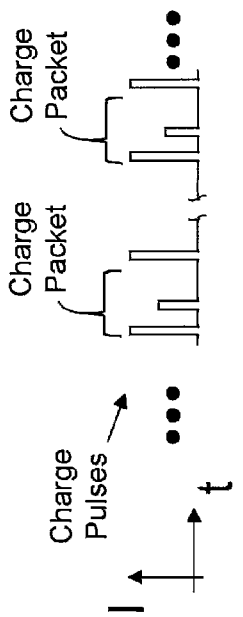
FIGS. 4A-4E illustrate exemplary charge and/or discharge packets of the charging and discharging signals (which are exemplary illustrated in FIGS. 3A-3D), wherein such charge and discharge packets may include one or more charge pulses and one or more discharge pulses; notably, in one embodiment, each charge signal of FIGS. 3A-3D may include a plurality of packets (for example, about 100 to about 50,000 packets) and, in one embodiment, each packet may include a plurality of charge pulses, discharge pulses and rest periods; notably, the pulses may be any shape (for example, rectangular, triangle, sinusoidal or square); in one exemplary embodiment, the charge and/or discharge pulses of the packet may include a temporal duration of between about 1 ms to about 2000 ms, and preferably less than 1000 ms; moreover, as discussed in detail below, one, some or all of the characteristics of the charge and discharge pulses (for example, pulse amplitude, pulse width/duration and pulse shape) are programmable and/or controllable via charging circuitry wherein the amplitude of the positive and/or negative pulses may vary within the packet (and are programmable and/or controllable), the duration and/or timing of the rest periods may vary within the packet (and are programmable and/or controllable) and/or, in addition, such pulses may be equally or unequally spaced within the packet; the combination of charging pulses, discharging pulses and rest periods may be repetitive and thereby forms a packet that may be repeated; all combinations or permutations of pulse, pulse characteristics, periods, packets and signal characteristics and configurations are intended to fall within the scope of the present inventions; notably, such one or more charge pulses and/or one or more discharge pulses (including, for example, pulses of charge and/or discharge packets) may be generated via the controllable switch(es) of the charging circuitry (see, for example, FIGS. 1D-1F, 1I, 1J, and 1M-1R)
Figure 4C:
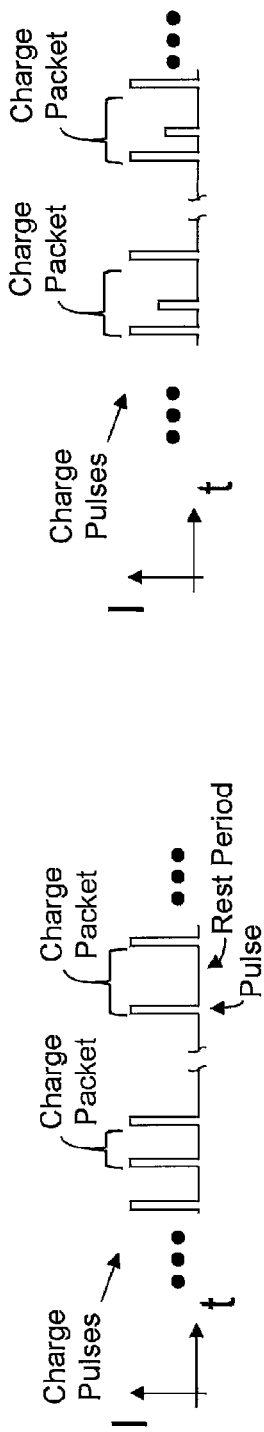
Figure 4B:
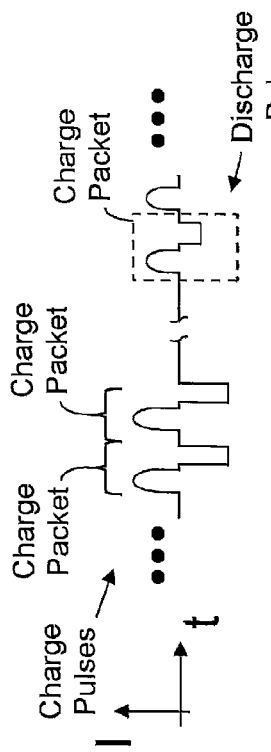
Figure 4D:
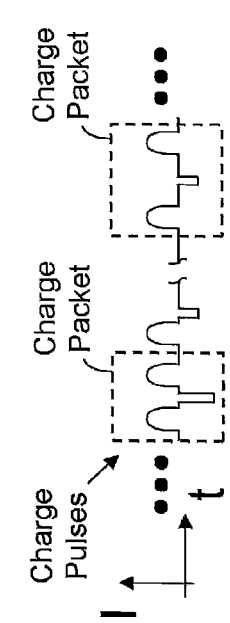
Figure 4E:
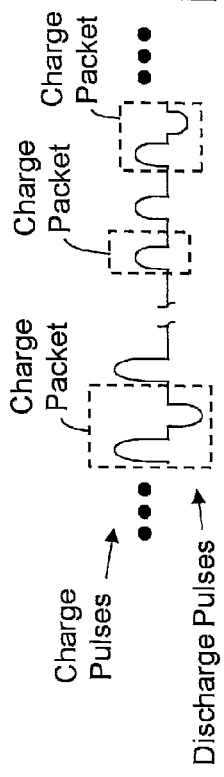
Figure 4G:
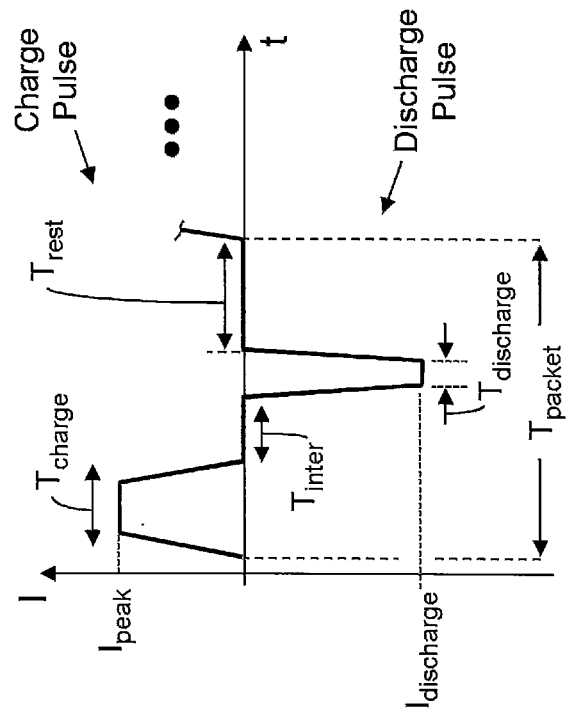
FIG. 4G illustrates an exemplary charge packet having a charge pulse (which injects charge into the battery/cell) and a discharge pulse (which removes charge from the battery/cell) wherein the charge pulse includes a charging period ($T_{charge}$) and the discharge pulse includes a discharging period ($T_{discharge}$), according to certain aspects of the present inventions; notably, in this exemplary charge packet, an intermediate rest period ($T_{inter}$) is disposed between the charge and discharge pulses, and a rest period ($T_{rest}$) is disposed after the discharge pulse and before the next packet; notably, one, some or all of the characteristics of the charge pulses (for example, pulse amplitude, pulse width/duration and pulse shape) are programmable and/or controllable via charging circuitry wherein the amplitude of the positive and/or negative pulses may vary within the packet (and are programmable and/or controllable), the duration and/or timing of the rest periods may vary within the packet (and are programmable and/or controllable) and/or, in addition, such pulses may be equally or unequally spaced within the packet; the combination of charging pulses, discharging pulses and rest periods may be repetitive and thereby forms a packet that may be repeated; all combination or permutations of pulse, pulse characteristics, periods, packets and signal characteristics and configurations are intended to fall within the scope of the present inventions; moreover, discharge packets may have similar characteristics as charge packets except, however, a net charge is removed from the battery/cell; for the sake of brevity, the discussion/illustration with respect to discharge packet will not be repeated.
Figure 4F:
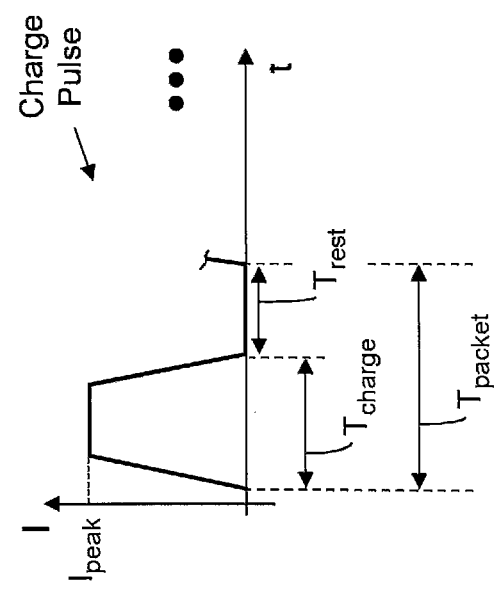
FIG. 4F illustrates an exemplary charge packet having a charge pulse including a charging period ($T_{charge}$) followed by a rest period ($T_{rest}$) wherein the period of the charge packet is identified as $T_{packet}$, according to certain aspects of the present inventions.

With reference to FIGS. 1A-1C, in one embodiment, the system includes charge circuits 12a to responsively and in combination generate a supply voltage and/or current and apply such voltage and/or current to the battery/cell. For example, charge circuits 12a may responsively generate a CCCV charging signal (see, for example, FIG. 2A), a step charging technique (see, for example, FIG. 2B), a pulse charging signal (see, for example, FIGS. 3A-3D), or combination thereof. The charge circuits 12a apply the charge signal to at least two terminals of the battery/cell, Notably, the pulse charging signal may include one or more charging signals (which provide a net input of charge or current into the battery/cell) and one or more discharging signals (which provide a net removal of charge or current from the battery/cell). (See, for example, FIGS. 3C and 3D). Moreover, the charging and discharging signals may include a plurality of charge packets wherein each charge packet includes one or more charge pulses and, in certain embodiments, one or more discharge pulses. The charging and discharging signals may also include one or more discharge packets wherein each discharge packet includes one or more discharge pulses. (See, FIGS. 4A-4E).

In one embodiment, switch(es) 12(b) may be employed by control circuitry 16 to generate such pulses. (See, for example, FIGS. 1D-1F, 1I, 1J and 1M-1R). In operation, control circuitry 16 enables and disables switch(es) 12b, which receive the output of the current source(s) and/or voltage source(s) $12a_x$, to generate the characteristics of the pulses of the pulse charging signal applied to the battery/cell. For example, charge circuits 12a of the present inventions may generate charging and discharging signals, packets and pulses (as described in detail in U.S. patent application Ser. Nos. 13/626,605 and 13/657,841, which applications are incorporated herein by reference in their entirety). The charge circuits 12a are directly or indirectly responsive to control signals from control circuitry 16. Notably, the present inventions may employ any responsive or programmable charge circuits 12a, whether described herein, now known or later developed, to charge the battery/cell; all such charge circuits 12a are intended to fall within the scope of the present inventions. Indeed, other circuitry may be adapted, configured and/or programmed (see, for example, the application processor in FIGS. 7A-7G) to generate and apply control signals to enable and disable switch(es) 12b to provide charging and/or discharging signals having one or more charge and/or discharge packets wherein each charge and/or discharge packet includes one or more charge pulses and/or one or more discharge pulses.

Notably, in certain embodiments, charge circuits 12a may share components. For example, with reference to FIGS. 1M, 1O and 1Q, switch(es) 12b may be shared between a plurality of current/voltage sources $12a_x$. In another embodiment, switch(es) 12b may be dedicated to associated current/voltage sources $12a_x$ (see FIGS. 1N, 1P and 1R).

Figure 1K:
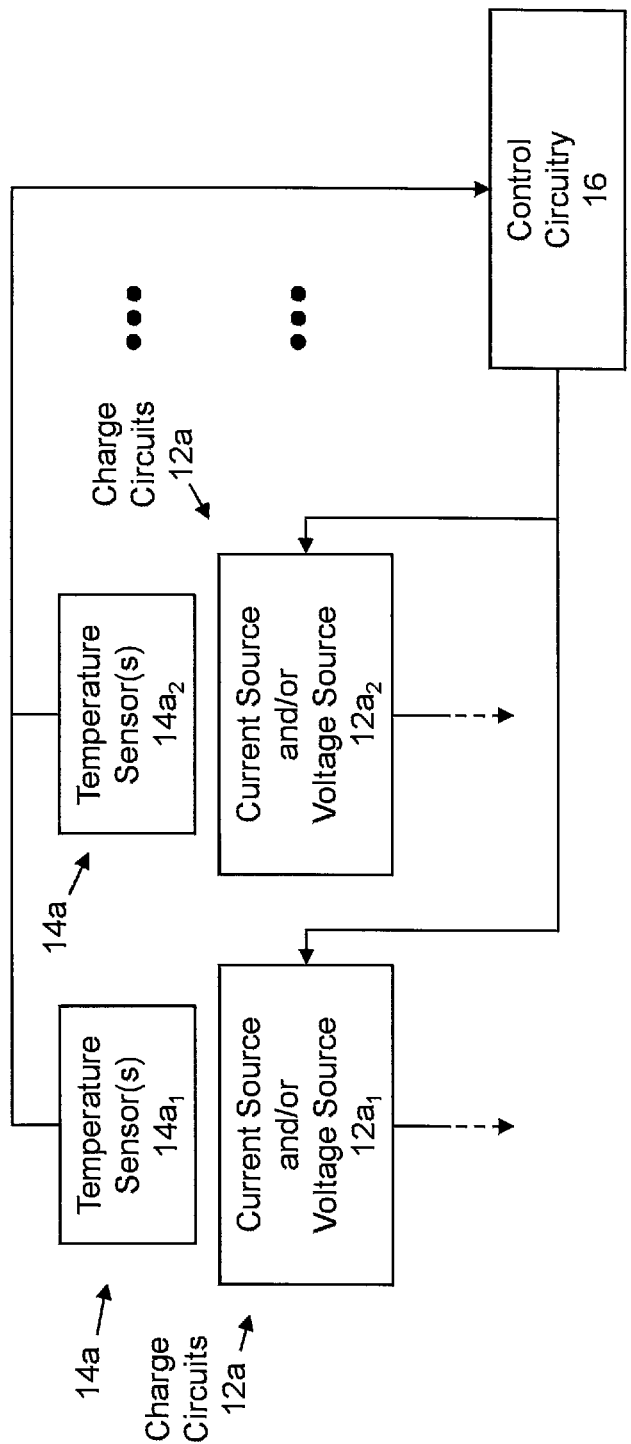
Figure 1L:
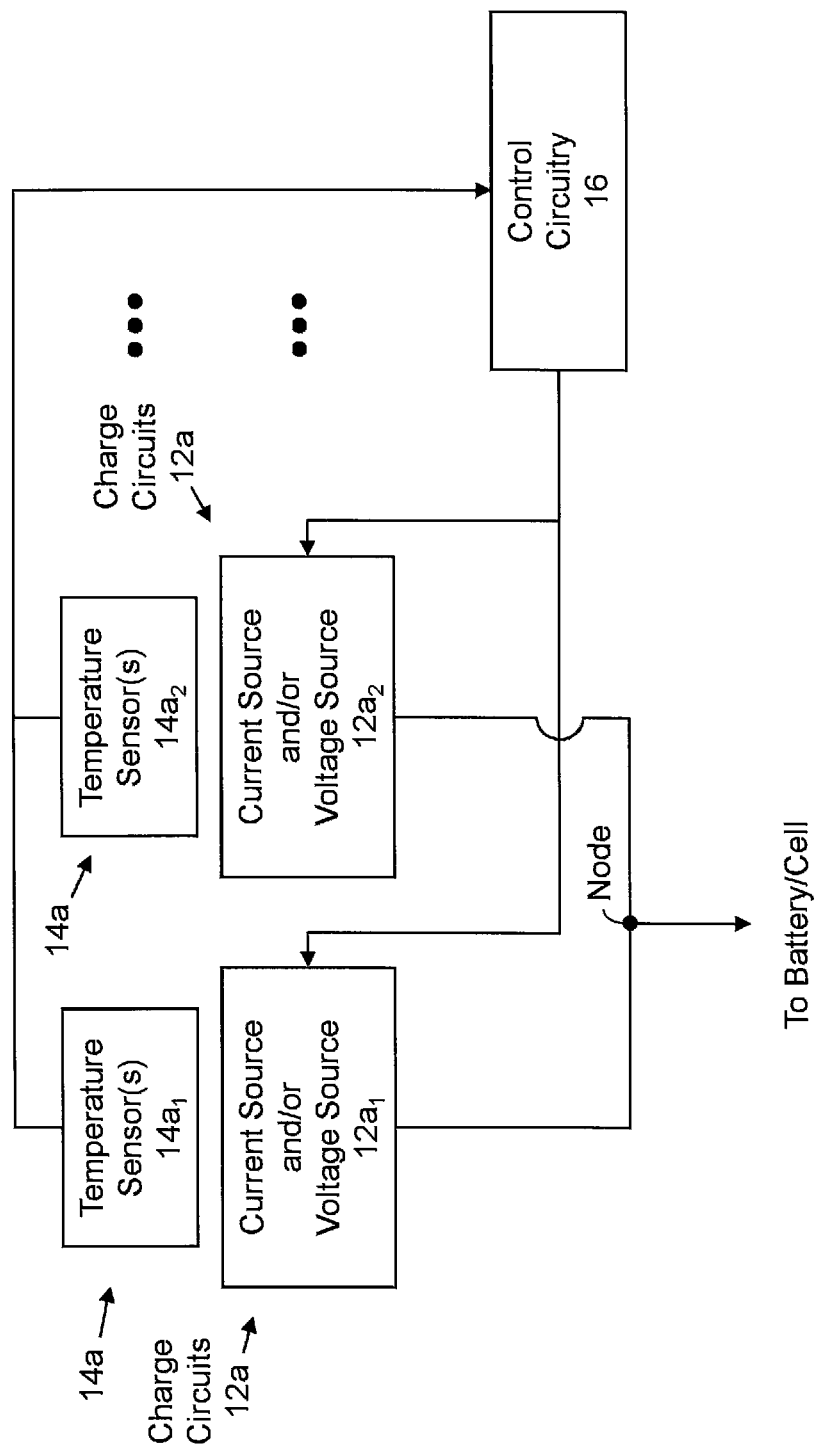
Figure 1M:
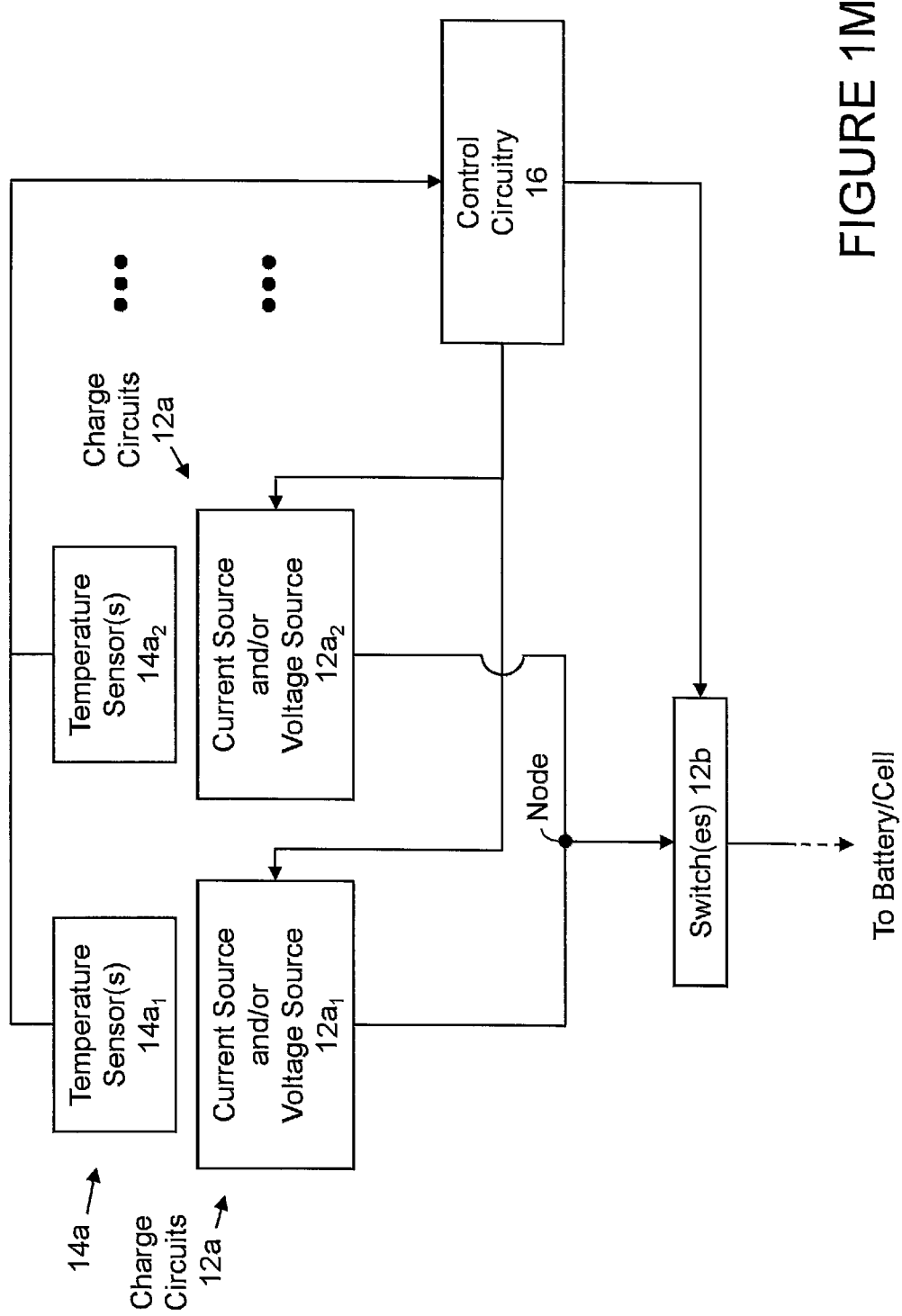
Figure 1N:
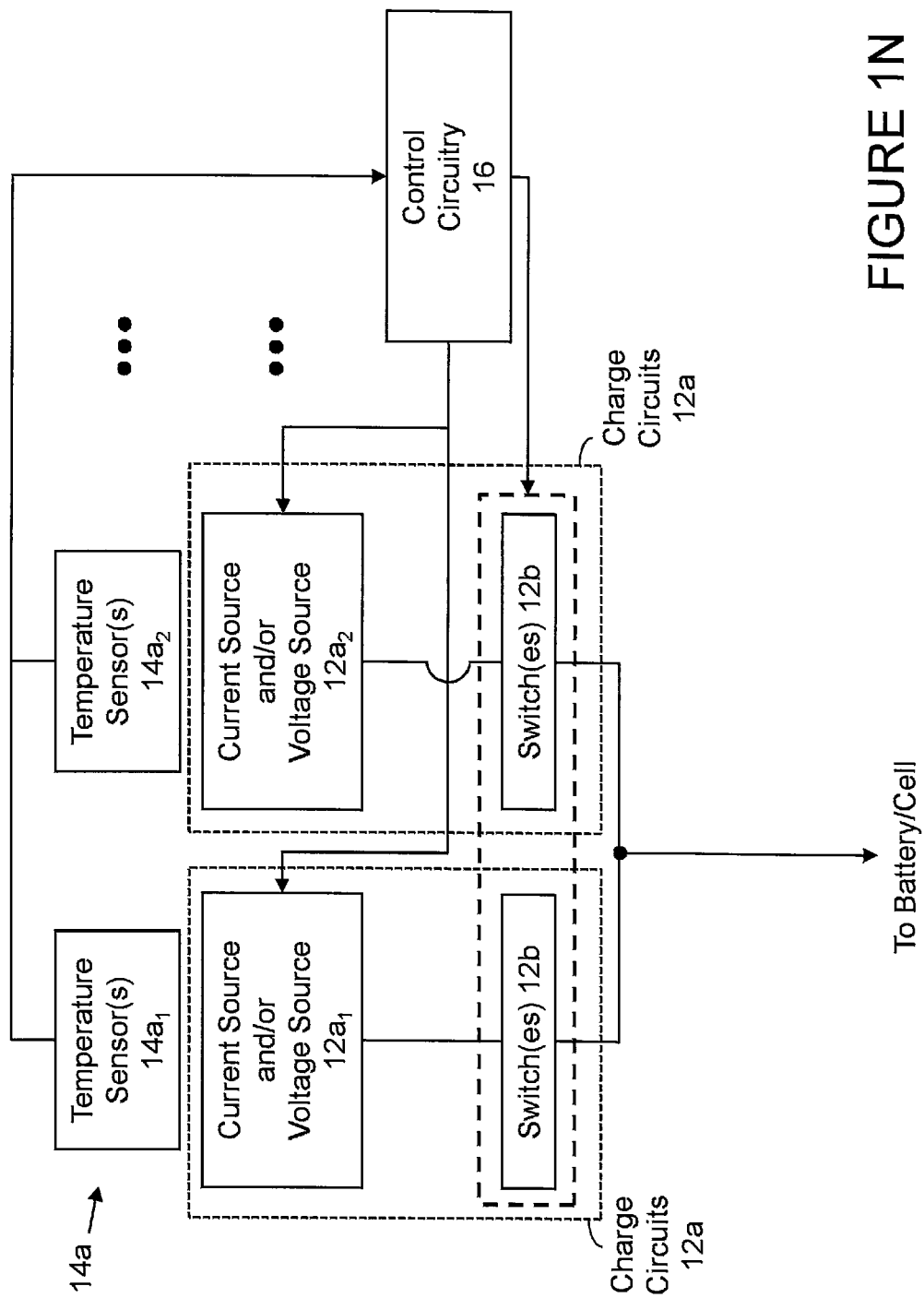
Figure 1P:
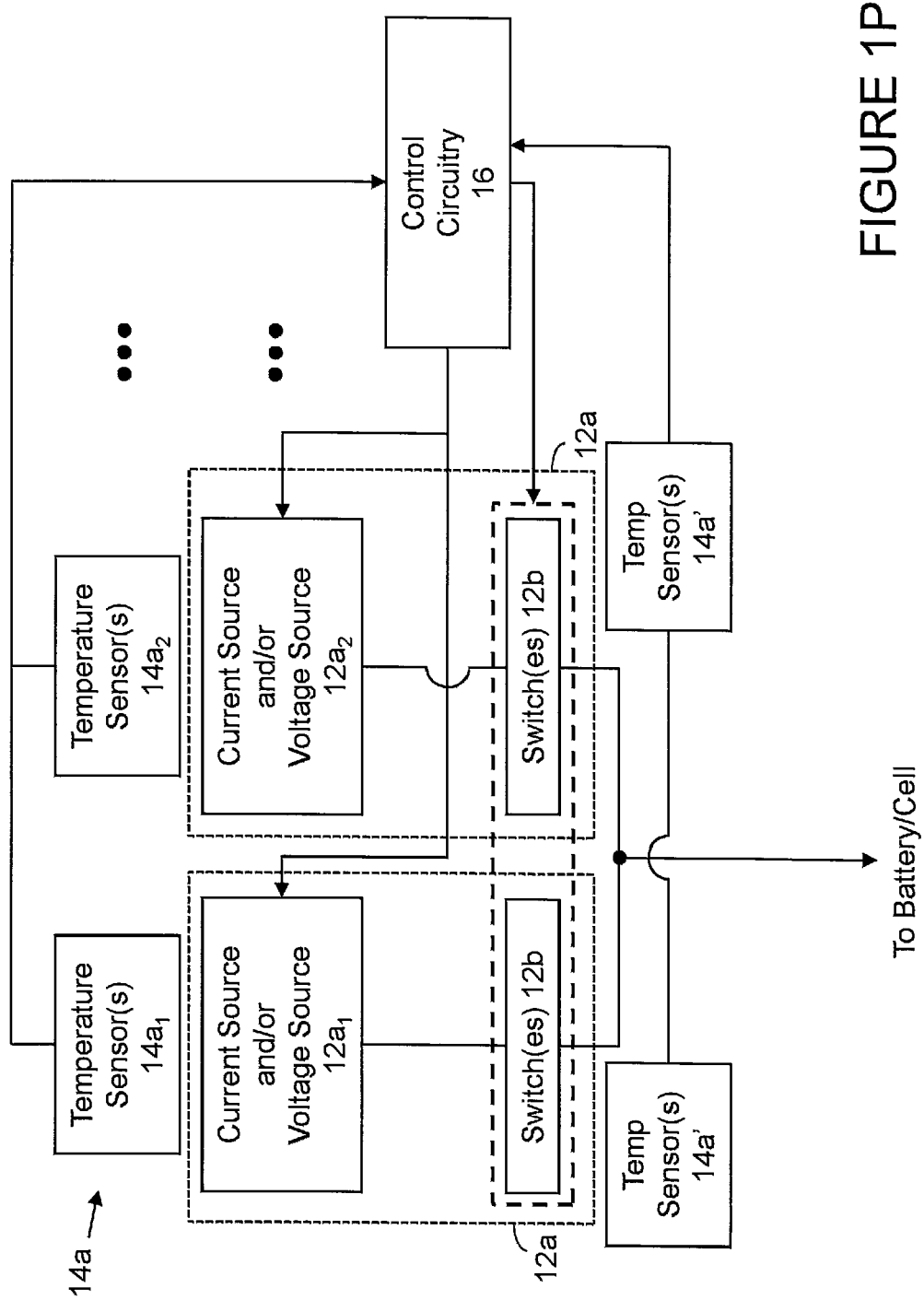
Figure 1Q:
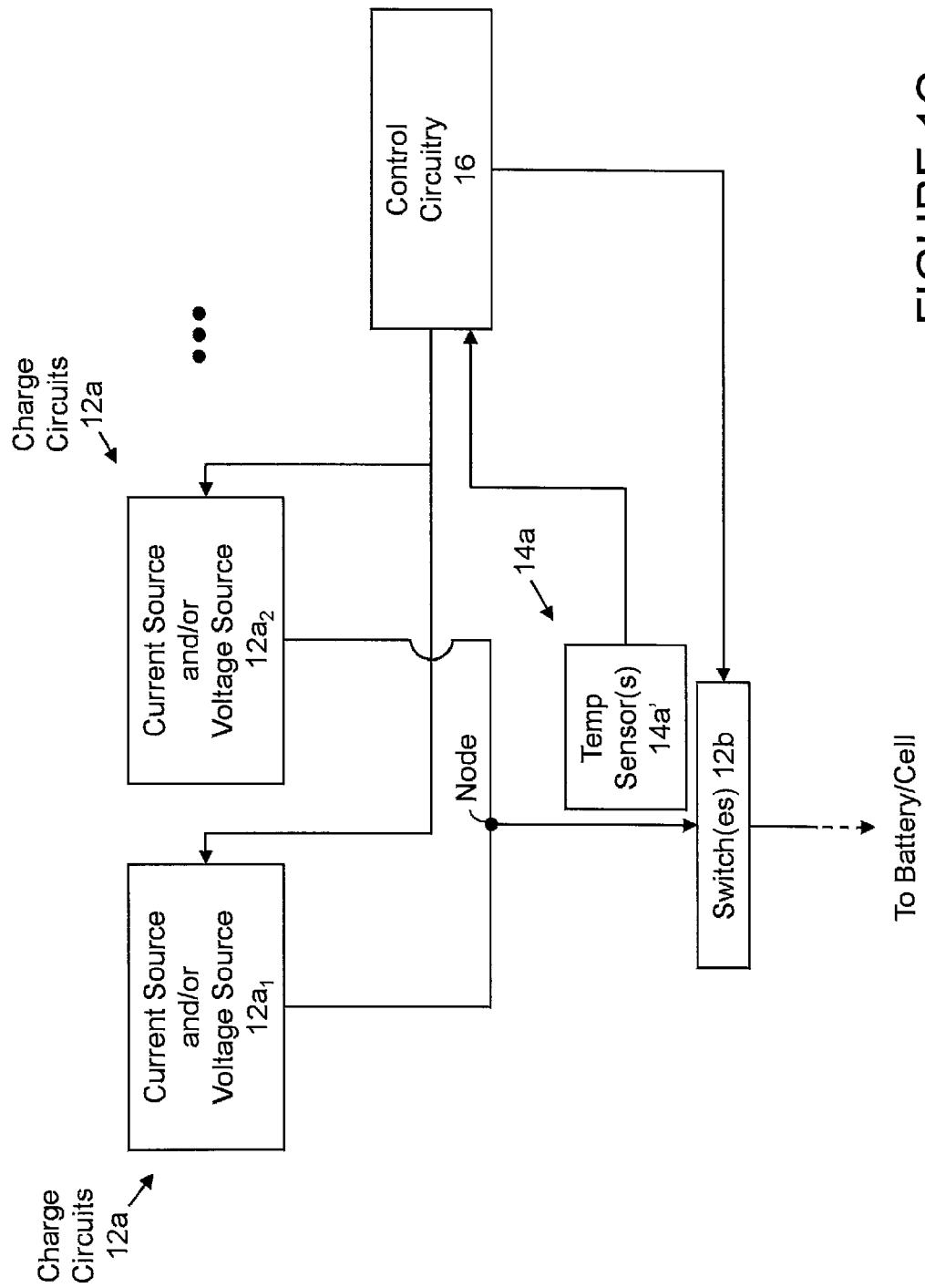
Figure 1R:
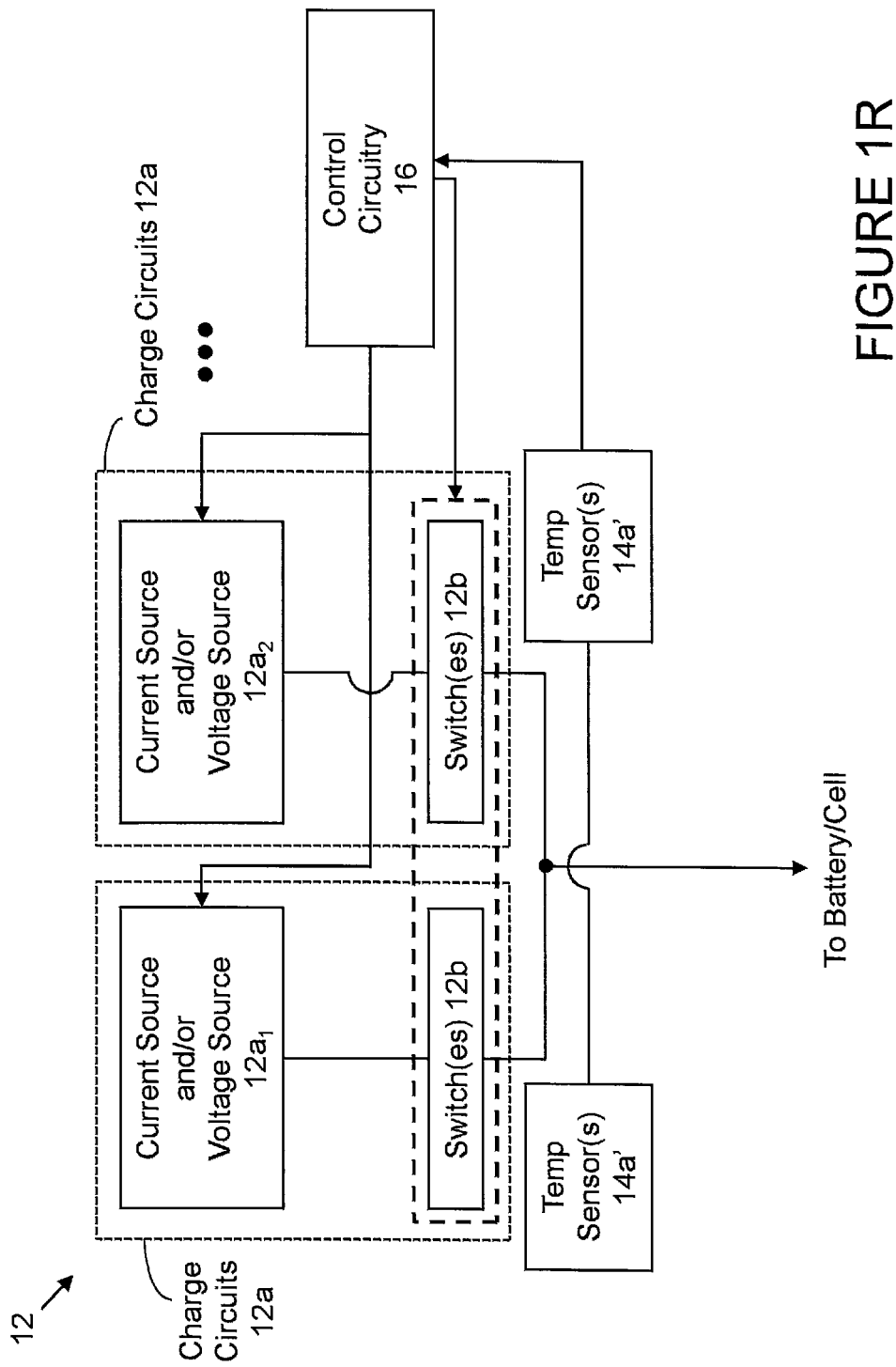

With reference to FIGS. 1A-1R, one or more temperature sensors (identified therein as temperature sensor(s) 14), for example, one or more thermistors, solid-state sensors (for example, proportional to absolute temperature type) and/or thermocouples, are employed to measure or detect the temperature of, for example, one or more (or all) of charge circuits 12a. In one embodiment, one or more of temperature sensors 14 are physically disposed/integrated on and/or in, or fixed to one or more components of charge circuits 12a (see, for example, current/voltage sources $12a_x$ and/or switch(es) 12b) For example, one or more temperature sensors 14 may be physically disposed/integrated on and/or in, or fixed to one or more significant heat generating elements of charging circuit 12a (for example, an inductor and/or resistive element of current/voltage sources $12a_x$) (see, for example, FIGS. 1K and 1L). Further, in those embodiments where charge circuits 12a include current/voltage sources $12a_x$ and switch(es) 12b (for example, in those embodiments that employ/implement a pulse charging technique), one or more temperature sensors 14 may be physically disposed/integrated on and/or in, or fixed to the current/voltage sources $12a_x$ or switch(es) 12b (see FIGS. 1M, 1N, 1Q and 1R), or both charging circuit $12a_x$ and switch(es) 12b (see FIGS. 1O and 1P).

In addition thereto, or in lieu thereof, one or more temperature sensors 14 are disposed/integrated on and/or in or fixed to one or more substrates (for example, a PCB) which is/are in highly correlative thermal communication with charge circuits 12a (for example, one or more elements of current/voltage sources $12a_x$ and/or switch(es) 12b (for example, in those embodiments where the system employs/implements a pulse charging technique)). The charging circuit(s) 12a and one or more temperature sensor(s) 14 may, in addition, be physically coupled to, disposed on and/or fixed to the same structure (for example, a heat sink).

The one or more temperature sensors 14 may also be (i) physically disposed on, affixed to and/or integrated in or with and/or (ii) disposed on a substrate or physically coupled to the same structure as those device(s) or electrical/electronic elements (whether passive or active elements of current/voltage sources $12a_x$ (and/or switch(es) 12b in those embodiment that employ/implement a pulse charging technique)) of charging circuit 12a which are responsible for generating a majority of the thermal energy during use of the charging circuit 12a (for example, during the charging operation of the battery/cell). In this way, one or more temperature sensors 14 detect, generate and/or provide data that is highly correlated with the temperature of charging circuit 12a (or, in one embodiment, one or more components thereof) and, as such, may more accurately reflect, measure, detect and/or monitor an operating temperature of the charging circuit(s).

Further, the one or more temperature sensors 14 may be disposed/integrated on and/or in or fixed to the housing of the electronic or electrical device (which is powered by the battery/cell). In this embodiment, temperature data from such temperature sensors 14 is representative of the temperature of the housing of the electronic or electrical device (for example, a portion of the housing to which the user has physical contact). Such temperature sensors may be in addition to other temperature sensors (for example, temperature sensor(s) which is/are in thermal communication with charge circuits 12a (for example, current/voltage sources $12a_x$) or in lieu of such other temperature sensors. Notably, the discussion of temperature data herein, although often described in the context of the operating temperature of charge circuits 12a, is also applicable to the temperature of the housing.

For the sake of brevity, at times, the operation of the present inventions in the context of the temperature of the housing will not be set forth in detail—but such embodiments, except for the fact that the temperature data is representative of one or more (or all) of charge circuits 12a) are similar to those embodiments that employ the operating temperature of charge circuits 12a. For example, the control circuitry may evaluate whether the data which is representative of the temperature(s) of the housing is out-of-specification (such temperature data is/are greater than a first predetermined value (for example, an upper limit), less than a second predetermined value (for example, a lower limit), outside of one or more predetermined ranges and/or differences between the temperature data associated with the two or more locations of the housing exceed one or more predetermined values or ranges); and, in response to such data being out-of-specification, implement modifications to the operation of elements of, for example, charge circuits 12a during the charging operation.

Each temperature sensor 14 may consist of a single component (whether in integrated circuit or discrete form) or a multiplicity of components (whether in integrated circuit form, discrete form or otherwise), which are active and/or passive, and which provide data (whether in digital and/or analog form) which is representative of or correlative to a temperature of, for example, the charging circuitry (or, in one embodiment, one or more components thereof). Any type of temperature sensor now known or later developed is intended to fall within the scope of the present inventions.

With reference to FIGS. 1A-1R, control circuitry 16 is electrically coupled to temperature sensor(s) 14 to receive, sample, obtain and/or acquire temperature data (which may be in analog or digital form) and employ the operating temperature data to calculate, determine and/or assess whether such data is within-specification or out-of-specification. The control circuitry 16 may receive, sample, obtain and/or acquire the temperature data from temperature sensors 14 on an intermittent, continuous and/or periodic basis, and/or in response to a triggerable event (for example, in response to a change in operating conditions of the system and/or one or more (or all) of charge circuits 12*a* (for example, when the voltage and/or current output by charging circuitry 12 changes in response to a change in operating conditions of circuitry of the system and/or in accordance with a change in the operating conditions of one or more (or all) of charge circuits 12*a* implementing a battery/cell charging sequence)).

In these exemplary embodiments, control circuitry 16 determines whether such temperature data is out-of-specification (for example, the temperature data is outside of one or more predetermined ranges). As will be discussed in more detail below, in one embodiment, in the event such data is out-of-specification, control circuitry 16 generates control signals to directly or indirectly control one or more (or all) of charging circuits 12*a* to adjust one or more characteristics of the charging signal applied to the battery/cell so that the temperature data, after adaption of the charge signal via control of the charging circuitry 12, is within-specification. For example, in one embodiment, control circuitry 16 generates control signals to adjust or change one or more characteristics of the charge signal (for example, the pulse width, amplitude and/or period of the voltage of and/or current applied to the battery/cell during the charging operation) and/or responsively decrease or increase the amplitude of the voltage and/or current output by charging circuitry 12 in view of the temperature data.

The control circuitry 16 may directly or indirectly control charge circuits 12*a* which are both out-of-specification and within-specification. In this regard, control circuitry 16 may, reduce the charge applied to the battery/cell by charging circuit(s) 12*a* which are out-of-specification (for example, reduce the charge applied to the battery/cell by a predetermined percentage—which, in one embodiment, may be determined based on an amount such temperature data is out-of-specification) and increase the charge applied to the battery/cell by charging circuit(s) 12*a* which are within-specification (for example, increase the charge applied to the battery/cell by a predetermined percentage—which, in one embodiment, may be determined based on an amount such temperature data is within-specification). In this way, the impact of charging circuit(s) which are out-of-specification on the charging operation of the battery/cell is reduced, managed and/or controlled via providing or applying a charging signal to the battery/cell which, in the aggregate, is consistent or in accordance with (for example, the same or substantially the same) a predetermined charging signal, sequence or operation.

The control circuitry 16 may also employ operating efficiency characteristics of one or more (or all) of charge circuits 12*a* in determining or controlling operating characteristics to be implemented by such charge circuits. For example, control circuitry 16 may directly or indirectly monitor an operating efficiency of one or more (or all) of charge circuits 12*a*, and control such charge circuits 12*a* to operate at a level or in a range that provides predetermined thermal and operational performance. In this embodiment, control circuitry 16, and techniques implemented thereby, assesses an operating efficiency of one or more (or all) of charge circuits 12*a* in addition to or in lieu of an operating temperature, and, in response to such data being out-of-specification, controls and/or establishes the operating characteristics of such charge circuits 12*a*. Indeed, in one embodiment, control circuitry 16 may allocate or establish an operating condition of a plurality (or all) of charge circuits 12*a* which establishes a load balance or load distribution there between so that such charge circuits 12*a* employ improved, enhanced and/or optimal operating characteristics from efficiency and thermal perspectives. Notably, the relationship(s) between operating efficiency and output charging signal of a charging circuit may be predetermined and stored in, for example, memory accessible to the control circuitry.

Thus, control circuitry 16 may control, provide and/or maintain one or more (or all) of charge circuits 12*a* at or below (one or more) operating temperatures and/or in a range of (one or more) operating temperatures and/or at one or more levels or in one or more ranges of operating efficiency based on or using (i) data which is representative of or correlates to the temperature of one or more (or all) of charge circuits 12*a* and/or the temperature of one or more portions of the housing of the electronic or electrical device and (ii) data which is representative of an operating efficiency of one or more (or all) of charge circuits 12*a*. In this way, control circuitry 16 may determine or establish a load balance or load allocation between the plurality of charge circuits 12*a* to provide a predetermined charging signal to the battery/cell having predetermined characteristics (for example, in the context of a pulse charging operation, a predetermined current pulse amplitude, pulse shape, period and/or duty cycle).

The operating temperature and efficiency range(s) and/or value(s) may be stored in discrete, integrated and/or embedded memory (for example, during manufacture, test and/or calibration). Indeed, predetermined range(s) and limit(s) may be stored in any memory now known or later developed; all of which are intended to fall within the scope of the present inventions. For example, the memory may be a permanent, semi-permanent or temporary memory (for example, until re-programmed). In one embodiment, the memory may be one-time programmable, and/or the data, equations, relationships, database and/or look-up table of the predetermined range(s) may be stored in a one-time programmable memory (for example, programmed during test or at manufacture). In another embodiment, the memory is more than one-time programmable and, as such, the predetermined range(s) and/or limit(s) may be updated, written, re-written and/or modified after initial storage (for example, after test and/or manufacture) via external or internal circuitry.

Notably, the range(s), relationship(s) and/or value(s) may be adjusted and/or changed, for example, after manufacture, test and/or calibration, at any time—for example, dynamically or during normal operation (in situ) or during charging operation. Such adjustments or changes to the range(s), relationship(s) and/or value(s) may be made locally (for example, by the user) or globally (for example, remotely from a central system/locale which "broadcasts" the information to multiple devices/systems (for example, a geographic region having the same or similar climate)). Moreover, such modifications may be implemented manually or automatically by, for example, the user or central system/locale.

Indeed, in another embodiment, the predetermined range(s), relationship(s) and/or value(s) may depend or change based on, for example, a condition or state of the battery/cell and/or response of the battery/cell to the charging processes. For example, the predetermined range may depend on one or more parameters of the battery/cell including, for example, the state of charge (SOC) and/or state of health (SOH) of the battery. Here, the circuitry and/or techniques of the present inventions may adjust, change and/or adapt the predetermined range(s) employed to determine whether temperature data is out-of-specification based on or using data which is representative of the SOC of the battery/cell and/or SOH of the battery/cell.

Briefly, the SOC of a battery/cell, for example, a lithium-ion rechargeable battery/cell, is a parameter that is representative of and/or indicates the level of electrical charge available in the battery/cell. It may be characterized as a percentage of the nominal full charge rating of the battery/cell, wherein a 100% SOC indicates that a battery/cell is fully charged and a 0% indicates that the battery/cell is fully discharged. The SOC of the battery/cell may also be characterized as an available charge stored in the battery/cell relative to a maximum available charge stored in the battery/cell—wherein the maximum available charge may change over time as, for example, the battery/cell ages or deteriorates. Further, the SOH of a rechargeable battery/cell (for example, a rechargeable lithium-ion battery/cell, is a parameter that describes, characterizes and/or is representative of the "age" of the battery/cell, the degradation levels of the battery/cell and/or an ability of the battery/cell to hold charge, for example, relative to a given time in operation (for example, the initial time in operation).

As noted above, the memory (not illustrated) may be integrated and/or embedded in other circuitry (for example, control circuitry 16) and/or discrete. The memory may be of any kind or type (for example, EEPROM, MRAM, Flash, DRAM, MRAM and/or SRAM). The memory may store data which is representative of the predetermined ranges/limit(s), equations, and relationships. Such data may be contained in a database and/or look-up table. Such predetermined ranges/limit(s), equations, and relationships, and/or databases and/or look-up tables may be modified, for example, after manufacture, test and/or calibration, at any time—for example, dynamically or during normal operation (in situ) or during charging operation. As noted above, the modifications or changes to the range(s), relationship(s) and/or value(s) may be made locally (for example, by the user) or globally (for example, remotely from a central system/locale which "broadcasts" the information to multiple devices/systems (for example, a geographic region having the same or similar climate)). Moreover, such modifications may be implemented manually or automatically by, for example, the user or central system/locale. Any memory, and configuration, architecture and/or type thereof, may be implemented in the present inventions and intended to fall within the scope of the present inventions.

With reference to FIGS. 1G-1J, the system may also include monitor circuitry 18, electrically coupled to the terminals of the battery/cell, to measure, monitor, sense, detect and/or sample (for example, on an intermittent, continuous and/or periodic basis, and/or in response to a triggerable event (for example, when the voltage and/or current output by charge circuits 12a changes in accordance with a predetermined charging sequence)) one or more conditions or characteristics of the battery/cell (see, for example, U.S. patent application Ser. Nos. 13/626,605 and 13/657,841). In one embodiment, monitor circuitry 18 implements Kelvin-type measurement configurations in that little to no current is employed or required for the monitor circuitry to determine the voltage at the terminals of the battery/cell and the current through the battery/cell. (See, for example, FIG. 1J). The monitor circuitry 18 may consist of a single component (whether in integrated circuit or discrete form) or a multiplicity of components (whether in integrated circuit form, discrete form or otherwise), which are active and/or passive type components, and which are electrically coupled to measure, monitor, sense, detect and/or sample one or more conditions or characteristics of the battery/cell including, for example, (i) the terminal voltage of the battery/cell and/or (ii) current applied to or removed from the battery/cell during the charging operation.

The circuitry of the present inventions (and the inventive techniques implemented thereby) may employ any monitor circuitry 18 and/or measuring or monitoring techniques, whether described herein, now known or later developed, to acquire such data; all such monitor circuitry 18 and measuring or monitoring techniques are intended to fall within the scope of the present inventions. As mentioned above, monitor circuitry 18 provides data, which is representative of the condition or characteristics of the battery/cell (for example, (i) the terminal voltage of the battery/cell and/or (ii) current applied to or removed from the battery/cell during the charging operation) to control circuitry 16.

Notably, the present inventions may be implemented in conjunction with the inventions and/or embodiments of U.S. patent application Ser. No. 13/747,914. For example, in one embodiment, monitor circuitry 18 is physically disposed on, integrated in and/or fixed to the battery/cell, to implement techniques to measure and monitor the charging operation of a battery/cell—for example, to measure, detect and/or monitor the voltage of and/or current applied to or removed from a battery/cell during the charging operation. In another embodiment, monitor circuitry 18 is physically disposed or integrated on/in one or more substrates which is/are physically disposed on, integrated with and/or fixed to the battery/cell (for example, integrated with the battery/cell which may form, in combination, battery/cell pack). In one embodiment, the substrate (which includes the monitor circuitry) is physically disposed on and/or fixed to the terminals of the battery/cell. In this way, the monitor circuitry may more accurately measure, detect and/or monitor the voltage of and/or current applied to or removed from the battery/cell during the charging operation.

As discussed in detail in U.S. patent application Ser. No. 13/747,914, control circuitry 16 may also be physically disposed on, integrated in and/or fixed to the battery/cell. In one embodiment, control circuitry 16 and monitor circuitry are disposed on or integrated in one or more substrates, and preferably on the same substrate, which is/are physically disposed on, integrated in and/or fixed to the battery/cell. For example, control circuitry 16 (which may consist of discrete and/or integrated circuits) in one embodiment, may be juxtaposed portions of monitor circuit 18 (which also may consist of discrete and/or integrated circuits) on the substrate. Here, control circuitry 16 receives voltage and/or current feedback data from monitor circuitry 18 and, in response thereto, determines whether such data is within-specification or out-of-specification, and if out-of-specification, generates instructions or control signals to directly or indirectly control charge circuits 12a and thereby adjust the voltage of and/or current applied to or removed from the battery/cell during the charging operation.

The charge circuits 12a (or portions thereof) may also be disposed on, integrated in and/or fixed to the battery/cell (for example, via one or more substrates). In one embodiment, all or substantially all of charge circuits 12a are physically disposed on, integrated in and/or fixed to the battery/cell. In another embodiment, a certain portion of charge circuits 12a (for example, controllable switch(es) 12b—in those embodiments that, for example, employ a pulse charging process) is physically disposed on, integrated in and/or fixed to the battery/cell. Notably, in certain embodiments none of charging circuitry 12 is physically disposed on, integrated in and/or fixed to the battery/cell. Again, the present inventions may be implemented in conjunction with the inventions and/or embodiments of U.S. patent application Ser. No. 13/747,914—which is incorporated by reference herein in its entirety.

Figure 1S:
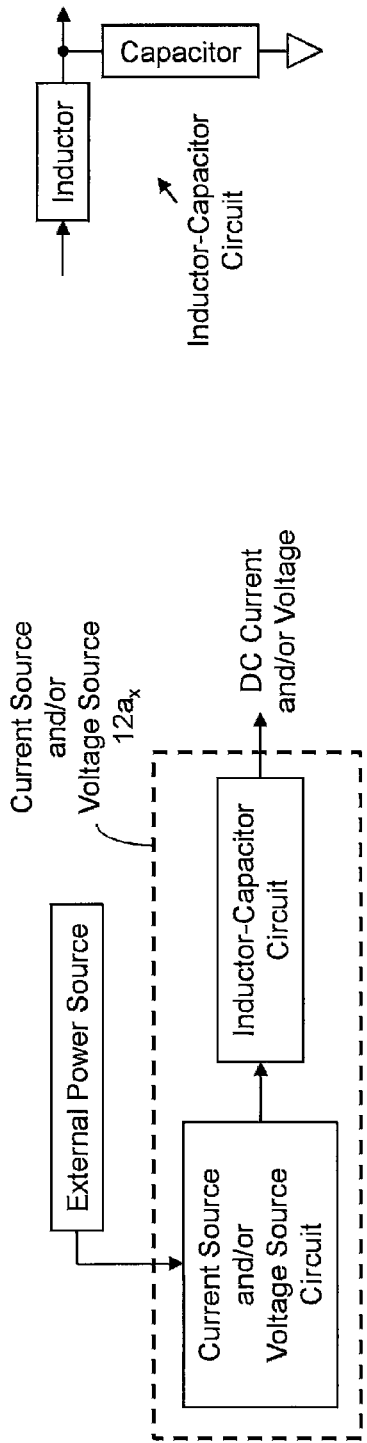
FIG. 1S illustrates, in block diagram form, an exemplary embodiment of a current source and/or voltage source having a current source and/or voltage source circuit and an inductor-capacitor circuit wherein the current source and/or voltage source circuit is electrically coupled to an external power source (for example, via wires and suitable plug/connector) and the output of the inductor-capacitor circuit is a substantially DC current and/or voltage; also illustrated is an exemplary embodiment of an inductor-capacitor circuit including an inductor and a capacitor; notably, these exemplary embodiments may be employed in any of the embodiments of the charge circuits described and/or illustrated herein.

Notably, with reference to FIG. 1S, in one exemplary embodiment, current source and/or voltage source $12a_x$ includes at least one current source and/or voltage source circuit and at least one inductor-capacitor circuit wherein the output of the inductor-capacitor circuit is a substantially DC current and/or voltage. In one exemplary embodiment, the inductor-capacitor circuit includes one or more inductors and one or more capacitors arranged in a low pass filter configuration (albeit in the exemplary illustrative embodiment, only one inductor and one capacitor are illustrated; more than one inductor and more than one capacitor may be employed as well as active elements as well—indeed, all configurations to generate a DC current and/or voltage are intended to fall within the scope of the present inventions). Here, current source and/or voltage source $12a_x$ receives power from an external power source (for example, in the U.S., a 110V AC signal (from a typical wall outlet) and generates a substantially DC current and/or voltage for use in charging a battery/cell. For the avoidance of doubt, this exemplary embodiment of current source and/or voltage source $12a_x$ may be employed in any of the embodiments of the charge circuits described and/or illustrated herein—including, for example, FIGS. 1A-1R.

Moreover, the plurality of charge circuits may be disposed on a substrate and physically located, spaced and/or arranged so that during a recharging operation, one or more temperatures of the housing, substrate and/or charge circuits does not exceed a predetermined level or range (for example, exceed such temperature for a predetermined amount of time). In one embodiment, the charge circuits (or selected elements thereof, for example, the inductor associated with each charging circuit), are suitably located, spaced and/or arranged from each other so that the temperature of, for example, the housing (which is typically in contact with the user) of the electronic device, does not exceed a predetermined level or range. Again, this consideration may be temporally based as well. In this way, the thermal profile of the plurality charging circuit architecture, during a charging operation, does not exceed a predetermined level or range (for example, for a given amount of time).

Figure 1T:
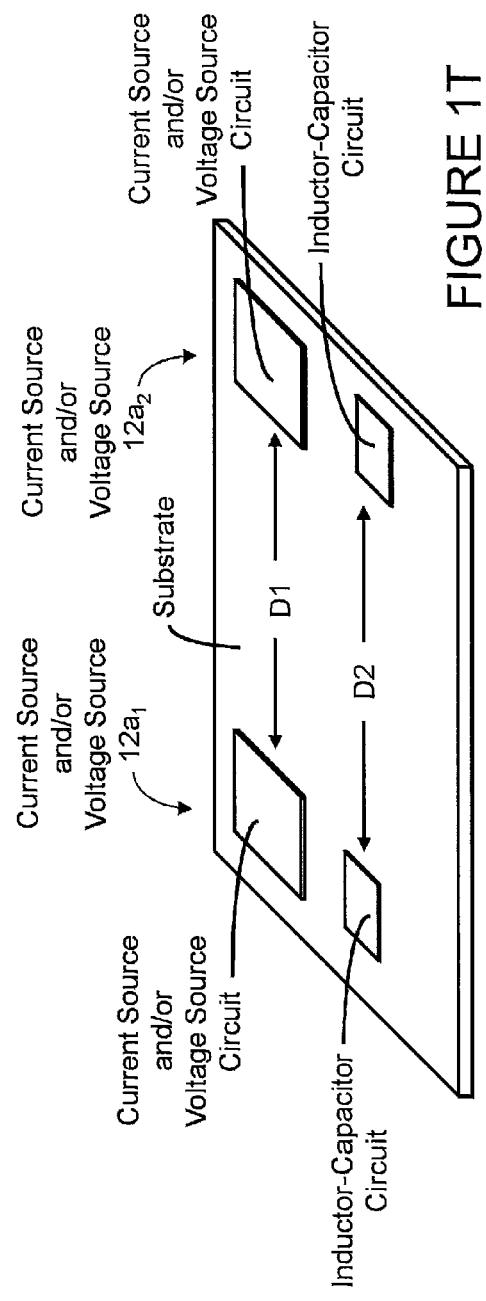
FIG. 1T illustrates a three dimensional block diagram view of an exemplary layout of an exemplary embodiment of the charging circuitry which includes two charge circuits each having a current source and/or voltage source circuit and an inductor-capacitor circuit; notably, various elements of the charge circuits may be physically located, spaced and/or arranged so that the thermal output or generation of the elements of the charging circuit do not, in the aggregate, exceed a predetermined level or range (which may be time based or dependent) and/or the thermal profile of the charging circuitry (in total) does not exceed a predetermined level or range; in the illustrative embodiment, a first current source and/or voltage source circuit is located a distance D1 from a second current source and/or voltage source circuit, and a first inductor-capacitor circuit (which is associated with the first current source and/or voltage source circuit) is located a distance D2 from a second inductor-capacitor circuit (which is associated with the second current source and/or voltage source circuit); moreover, the physical spacing may, relative to a single charging circuit configuration, reduce the amount of noise introduced into the system by the charge circuits (for example, the inductor-capacitor circuits of the charging circuits; notably switch(es), control circuitry and/or monitoring circuitry may also be disposed on the substrate; indeed, the temperature sensor(s) may be disposed on the substrate and/or on one or more elements of the charge circuits, for example, the current source and/or voltage source circuit and/or inductor(s) of each inductor-capacitor circuit of each current source and/or voltage source; notably, this exemplary layout may be employed in any of the embodiments of the charge circuits described and/or illustrated herein.

For example, with reference to FIG. 1T, in one exemplary embodiment where the exemplary embodiment of the charging circuitry includes two charge circuits $12a$, the current source and/or voltage source circuit of each current source and/or voltage source $12a_x$ are physically located, spaced and/or arranged a distance D1 apart on a substrate so that, during a charging operation, (i) the thermal output or generation of the circuits (in the aggregate) and/or (ii) the temperature of the substrate and/or the temperature of the housing, is within specification (for example, does not exceed a predetermined level or range (which may be time dependent—for example, does not exceed a predetermined level or range for more than 10-30 seconds)). In this way, the heat generation of the current source and/or voltage source circuits (for example, the inductors), during the charging operation, is partitioned or divided between multiple circuits and each separately spread, dissipated or dispersed on or over the substrate.

In addition thereto, or in lieu thereof, the inductor-capacitor circuits of the current source and/or voltage source $12a_1$ and $12a_2$ may be physically located, spaced and/or arranged a distance D2 apart on a substrate to control or manage the thermal output or generation of circuits (in the aggregate), the temperature of the substrate and/or the temperature of the housing, during a charging operation. Here again, such circuits are physically located, spaced and/or arranged a distance D2 so that any heat generation by such circuits is partitioned or divided and each inductor-capacitor circuit separately spreads, dissipates or disperses heat/energy (which is a lesser amount than in a single circuit configuration) on or over the substrate. In this way, the temperature increase, in the aggregate, caused by the heat generation by the plurality of charge circuits is within specification (for example, the temperature increase during a charging operation does not exceed a predetermined level or range (which may be time dependent (for example, does not exceed a predetermined level or range for more than 30 seconds) during the charging operation.

Although D1 is illustrated as being less than D2, the distance D1 may be greater than or equal to D2.

Notably, the relative physical location, spacing and/or arrangement of other aspects or elements of the charging circuitry may also facilitate and/or control whether the thermal output or generation of the elements of the charging circuitry, temperature of the substrate and/or the temperature of the housing, is within specification. For example, the layout between (i) the current source and/or voltage source circuit and (ii) the associated inductor-capacitor circuit (for example, the inductor(s) thereof) may be significant in managing or controlling the temperature of the charging circuitry, in the aggregate, so that such temperature is within specification (for example, the temperature increase during a charging operation does not exceed a predetermined level or range (which may be time dependent (for example, does not exceed a predetermined level or range for more than 30 seconds) during the charging operation.

Although not illustrated in FIG. 1T, switch(es), control circuitry and/or monitoring circuitry may also be disposed on the substrate; indeed, the temperature sensor(s) may be disposed on the substrate and/or on one or more elements of the charge circuits, for example, the current source and/or voltage source circuit and/or inductor(s) of each inductor-capacitor circuit of each current source and/or voltage source.

With reference to FIGS. 5A and 6A-6C, in operation, control circuitry 16, in one embodiment, may receive the operating temperature data (for example, data which is in analog or digital form) of, for example, one or more (or all) of charge circuits $12a$, and determine, assess and/or evaluate whether such data is out-of-specification. In those instances where control circuitry 16 determines such temperature data is out-of-specification, control circuitry 16 generates control signals and (directly or indirectly) controls or instructs the charge circuits $12a$ to adjust one or more characteristics of the output charging signal thereof.

In one embodiment, control circuitry 16 adapts, controls and/or adjusts one or more operating parameters of one or more (or all) of charge circuits $12a$ so that such circuits $12a$ operate (that is, output current to, for example, the battery/cell and/or components driven by the charging circuitry under those circumstances where components within the charging circuit are driven by another source of power) within-specification (for example, below a maximum allowable operating temperature of, for example, one or more components of the charge circuits (for example, one or more inductors thereof)). In one embodiment, control circuitry 16 controls one or more charge circuits $12a$ so that such charge circuits $12a$ operate in a first operating region (Operating Region A)—which corresponds to a maximum output current of charge circuits $12a$ for all or substantially all temperature data below a maximum allowable operating temperature of, for example, charging circuit 12*a*. In addition thereto, or in lieu thereof, control circuitry 16 may adapt, control and/or adjust one or more operating parameters of charge circuits 12*a* so that charge circuits 12*a* operate in a second operating region (Operating Region B)—which corresponds to an output current of the associated charging circuit 12*a* which is less than a maximum output current and less than, for example, a maximum allowable operating temperature of the associated charging circuit 12*a*.

In another embodiment, control circuitry 16 controls one or more charge circuits 12*a* such that charge circuits 12*a* operate in a third operating region (Operating Region C)—which corresponds to a programmable output current of charge circuits 12*a* that provides (i) an operating temperature of that is within one or more predetermined ranges and/or below one or more predetermined levels and (ii) an operating efficiency that is in one or more predetermined ranges and/or greater than one or more predetermined levels. Notably, it may be advantageous to operate each of the charge circuits 12*a* in Operating Region C to provide or employ enhanced and/or optimal operating characteristics from efficiency and thermal perspective. Indeed, in this way, control circuitry 16 may determine or establish a load balance or load allocation between the plurality of charge circuits 12*a* to provide a charging signal, having predetermined characteristics, to the battery/cell and operate charge circuits 12*a* with characteristics that provide an operating efficiency that is within-specification (for example, that is within a predetermined range or greater than a predetermined level of operating efficiency) and an operating temperature that is within-specification (for example, that is within a predetermined range and/or less than a predetermined level). Moreover such load balance or load allocation between the plurality of charge circuits 12*a* may also provide a charging signal (which consists of the aggregate of the outputs of the plurality of charge circuits 12*a*) that minimizes or reduces the charge time of the charging process of the battery/cell.

Figure 5A:
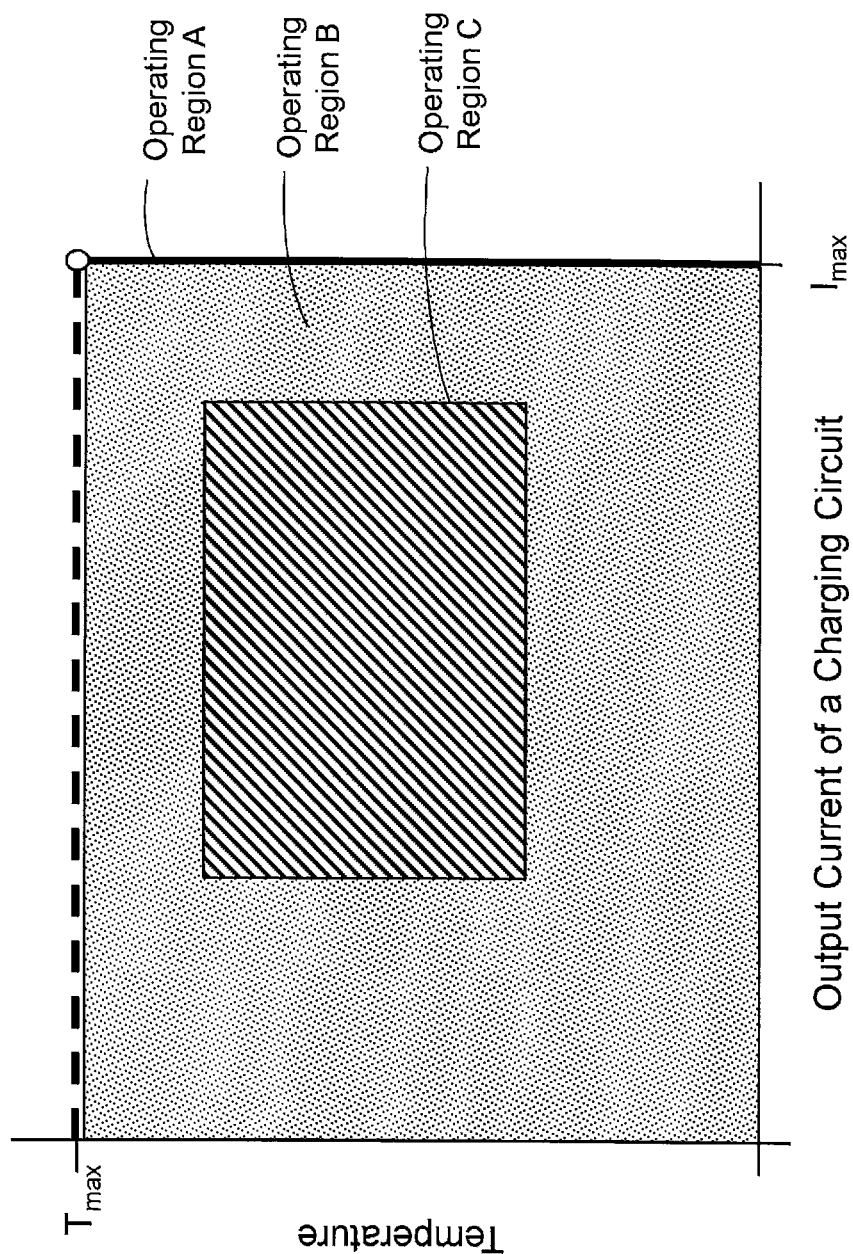
FIG. 5A illustrates an exemplary relationship between an output current of the a charging circuit and temperature (for example, the operating temperature of the charge circuit) wherein in this exemplary relationship, the charge circuit is programmable to operate (that is, output current to, for example, the battery/cell and/or components driven by the charging circuit under those circumstances where the charging circuit is driven by another source of power) below a maximum allowable operating temperature of, for example, charge circuit (wherein such maximum allowable temperature is indicated by a dashed line); also illustrated is (i) a first operating region (Operating Region A) of the charging circuit corresponds to a maximum output current of, for example, the charging circuit for all, substantially all and/or a majority of temperatures below the maximum allowable operating temperature of the charging circuit, (ii) a second operating region (Operating Region B) corresponds to an output current of the charging circuit which is less than a maximum output current and less than the maximum allowable temperature of, for example, the charging circuit, and (iii) a third operating region (Operating Region C) corresponds to an output current of the charging circuit which is within a predetermined temperature range and also provide a predetermined efficiency (for example, the charge circuits to operate at or above a level and/or in a range that provides predetermined operational efficiency performance); notably, it may be preferred to operate the charging circuit(s) in Operating Region C which are within specification in relation to temperature and efficiency and, together with the output of other charging circuit(s) of the charging circuit, generate an aggregate output charging signal which minimizes or reduces the charge time of the charging process of the battery/cell; notably, not all charging techniques seek to reduce and/or minimize the charge time of the charging process which may impact or reduce cycle life of the battery/cell and, as such, it may be advantageous to operate the charging circuit in Operating Regions B and C to increase and/or maximize cycle life of the charging circuit; this notwithstanding, the present inventions are directed to all such techniques whether or not the techniques control or adjust the charging current in view of an operating temperature of the charging circuit(s) to increase or maximize cycle life of the battery and reduce or minimize the amount of time of the charging or recharging process of the battery/cell to a given SOC (for example, 100%)
Figure 5B:
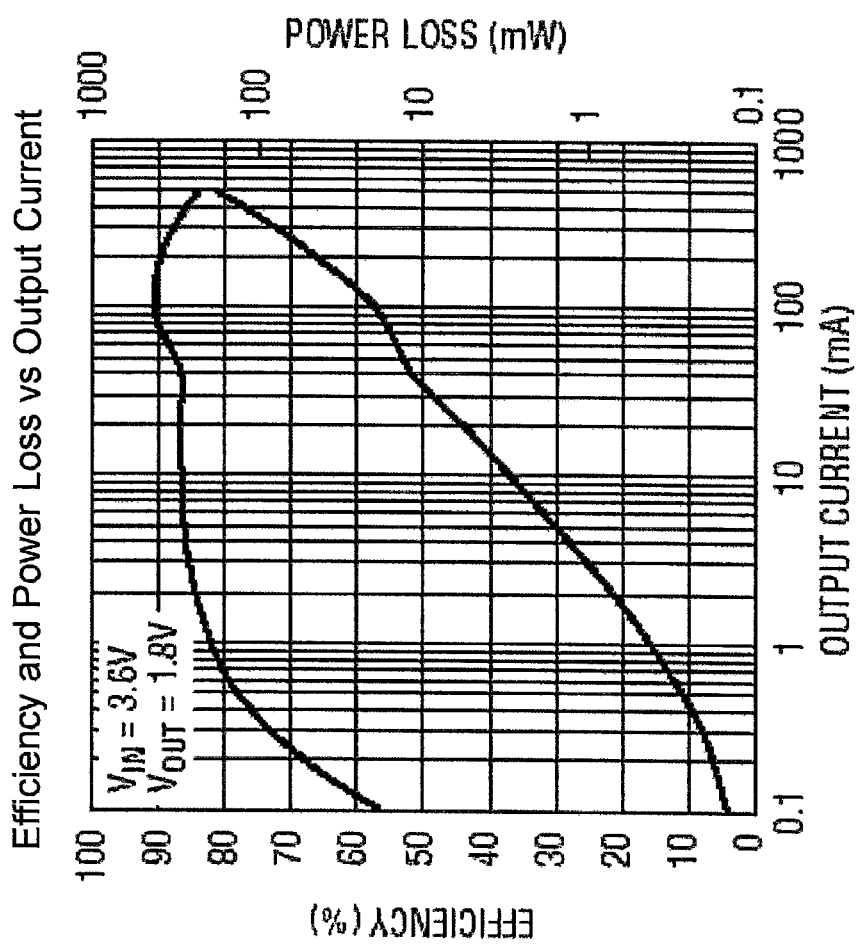
FIG. 5B is an exemplary efficiency and power loss curve/relationship of an exemplary DC-DC converter of an exemplary charging circuit over a logarithmic load range; notably, the scale of the output current range will vary with a given design and circuit based on load range capabilities.
Figure 6A:
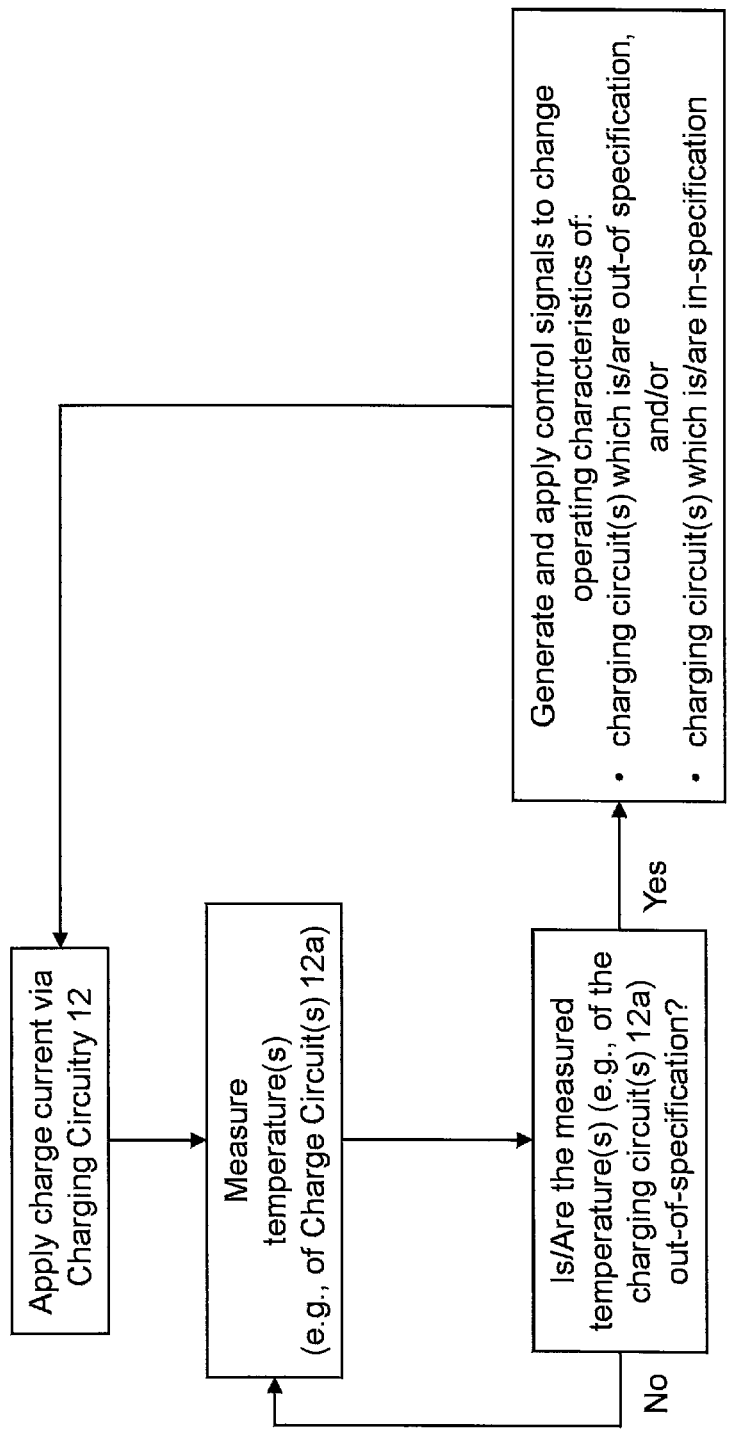
FIGS. 6A-6C are flowcharts of exemplary processes of monitoring and controlling an operating temperature of, for example, charging circuit(s), according to certain aspects of the present inventions, including measuring one or more operating temperatures of one or more (or all) of the charge circuits (for example, via measuring the temperature of one or more regions that are in thermal communication with the charge circuits) and, in response thereto, assess or evaluate the temperature data (including in conjunction with an efficiency of the charging circuit)—for example, determine, assess and/or evaluate whether such data of one or more (or all) of the charge circuits is/are out-of-specification (for example, greater than a first predetermined value (for example, an upper limit of temperature and/or efficiency), less than a second predetermined value (for example, a lower limit of, for example, temperature and/or efficiency), outside one or more predetermined ranges (for example, temperature and/or efficiency) and/or differences between the temperature and/or efficiency data associated with the two or more charge circuits of the charging circuitry exceed one or more predetermined values or ranges); wherein when the temperature data corresponding to the operating temperatures of one or more (or all) of the charge circuits is/are out-of-specification, generating and applying suitable control signals to programmable charging circuit(s) which is/are out-of-specification and/or charging circuit(s) which is/are within-specification (for example, to "compensate" for the reduction in output charge signal of the programmable charging circuit(s) which is/are out-of-specification due to the adjustments thereto); notably, the control signals may be determined or based on or using, for example, operating temperature and/or operating efficiency (for example, operating efficiency versus output current) of the charge circuits; the exemplary process outlined in FIG. 6B describes when the measured temperature(s) is/are within-specification, one or more adjustments may be made to the output current of the charging circuit(s) in order, for example, to increase the output charging current applied to the battery/cell during the charging operation to reduce or minimize an amount of time of the charging or recharging process (for example, reduce the amount of time to charge the battery/cell to a given SOC (for example, 100%); the exemplary process outlined in FIG. 6C describes monitoring and controlling an operating temperature of, for example, charging circuit(s), in conjunction with controlling the output current of the charging circuit(s) wherein when the measured temperature(s) is/are within-specification, one or more adjustments may be made to the output current of the charging circuit(s) (in order, for example, to increase the output current applied to the battery/cell) provided, however, the output current of the charge circuits does not exceed a given output level (for example, a maximum output current to be applied to the battery/cell)
Figure 6B:
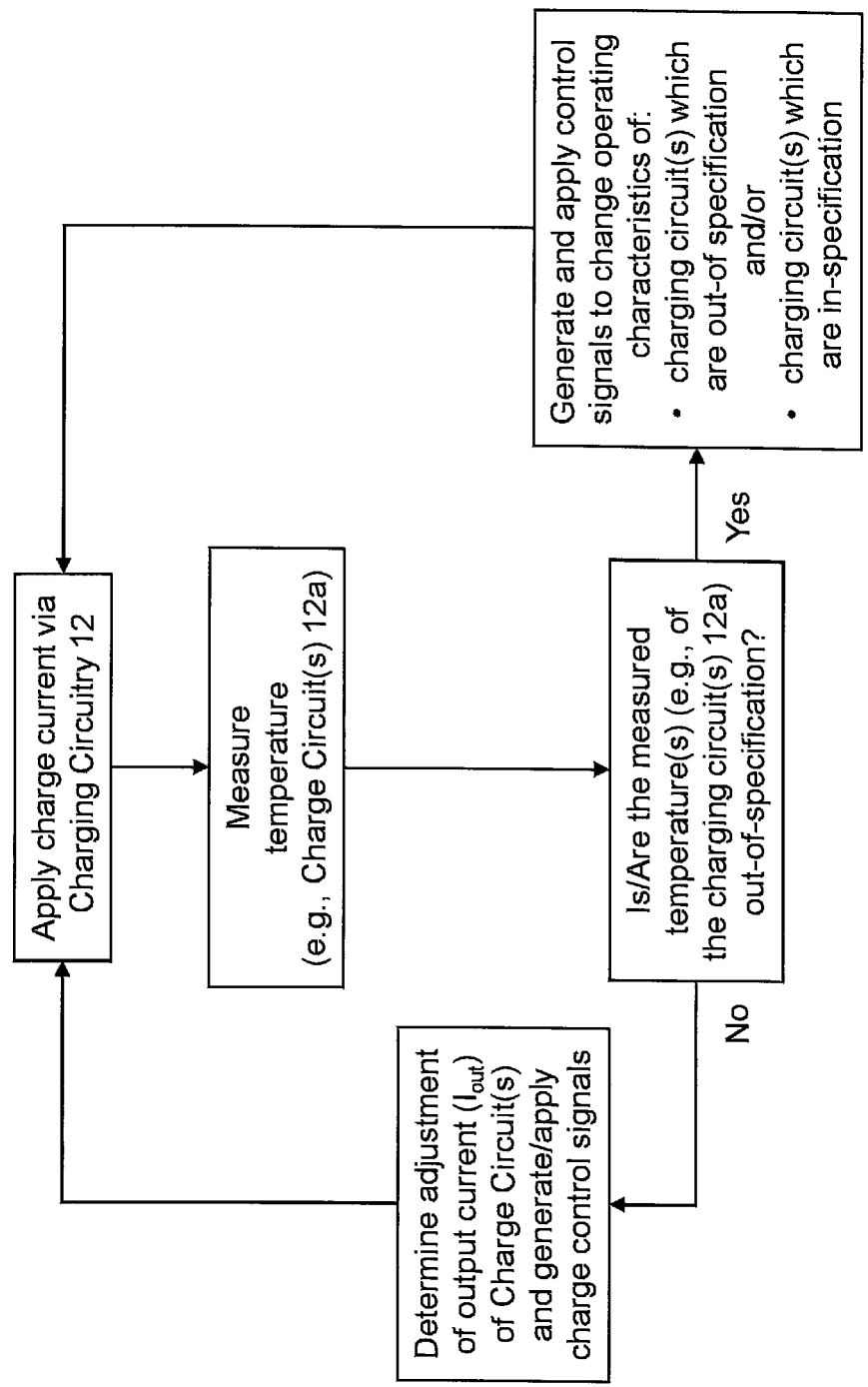
Figure 6C:
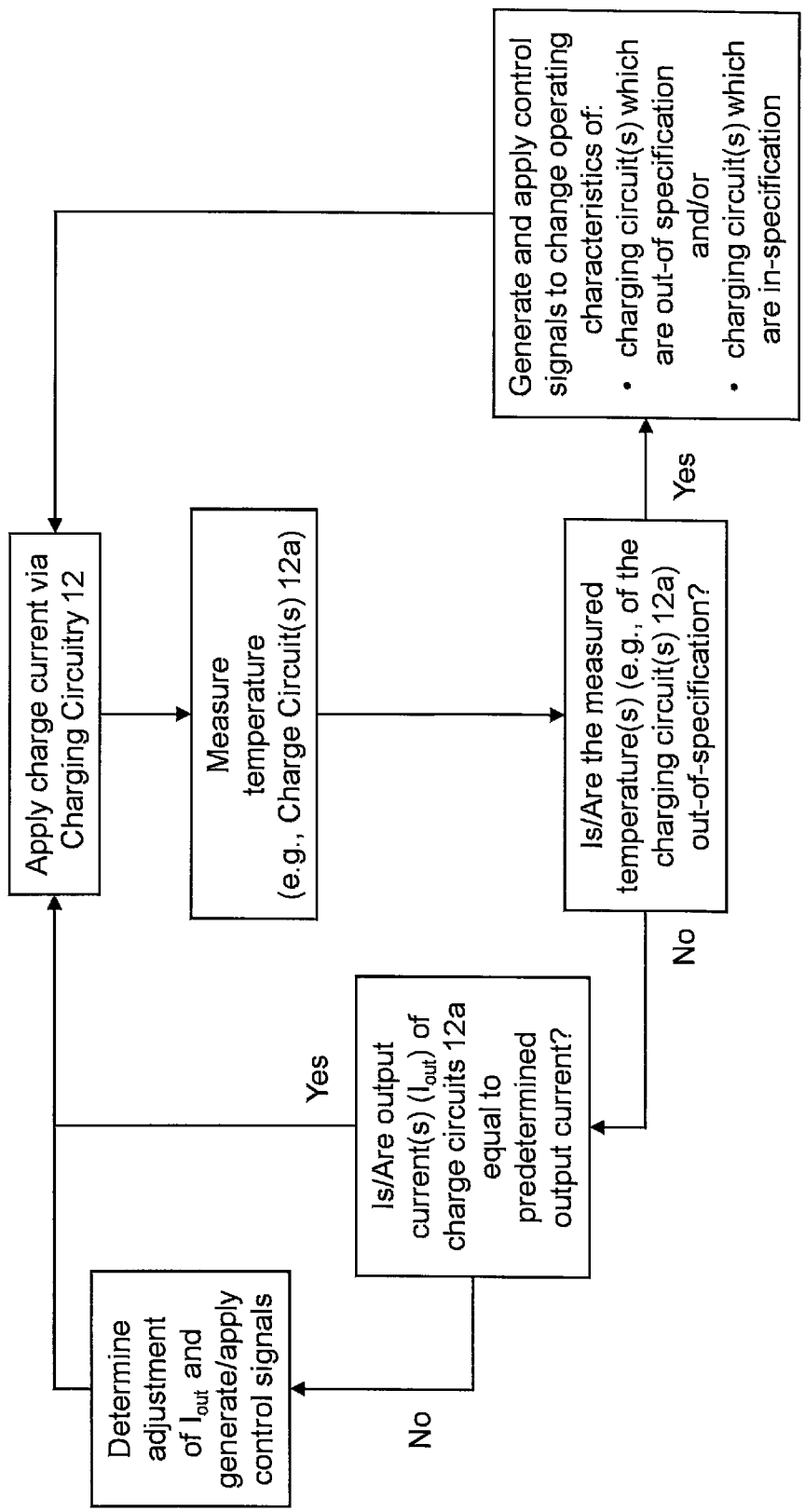
Figure 6D:
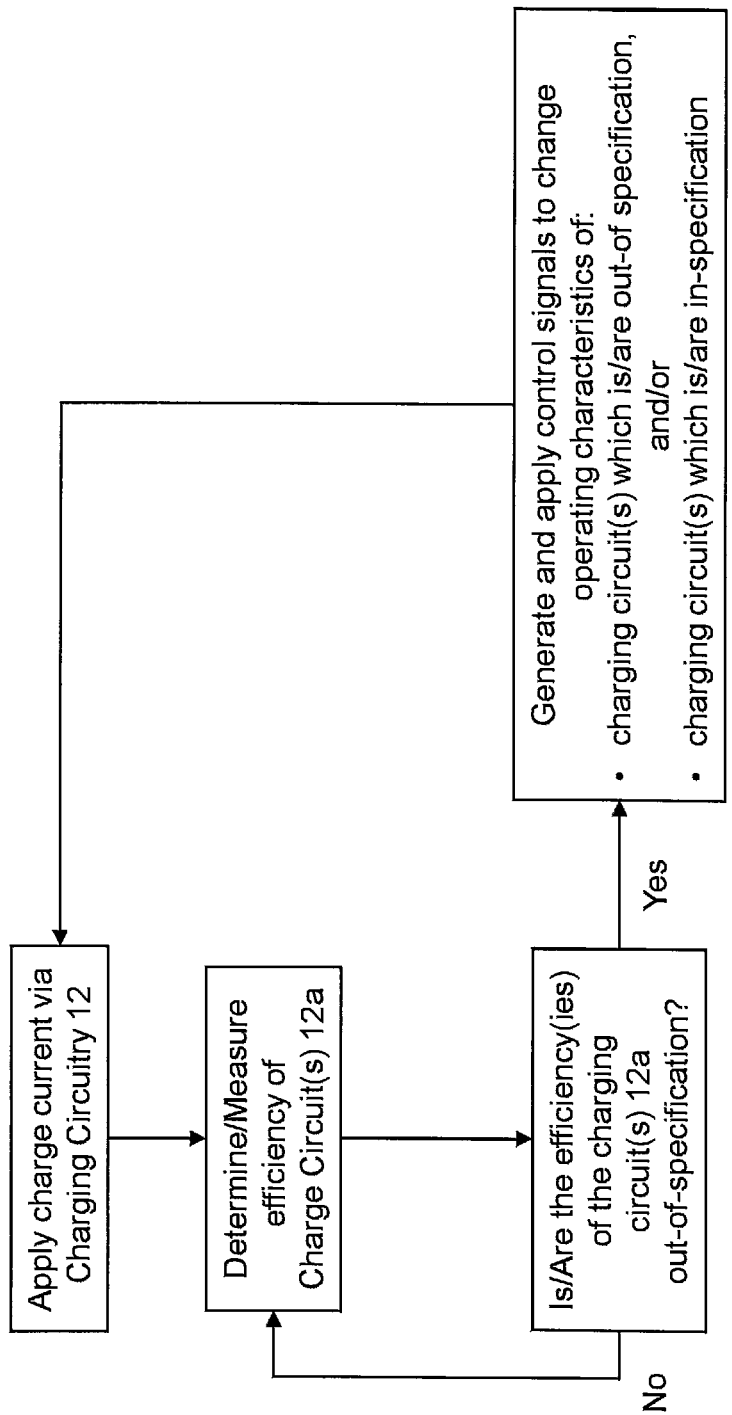
FIGS. 6D-6F are flowcharts of exemplary processes of monitoring and controlling an operating efficiency of, for example, charging circuit(s), according to certain aspects of the present inventions, including determining or measuring one or more operating efficiencies of one or more (or all) of the charge circuits (for example, based on an operating temperature and output signal of each of the charge circuits) and, in response thereto, assess or evaluate the efficiency data (including in conjunction with an operating temperature of the charging circuit and/or the temperature of the housing)—for example, determine, assess and/or evaluate whether such efficiency data of one or more (or all) of the charge circuits is/are out-of-specification (for example, greater than a first predetermined value (for example, an upper limit of efficiency), less than a second predetermined value (for example, a lower limit of efficiency), outside one or more predetermined ranges, and/or differences between the efficiency associated with the two or more charge circuits of the charging circuitry exceed one or more predetermined values or ranges); wherein when the efficiency data corresponding to the operating efficiency of one or more (or all) of the charge circuits is/are out-of-specification, generating and applying suitable control signals to programmable charging circuit(s) which is/are out-of-specification and/or charging circuit(s) which is/are within-specification (for example, to "compensate" for the reduction in output charge signal of the programmable charging circuit(s) which is/are out-of-specification due to the adjustments thereto); notably, the control signals may be determined or based on or using, for example, operating efficiency (for example, operating efficiency versus output current) and/or operating temperature of the charge circuits or housing; the exemplary process outlined in FIG. 6E further describes when the efficiency(ies) is/are within-specification, one or more adjustments may be made to the output current of the charging circuit(s) in order, for example, to increase the output charging current applied to the battery/cell during the charging operation to reduce or minimize an amount of time of the charging or recharging process (for example, reduce the amount of time to charge the battery/cell to a given SOC (for example, 100%); the exemplary process outlined in FIG. 6F further describes monitoring and controlling an efficiency of the charging circuit(s), in conjunction with controlling the output current of the charging circuit(s) wherein when the measured efficiency is/are within-specification, one or more adjustments may be made to the output current of the charging circuit(s) (in order, for example, to increase the output current applied to the battery/cell) provided, however, the output current of the charge circuits does not exceed a given output level (for example, a maximum output current to be applied to the battery/cell); notably, the control circuitry may implement the operations of FIGS. 6D-6F may be employed in conjunction or concurrently with the operations of FIGS. 6A-6C to provide a response that meets both temperature and efficiency considerations or weighted aspects thereof.
Figure 6E:
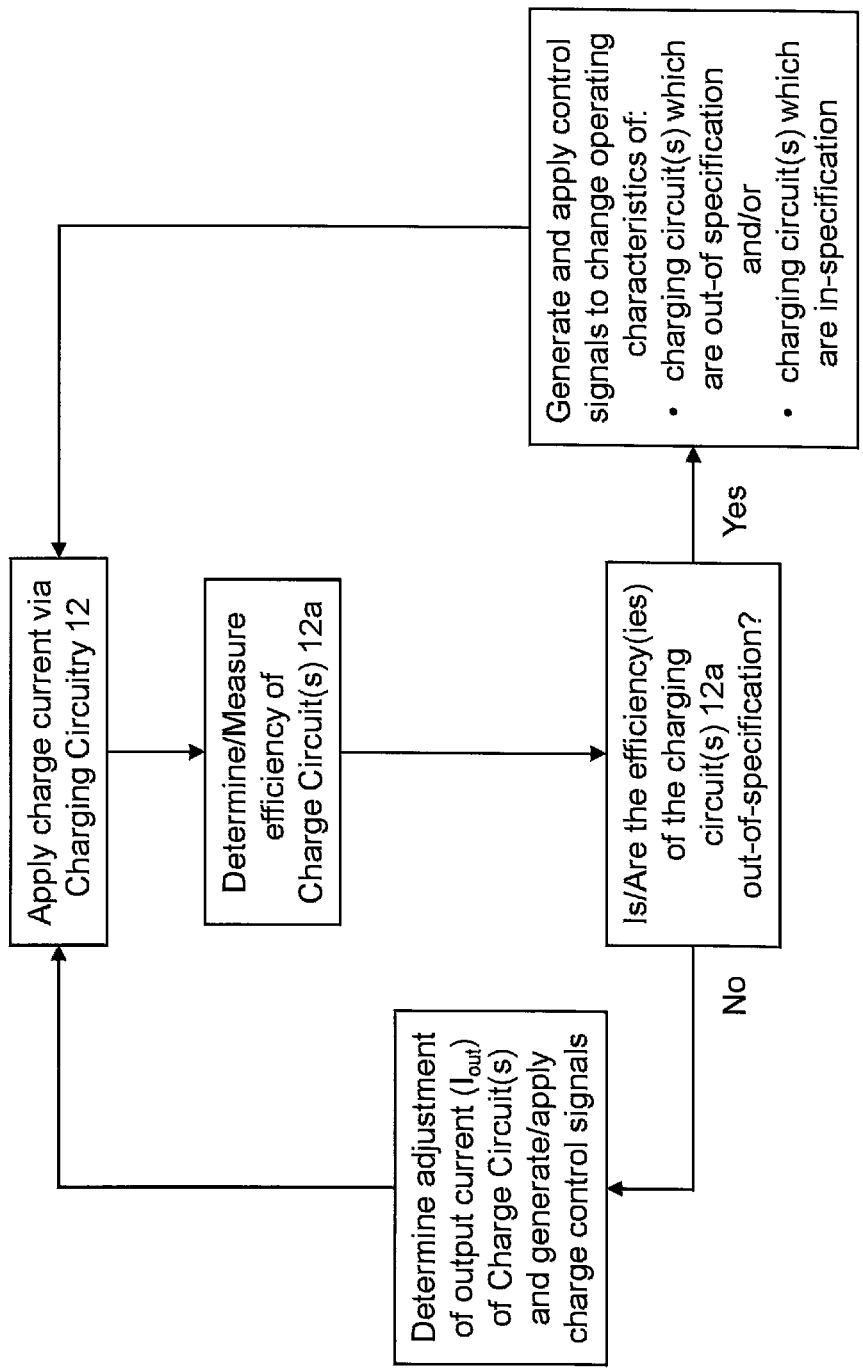
Figure 6F:
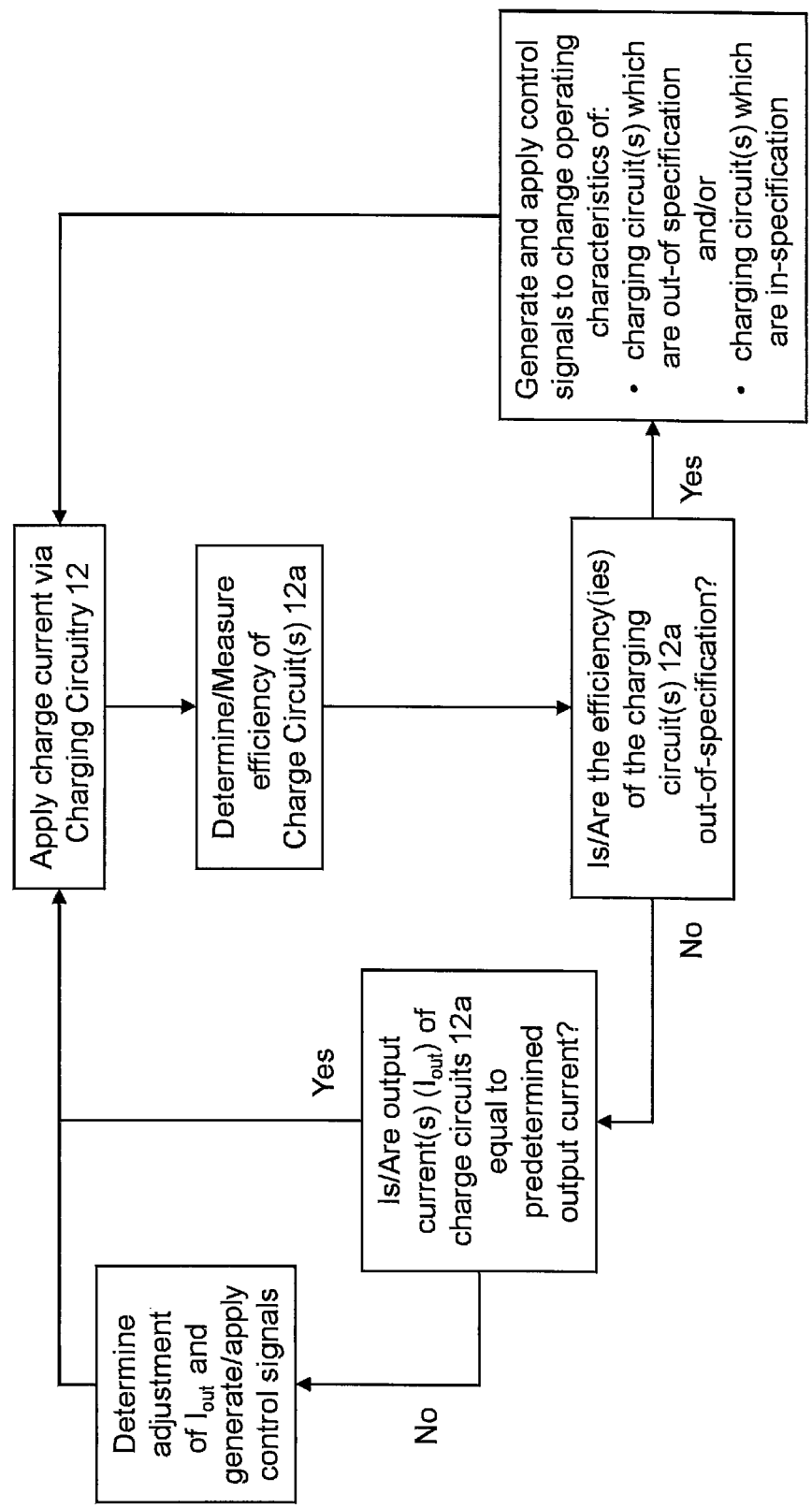
Figure 7A:
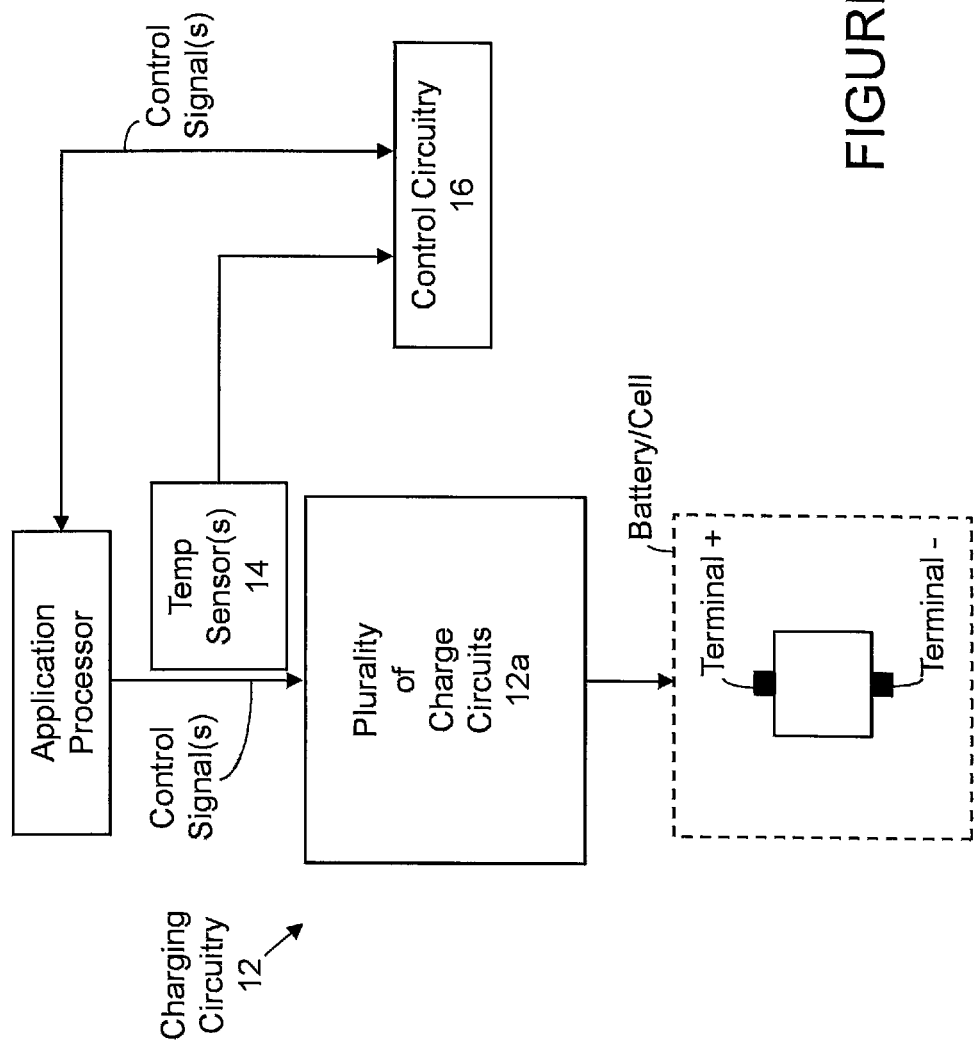
FIGS. 7A and 7B illustrate, in block diagram form, exemplary adaptive charging circuitry (including a plurality of charge circuits), in conjunction with a battery/cell and conventional power management circuitry (illustrated as "application processor"), according to certain aspects of the present inventions, wherein temperature sensor(s) are located in thermal communication with the charging circuitry to generate data which is representative of or correlated to an operating temperature of one or more (or all) of the charge circuits, and wherein the control circuitry employs such data to adapt, adjust and/or control one or more characteristics of the output signal(s) of the charge circuits indirectly via the application processor, for example, when data which is representative of the temperature(s) of the charging circuit(s) is/are out-of-specification during a charging or recharging sequence, operation or cycle.
Figure 7B:
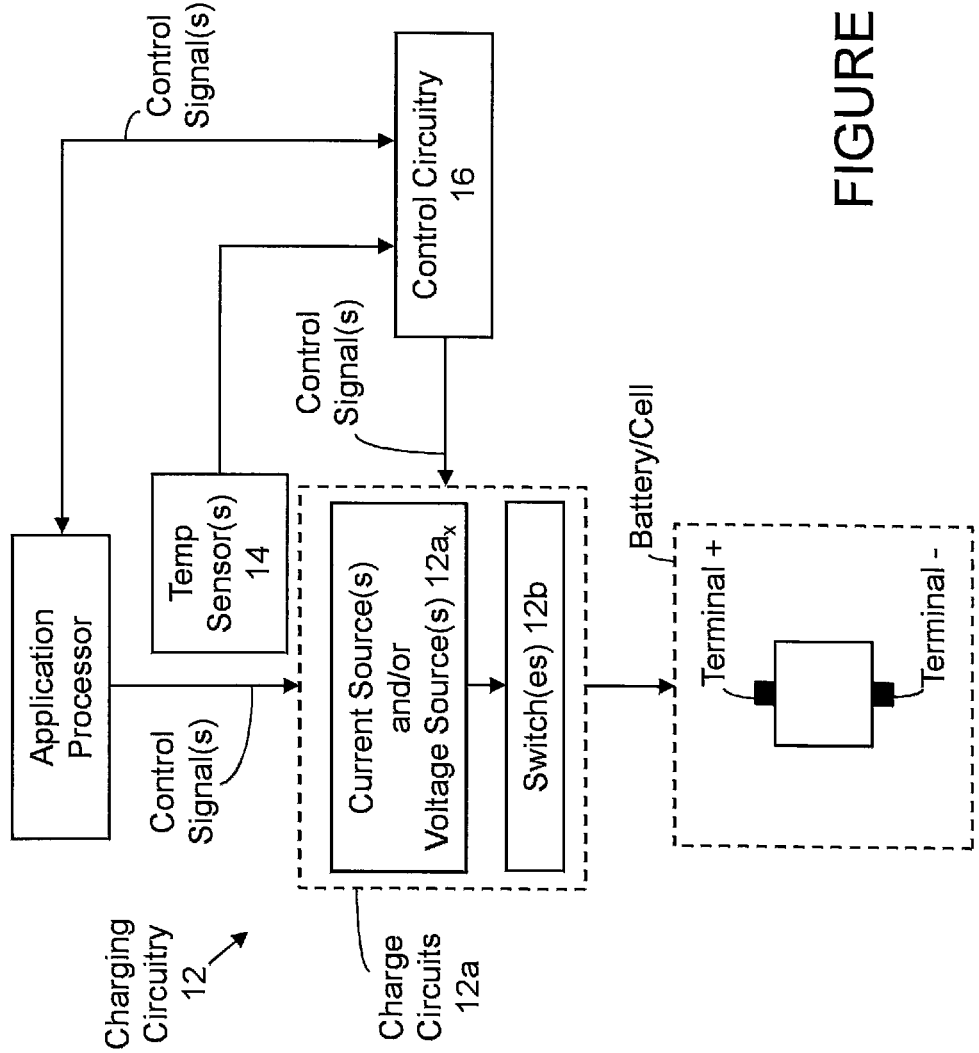
Figure 7C:
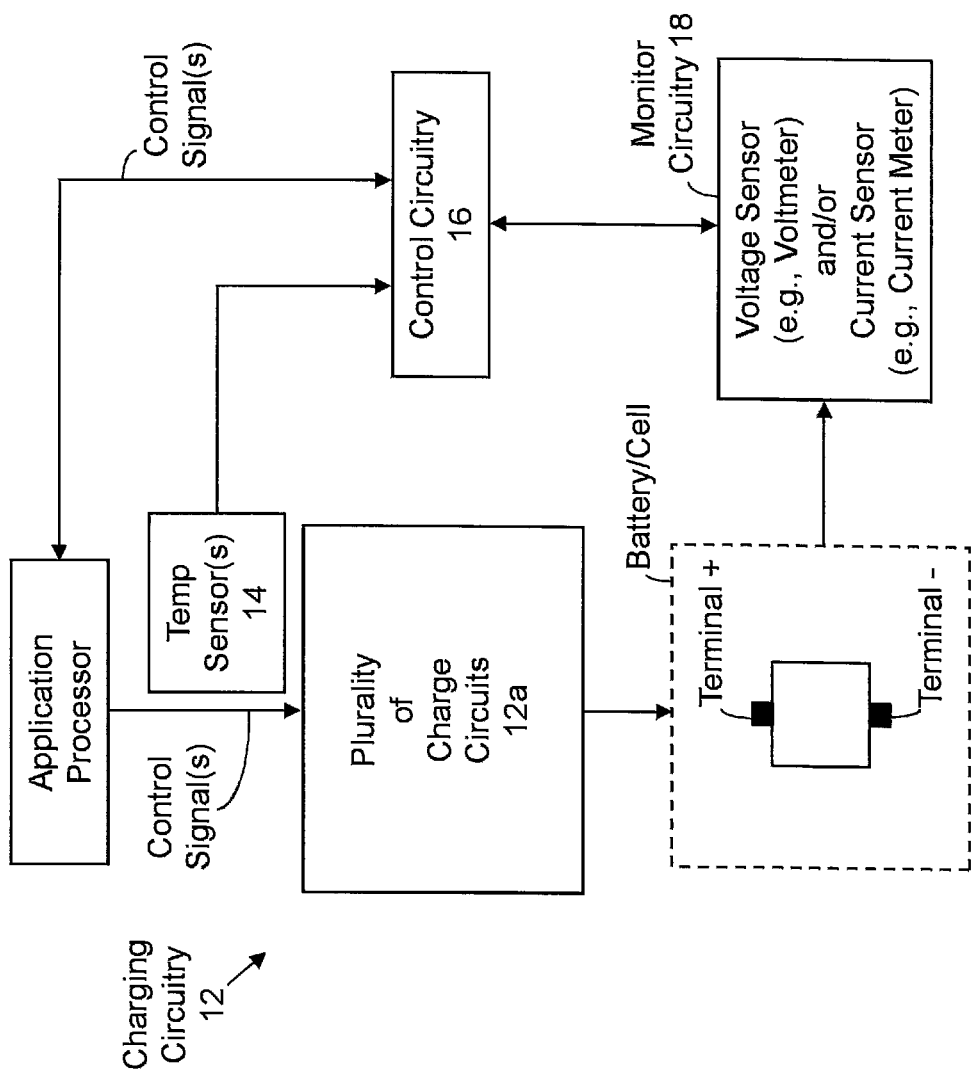
FIGS. 7C and 7D illustrate, in block diagram form, exemplary adaptive charging circuitry (including a plurality of charge circuits), in conjunction with a battery/cell, conventional power management circuitry (illustrated as "application processor"), and monitor circuitry, according to certain aspects of the present inventions, wherein the monitor circuitry includes, for example, voltage and/or current sensors (for example, a voltmeter and/or a current meter) to determine, measure and/or monitor a voltage at the terminals of the battery/cell and/or a current through the battery/cell wherein data which is representative of such voltage and current information may be employed, by the control circuitry, to further adapt, adjust and/or control one or more characteristics of the output charge signal of the charging circuitry (for example, charge or current applied to or injected into the battery/cell); notably.
Figure 7D:
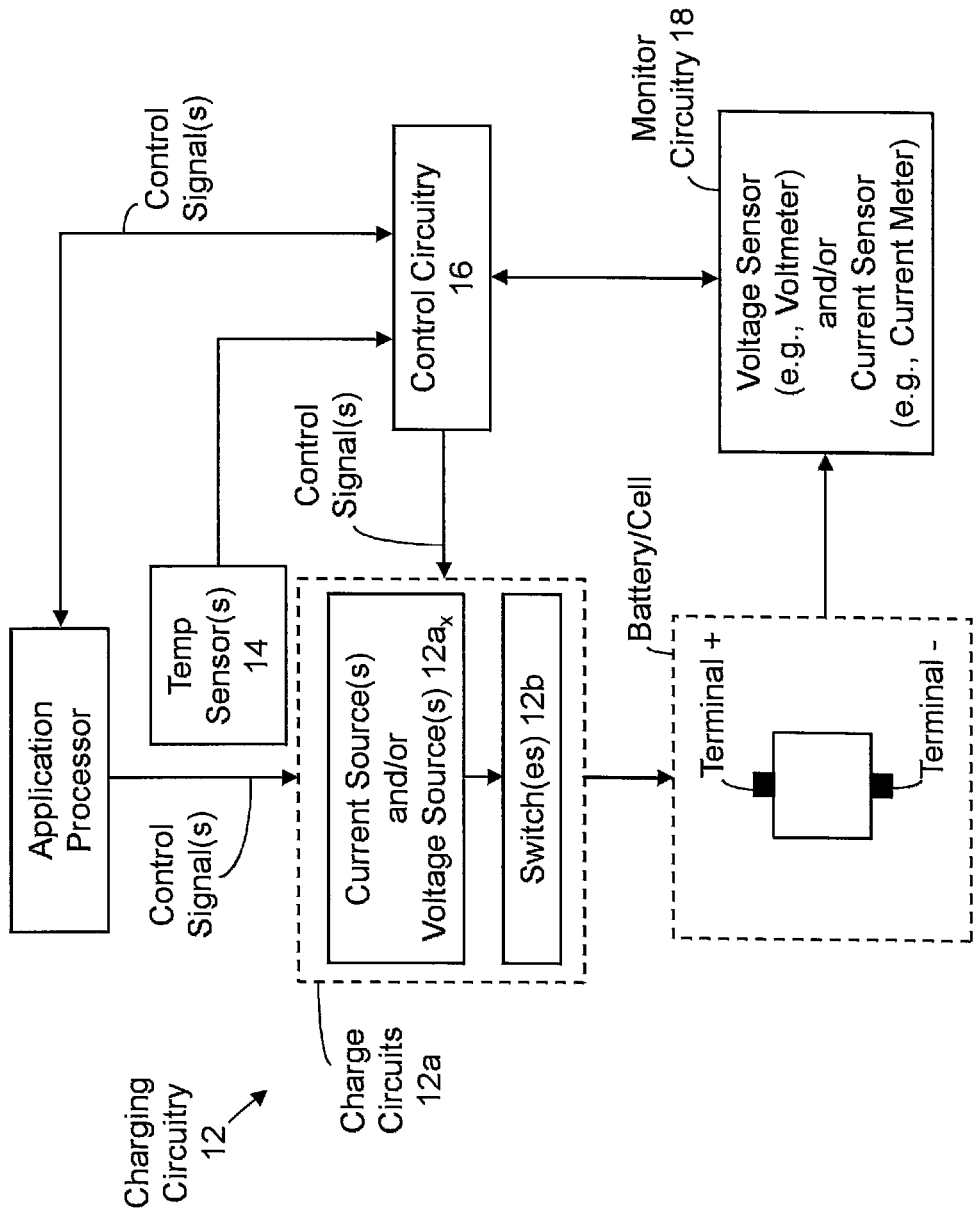
Figure 7E:
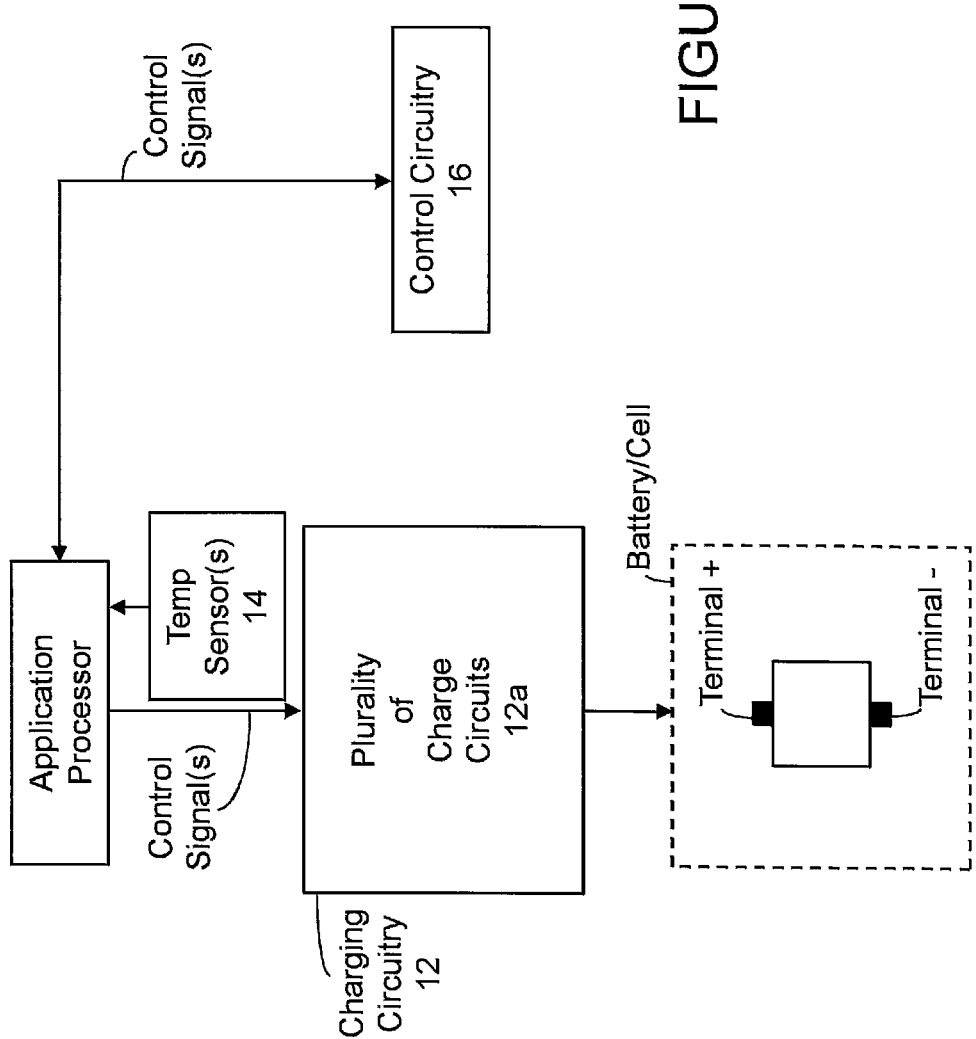
FIGS. 7E and 7F illustrate, in block diagram form, exemplary embodiments of adaptive charging circuitry (including a plurality of charge circuits), in conjunction with a battery/cell and conventional power management circuitry, according to certain aspects of the present inventions, wherein temperature sensor(s) are located in thermal communication with the charging circuitry to generate data which is representative of or correlated to an operating temperature of one or more (or all) of the charge circuits and wherein the temperature data is provided to the application processor which uses such data (or data which is representative thereof) and/or provides such data (or data which is representative thereof) to control circuitry wherein the control circuitry may employ the data to adapt, adjust and/or control one or more characteristics of the output signal(s) of the charge circuits indirectly via the application processor, for example, when data which is representative of the temperature(s) of the charging circuit(s) is/are out-of-specification during a charging or recharging sequence, operation or cycle.
Figure 7F:
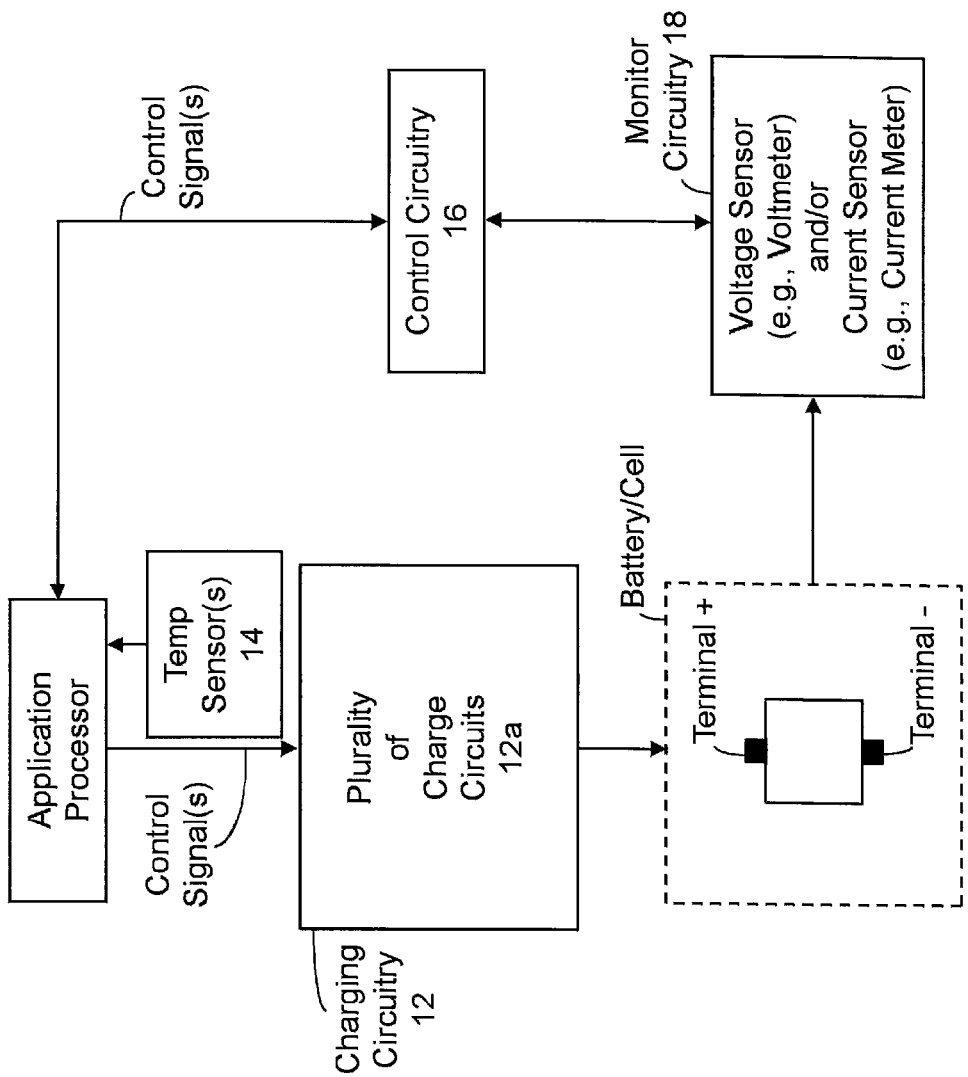
Figure 7G:
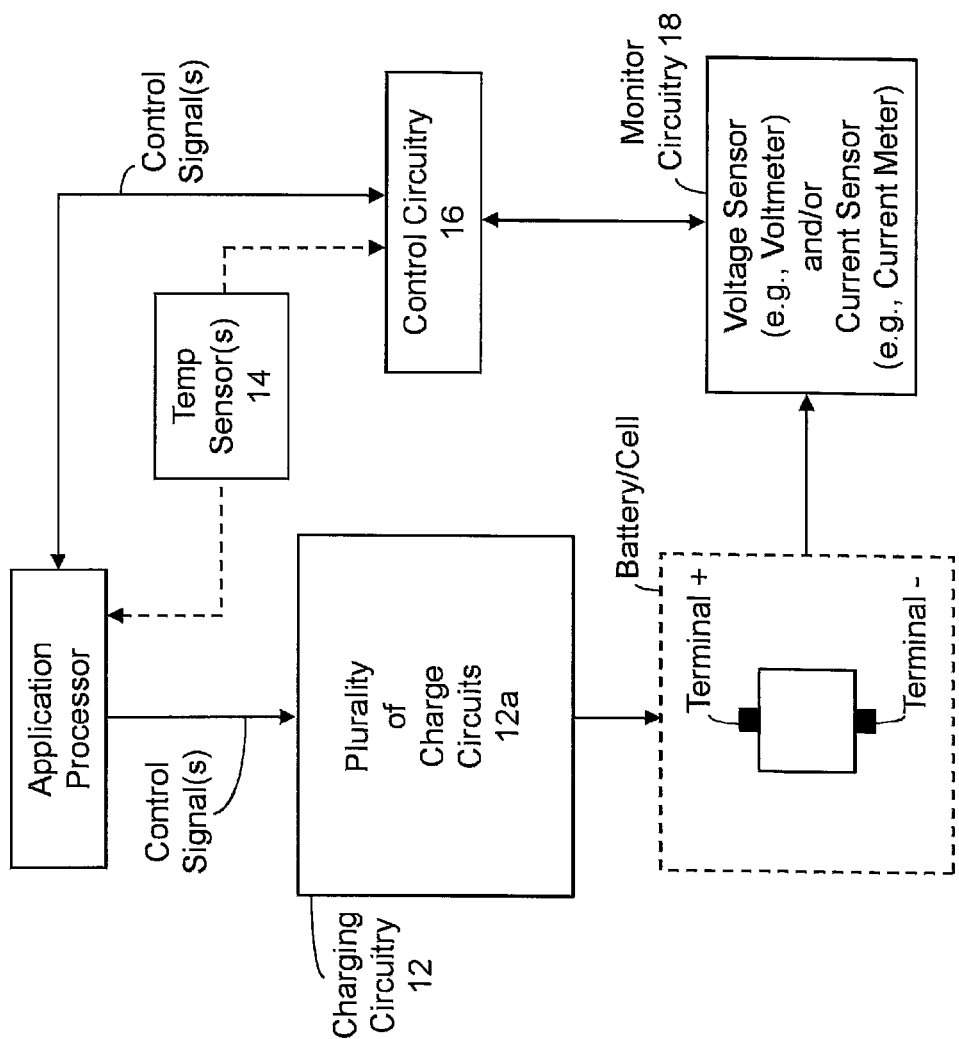
FIG. 7G illustrates, in block diagram form, an exemplary embodiment of adaptive charging circuitry (including a plurality of charge circuits), in conjunction with a battery/cell and conventional power management circuitry, according to certain aspects of the present inventions, wherein temperature sensor(s) are located in thermal communication with another portion of the device, for example, one or more portions of the housing of the device, to generate data which is representative of or correlated to a temperature during a charging or recharging sequence, operation or cycle; wherein the temperature data is provided to (i) the application processor which uses such data (or data which is representative thereof) and/or provides such data (or data which is representative thereof) to control circuitry and/or (ii) the control circuitry, wherein the control circuitry may employ the data to adapt, adjust and/or control one or more characteristics of the output signal(s) of the charge circuits indirectly via the application processor, for example, when data which is representative of the temperature(s) is/are out-of-specification during a charging or recharging sequence, operation or cycle.

The relationship(s) between operating efficiency and temperature and/or output signal may be predetermined and stored in memory. For example, with reference to FIG. 5B the efficiency and power loss curve/relationship of an exemplary DC-DC converter of an exemplary charging circuit over a logarithmic load range may be predetermined and that relationship may be stored in memory in any form, including as an equation and/or database or look-up table. As indicated above, in one embodiment, control circuitry 16 uses a relationship between operating efficiency and temperature and/or output signal to determine whether a charging circuit 12*a* is out-of-specification in relation to efficiency and/or generate control signals to implement operating characteristics of charging circuit 12*a* to establish, maintain and/or improve an efficiency of such circuit 12*a* within-specification (for example, above a certain threshold or value and/or within one or more ranges). In yet another embodiment, control circuitry 16 may use a relationship between operating efficiency and temperature and/or output signal to determine generate control signals to implement operating characteristics of the charging circuit 12*a* which adjusts the operating temperature of such circuit and establish, maintain and/or improve an efficiency of such circuit 12*a* to above a certain threshold or value and/or within a range. Notably, the scale of the output current range will vary with a given design and circuit based on load range capabilities.

The control circuitry 16 may directly or indirectly control charge circuits 12*a* which are both out-of-specification and within-specification (whether relative to operating temperature and/or efficiency). (See, FIGS. 6A-6F). In this regard, control circuitry 16 adjusts the charge output or applied to the battery/cell by charging circuit(s) 12*a* which are out-of-specification (for example, reduce the charge applied to the battery/cell by a predetermined percentage—which, in one embodiment, may be determined based on an amount the operating temperature and/or efficiency are out-of-specification) and adjusts the charge applied to the battery/cell by the charging circuit(s) which are within-specification (for example, increase the charge applied to the battery/cell by a predetermined percentage—which, in one embodiment, may be determined based on an amount the operating temperature and/or efficiency are within-specification). In this way, control circuitry 16 manages and/or controls the charge circuits 12*a* in a manner that reduces, minimizes and/or eliminates impact on the charging sequence or operation so that the charging signal provided or applied to the battery/cell, in the aggregate, is consistent with (for example, that meets/accomplishes or substantially the meets/accomplishes) a predetermined charging sequence or operation.

Notably, for the avoidance of doubt, the inventions are not limited to processes and/or algorithms implemented in accordance with the flow charts of FIGS. 6A-6F; indeed, such flow charts of operation are merely exemplary.

With reference to FIGS. 5B and 6A-6F, in another embodiment, control circuitry 16 determines, assesses and/or evaluates whether the operating temperature and/or operating efficiency of one or more (or all) of charge circuits 12*a* are/is out-of-specification. In those instances when control circuitry 16 determines whether the temperature and/or efficiency data is/are out-of-specification, control circuitry 16 may instruct charge circuits 12*a* to adjust or change the characteristics of the charging signals generated and output by the charging circuitry. For example, where the system implements a pulse current charging technique, control circuitry 16 may instruct one or more (or all) of charge circuits 12*a* to adjust or change the pulse width, amplitude and/or period of the voltage of and/or current generated and output by the charge circuits 12*a*, for example, by a predetermined percentage which may be determined based on the operating temperature and operating efficiency. Thus, in one embodiment, control circuitry 16 may linearly adjust (i) the length of the rest period between pulses or packets, (ii) an amplitude of the charge and/or discharge pulses of the charge packets, and/or (iii) a width of the charge and/or discharge pulses of the charge packets (see, for example, FIGS. 4A-4E) via instructions to one or more (or all) of charging circuit(s) 12*a*, to bring or maintain the operating temperature within-specification (or reduce the operating temperature) and/or bring or maintain the operating efficiency within-specification (or increase the operating efficiency).

In one embodiment, the rate at which the temperature data and/or efficiency data are/is brought within-specification may depend on the amount the operating temperature and/or operating efficiency are/is out-of specification. Moreover, control circuitry 16 may adjust the operating parameters of charge circuits 12*a* which are both out-of-specification and within-specification (whether relative to operating temperature and/or efficiency) in order to provide or apply a charging signal (which is an aggregate of the charging signals from the plurality of charge circuits 12*a*) to the battery/cell that is, for example, in accordance with a predetermined charging sequence or operation. (See, for example, FIGS. 6A-6F).

As mentioned above, the adjustment or control processes performed may be iterative. That is, after adjusting the characteristics of the charging signal, control circuitry 16 may again acquire and assess temperature and/or efficiency during, for example, the charging operation. In response, control circuitry 16 may again determine whether the temperature and/or efficiency are out-of-specification (for example, outside of a predetermined range) and, in the event operating conditions are out-of-specification implement additional modifications. Based on that determination, control circuitry 16 controls one or more (or all) of charge circuits 12a accordingly.

The control circuitry 16 may intermittently, continuously, and/or on a periodic basis, and/or in response to a triggerable event (for example, when the voltage and/or current output by charging circuitry 12 changes in accordance with a given charging sequence and/or in response to adaptive control) monitor, sense, detect, sample and/or determine the temperature (via one, some or all temperature sensors 14) and/or operating efficiency of one or more (or all) of charge circuits 12a. Thereafter, control circuitry 16 may analyze or evaluate the temperature of such charge circuits 12a and/or certain portions of the housing and/or efficiency of such charge circuits 12a—as described above.

Notably, a triggerable event may include a predetermined change in the voltage and/or current applied to the battery/cell in accordance with a predetermined charging sequence—for example, at a particular state of charge of the battery/cell, the charging circuitry responsively changes the charging signal (for example, a predetermined change in voltage applied to the terminals of the battery/cell and/or (ii) a predetermined change in current applied to or removed from the battery/cell). In one embodiment, the triggerable event may be determined by control circuitry 16 which may, in response to determining such event, acquire or sample data from temperature sensors 14. In another embodiment, the triggerable event may be determined by monitor circuitry 18 (for example, a measured change (which may exceed a predetermined range or threshold (for example, greater or less than a predetermined range)) in current and/or voltage output by one or more (or all) of charge circuits 12a. In this embodiment, in response to the triggerable event, temperature sensors 14 measure, monitor, sense, detect and/or sample temperature and advise, inform and/or alert control circuitry 16 of such change (for example, set a flag) and, in response, control circuitry 16 may implement any of the operations, techniques and/or function described herein.

In addition thereto, or in lieu thereof, control circuitry 16 may intermittently, continuously and/or periodically, and/or in response to a triggerable event obtain, acquire and/or determine the operating temperature of one or more charge circuits 12a (for example, components thereof—including current source and/or switch(es)) from associated temperature sensors 14 and/or determine whether the operating temperature and/or efficiency are/is out-of-specification. For example, temperature sensors 14 may intermittently, continuously and/or periodically, and/or in response to a triggerable event measure, monitor, sense, detect and/or sample the temperature of, for example, all of the charge circuits 12a during a recharging operation. Thereafter, control circuitry 16 may intermittently, continuously and/or periodically, and/or in response to a triggerable event, sample the operating temperatures and determine whether such temperatures and/or efficiency of one or more charge circuits 12a is/are out-of-specification. Where control circuitry 16 determines the operating temperature and/or operating efficiency of one of the charge circuits is out-of-specification, control circuitry 16 generates and applies control signals to (directly or indirectly) adjust one or more characteristics of that charging circuit 12a (for example, (i) increase or decrease the amplitude of the current and/or voltage of the charging signal applied to the battery/cell, (ii) increase or decrease the length of the rest period between pulses or packets, and/or (iii) increase or decrease a width of the charge and/or discharge pulses of the charge packets), as discussed in detail herein. In addition (for example simultaneously therewith), control circuitry 16 generates and applies control signals to (directly or indirectly) adjust one or more characteristics of charging circuit 12a which is within-specification (using for example, the operating temperature and efficiency of that charging circuit 12a). In this way, control circuitry determines or establishes a new or revised "load balance" or "load allocation" between the plurality of the charge circuits to provide a predetermined charging signal to the battery/cell having predetermined characteristics (for example, in the context of a pulse charging operation, a predetermined current pulse amplitude, pulse shape, period and/or duty cycle).

The control circuitry 16 may include one or more processors, controllers, state machines, gate arrays, programmable gate arrays and/or field programmable gate arrays, and/or one or more combinations thereof. Indeed, control circuitry 16 may share circuitry with other circuitry; such circuitry may be distributed among a plurality of integrated circuits which may also perform one or more other operations, which may be separate and distinct from that described herein. Moreover, control circuitry 16 may perform or execute one or more applications, routines, programs and/or data structures that implement particular methods, techniques, tasks or operations described and illustrated herein. The functionality of the applications, routines or programs may be combined or distributed. In addition, the applications, routines or programs may be implemented by control circuitry 16 using any programming language whether now known or later developed, including, for example, assembly, FORTRAN, C, C++, and BASIC, whether compiled or uncompiled code; all of which are intended to fall within the scope of the present inventions.

The control circuitry 16 may directly or indirectly control charge circuits 12a of charging circuitry 12. For example, in those embodiments where control circuitry 16 directly controls the amplitude of the voltage and/or current output by charge circuits 12a, control circuitry 16 may generate control signals and directly apply such control signals to charge circuits 12a (or one or more components thereof—for example, current/voltage source 12a$_x$, and/or switch(es) 12b). (See, for example, FIGS. 1A-1R).

In another embodiment, control circuitry 16 indirectly controls one or more (or all) of charge circuits 12a of charging circuitry 12. With reference to FIGS. 7A-7G, in this embodiment, the system may include a conventional power management circuitry (for example, an application processor) which directly controls one or more (or all) of charge circuits 12a. For example, in this embodiment, the conventional power management circuitry provides direct control of current source and/or voltage source 12a$_x$ of charge circuits 12a. As such, in operation, control circuitry 16, based on or using data which is representative of the operating temperature of charge circuits 12a, determines a change to adjust one or more operating characteristics of charge circuits 12a, generates instructions or control signals to adjust the temperature of one or more (or all) of charge circuits 12a. The control circuitry 16 applies such instructions or control signals to the conventional power management circuitry. The conventional power management circuitry, in response to such instructions or control signals, adjusts one or more operating characteristics of one or more (or all) of charge circuits 12a (for example, the amplitude of the voltage and/or current output thereof) via generating and applying appropriate control signals to the appropriate charge circuits 12a (for example, the current source and/or voltage source 12$a_x$ of the charging circuit). Thus, in this embodiment, control circuitry 16, based on or using temperature data, determines a necessary and/or an appropriate adjustment of one or more characteristics of the charging signal (for example, (i) increase or decrease the amplitude of the current and/or voltage of the charging signal applied to the battery/cell, (ii) increase or decrease the length of the rest period between pulses or packets, and/or (iii) increase or decrease a width of the charge and/or discharge pulses of the charge packets), and, in response, generates control signals and applies such control signals to the conventional power management circuitry. The management circuitry, in response, implements the adjustments or adaptation "requested" by control circuitry 16.

The discussion of the embodiments above, in the context of control circuitry 16 directly controlling charge circuits 12a, is applicable in this embodiment where control circuitry 16 indirectly controls one or more characteristics of the charging signal. For the sake of brevity, such discussion will not be repeated.

Notably, the temperature data (which is representative of one, some or all of the charge circuits 12a and/or one or more portions of the housing of the electronic device) may be acquired or sampled by the conventional power management circuitry (indicated as the "application processor" in FIGS. 7A-7F) and/or control circuitry 16, The control circuitry may employ the temperature data in the manner described herein (see, for example, FIGS. 6A-6F) which, for the sake of brevity, will not be repeated.

Figure 8A:
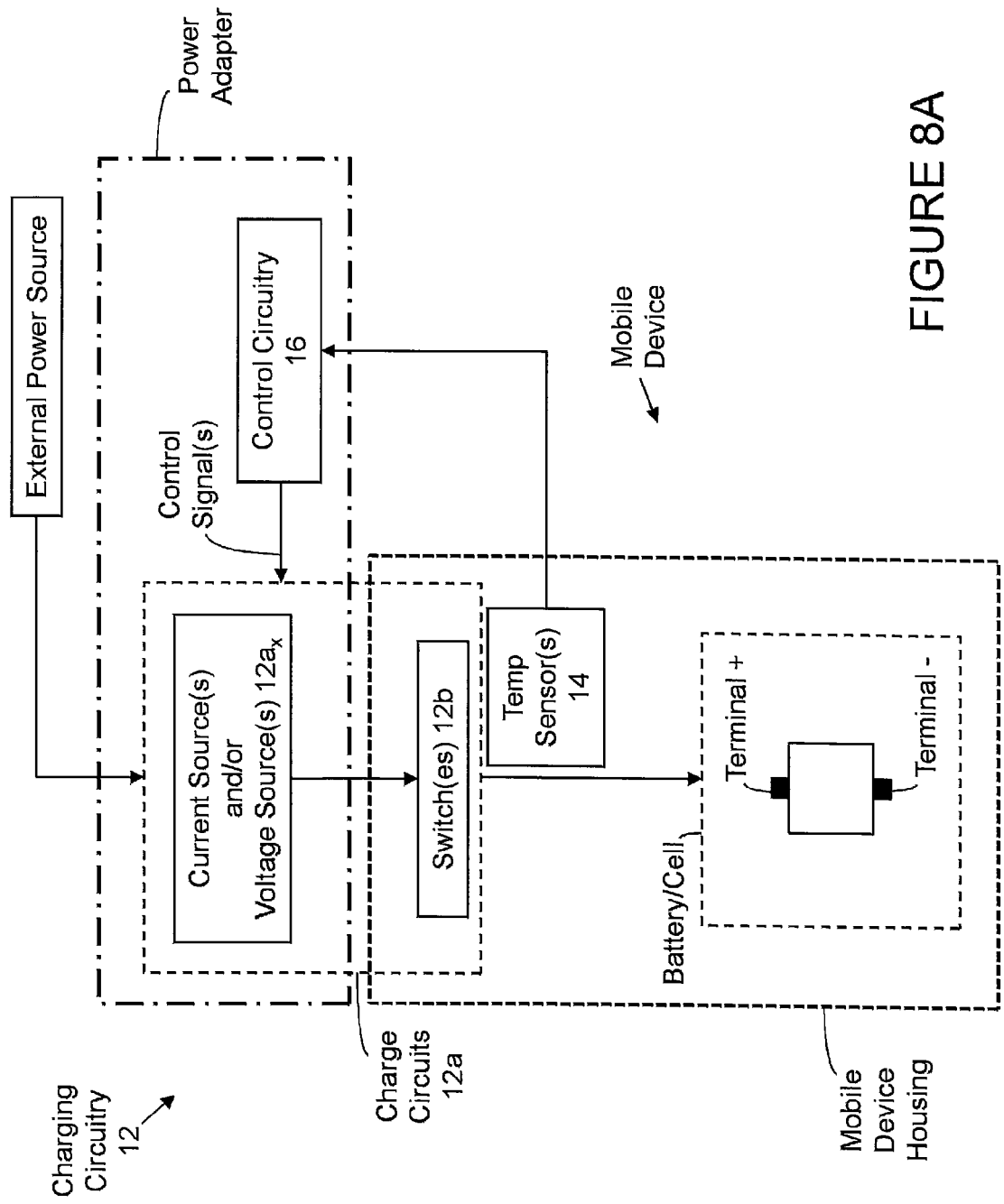
FIGS. 8A-8D illustrate, in block diagram form, exemplary adaptive charging circuitry, in conjunction with a battery/cell wherein the voltage source(s) and/or current source(s) and switch(es) are suitable to implement a pulse current charging technique and the switch(es) are disposed in the electronic device (illustrated here as a mobile device) and/or on the battery or in a battery pack, according to certain aspects of the present inventions, wherein the circuitry and techniques may implement any of the embodiments to control or adapt the operating parameters or characteristics of one or more (or all) of the charge circuits described herein; notably, temperature sensors may be located in direct thermal communication with various components of the charging circuitry to generate data which is representative of operating temperature of one or more of the charge circuits (or components thereof) and/or in direct thermal communication with the housing of the mobile device to generate data which is representative of temperature of such housing; in one embodiment, one or more temperature sensors (for example, thermistors, solid-state sensors (for example, proportional to absolute temperature type) and/or thermocouples) are physically disposed/integrated on and/or in or fixed to one or more substrates which is/are in thermal conductivity with the charge circuits of the charging circuitry and, in another embodiment, one or more temperature sensors (for example, thermistors, solid-state sensors (for example, proportional to absolute temperature type) and/or thermocouples) are physically disposed/integrated on and/or in, or fixed to, on or in the charging circuitry and/or the housing of the mobile device.
Figure 8B:
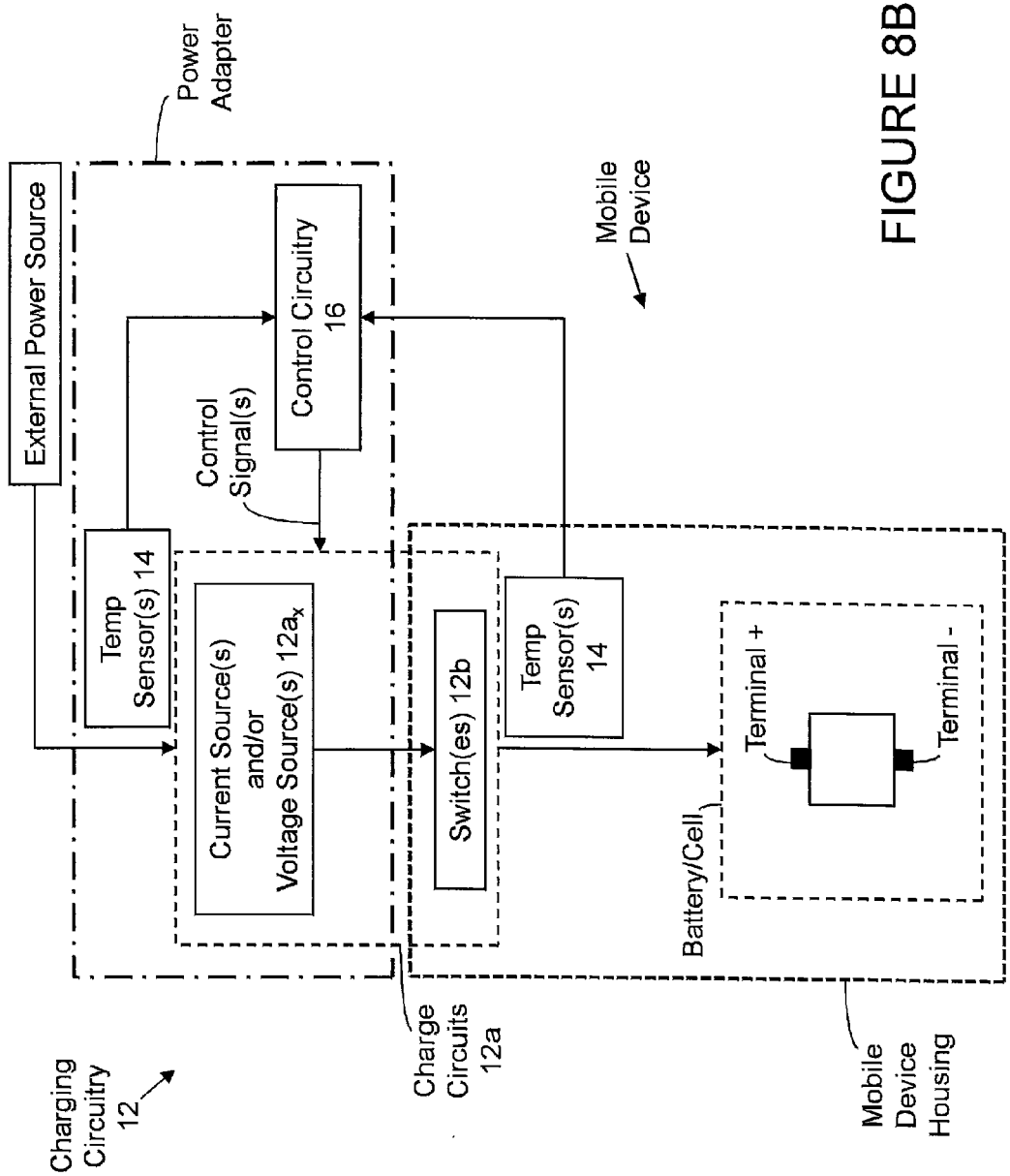
Figure 8C:
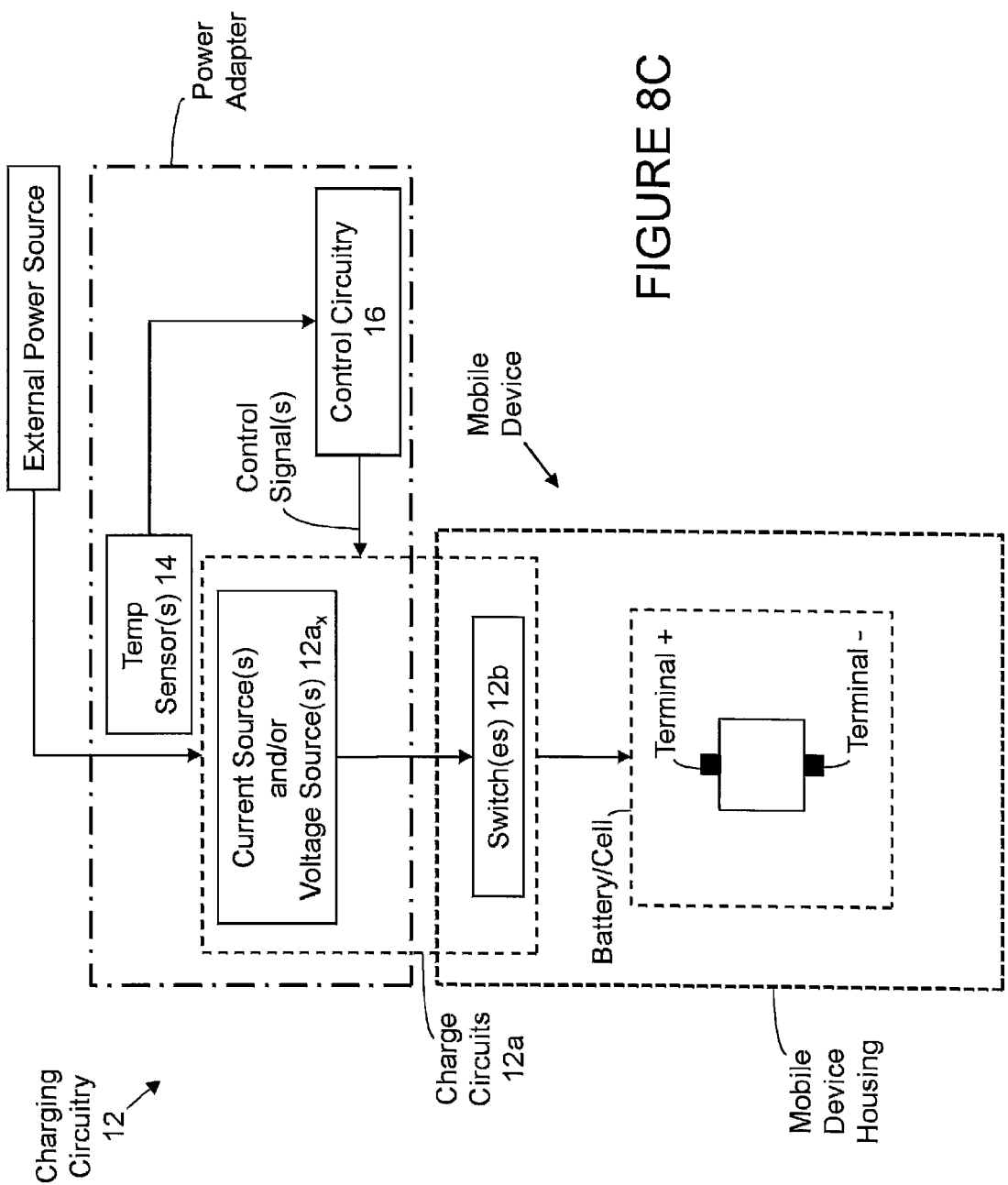
Figure 8D:
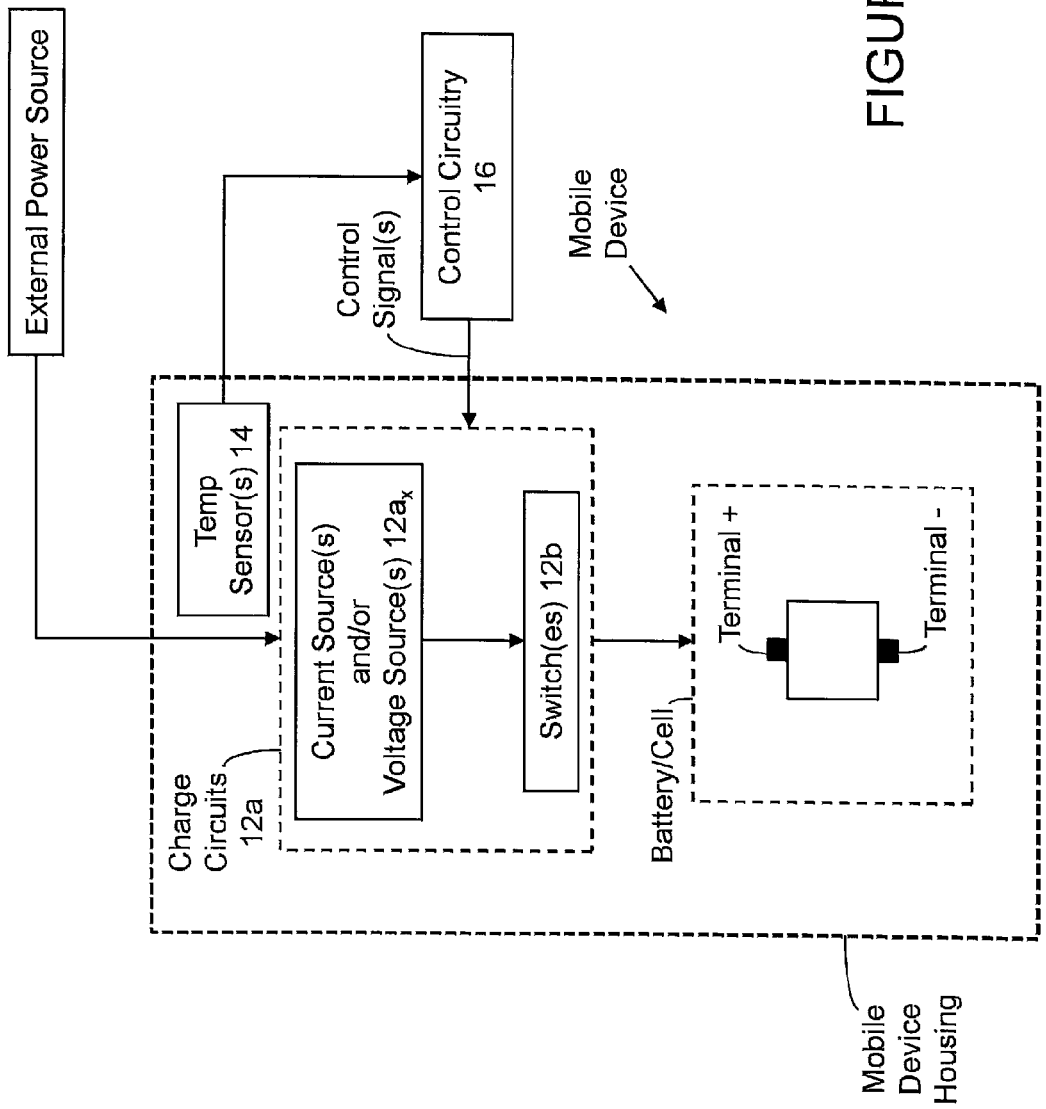
Figure 8E:
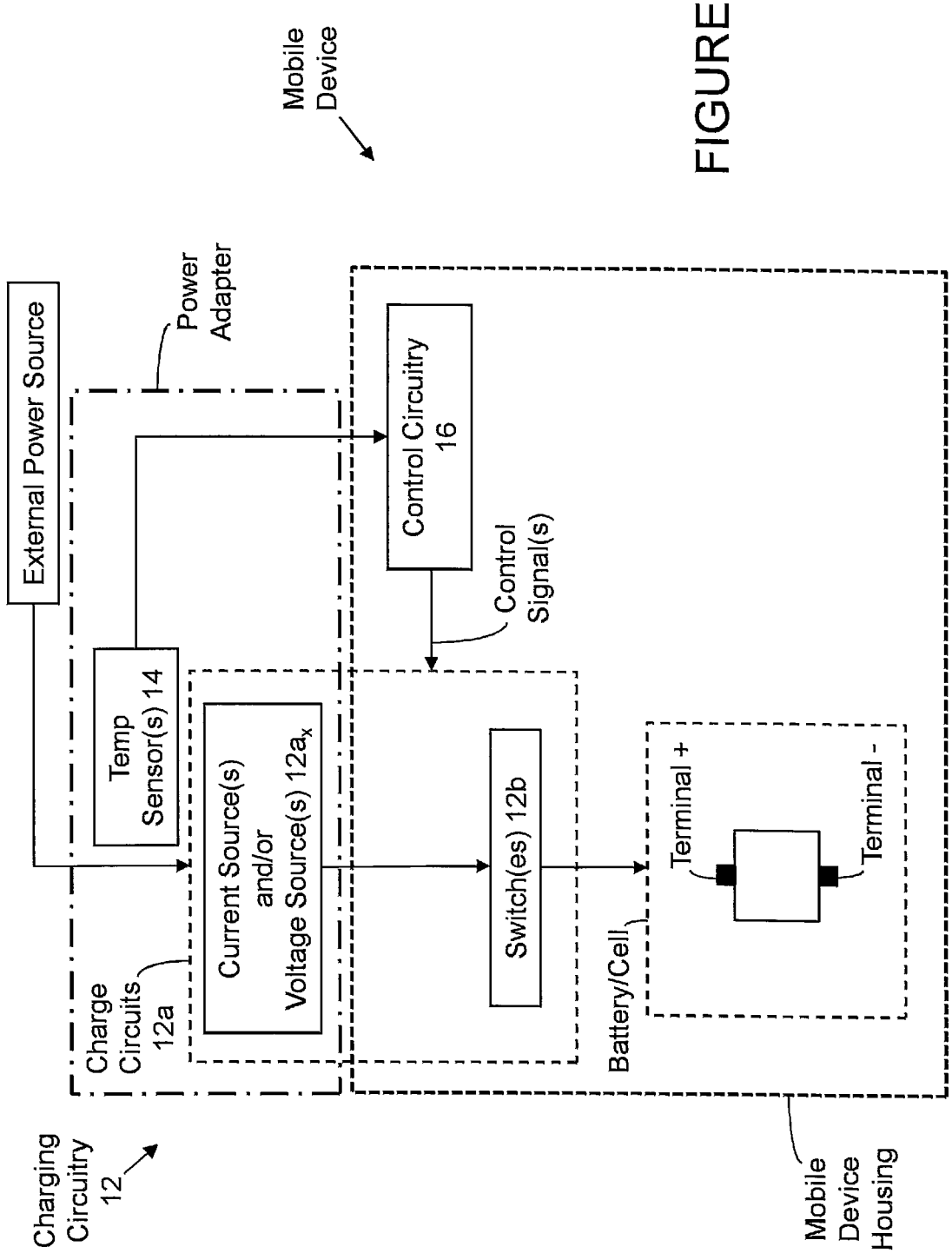
FIGS. 8E-8H illustrate, in block diagram form, exemplary embodiments of adaptive charging circuitry, in conjunction with a battery/cell wherein the voltage source(s) and/or current source(s) and switch(es) are suitable to implement a pulse current charging technique; in these exemplary embodiments, the switch(es) and control circuitry are disposed in the electronic device (illustrated here as a mobile or portable device) and/or on the battery or in a battery pack, according to certain aspects of the present inventions, wherein the circuitry and techniques may implement any of the embodiments to control or adapt the operating parameters or characteristics of one or more (or all) of the charge circuits described herein; notably, temperature sensors may be located in direct thermal communication with various components of the charging circuitry to generate data which is representative of operating temperature of one or more of the charge circuits (or components thereof) and/or in direct thermal communication with the housing of the mobile device to generate data which is representative of temperature of such housing.
Figure 8F:
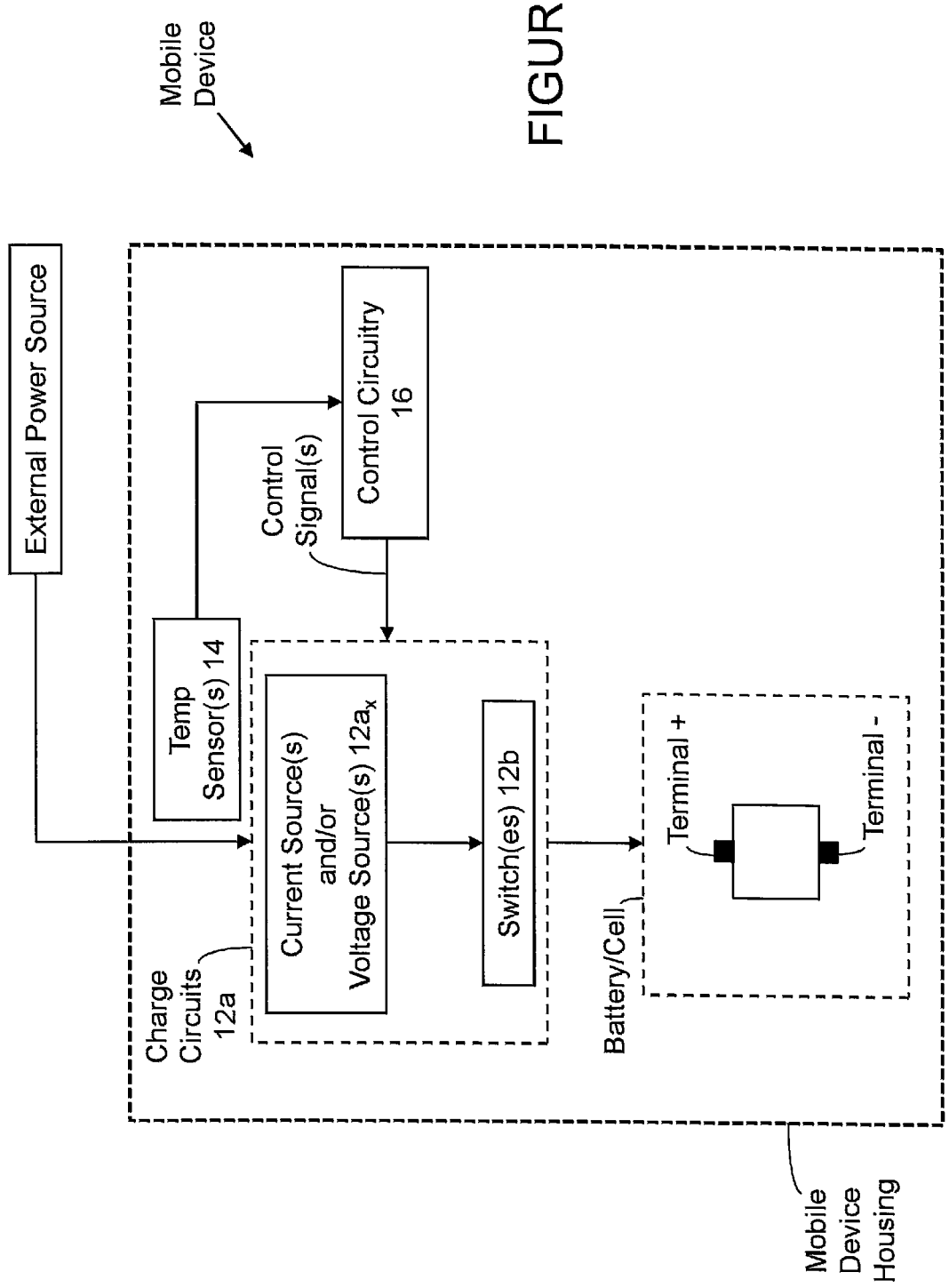

The present inventions may be implemented in any device now known or later developed. For example, the present inventions may be implemented in a mobile device (for example, phone, tablet, laptop and gaming device). In this implementation, it may be advantageous to dispose or locate current/voltage source 12$a_x$ separate from the mobile device. For example, with reference to FIGS. 8A-8C, in one embodiment (where the system employs a pulse charging technique), one or more (or all) of current/voltage sources 12$a_x$ are disposed or located in the housing that couples to the external power and switch(es) 12b which are disposed in the housing of the mobile device. In this embodiment, the source 12$a_x$ provides a programmable voltage/current and the switches generate the pulses employed to implement the pulse charging technique (see, for example, FIGS. 3A-3D and 4A-4G). The control circuitry 16 may be disposed in the power adapter (for example, with current/voltage source 12$a_x$ in the housing that couples to the external power (FIGS. 8A-8C) and/or in the mobile device (FIGS. 8E-8H). Notably, for the avoidance of doubt, control circuitry 16 may implement any of the adaptive charging techniques described and illustrated herein.

Figure 8G:
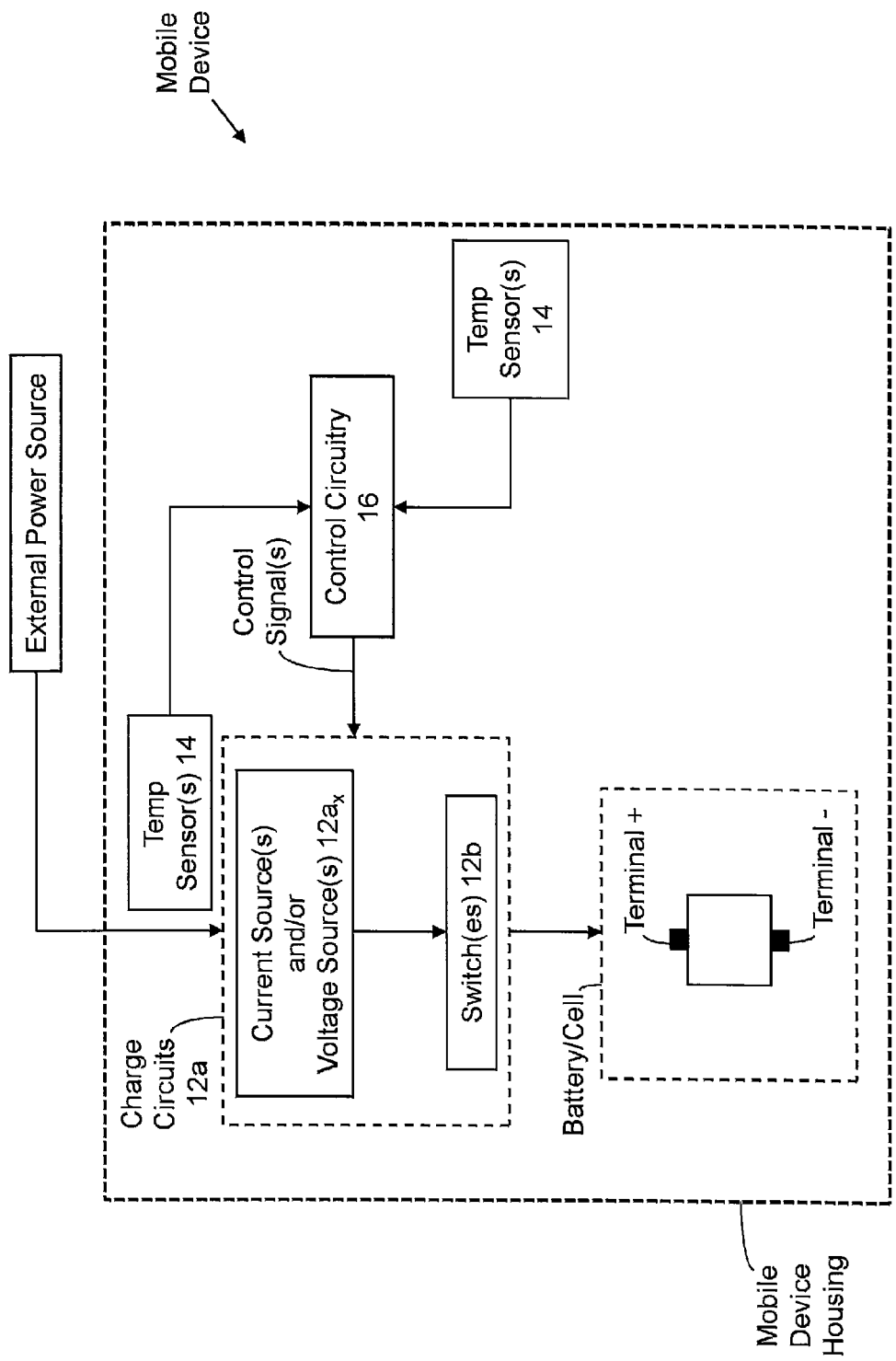
Figure 8H:
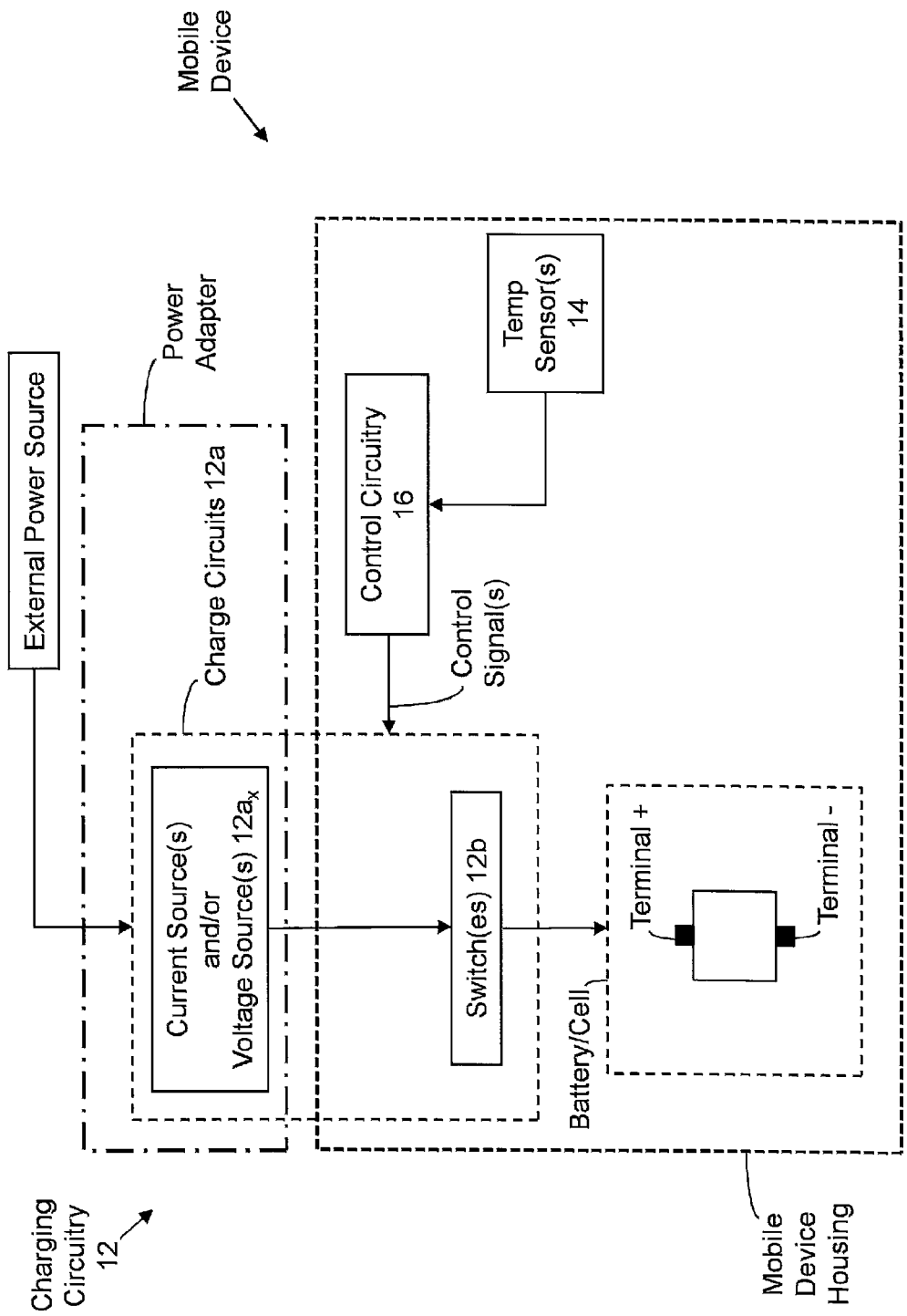

With continued reference to FIGS. 8A-8H, temperature sensor(s) 14 may generate data which is representative of switch(es) 12b (FIGS. 8A and 8B), one or more (or all) of the current/voltage sources 12$a_x$, (FIGS. 8B-8G), and/or the housing of the mobile device (FIGS. 8G and 8H). As noted with respect to FIGS. 1D-1F, 1I-1J, and 1M-1R, current/voltage sources 12$a_x$ may share or connect to the same switch(es) 12b and/or current/voltage sources 12$a_x$ (for example, all current/voltage sources 12$a_x$ of the charge circuits 12a of the charging circuitry 12) may connect or couple to switch(es) 12b dedicated thereto. All configurations are intended to fall within the scope of the present inventions.

Figure 8I:
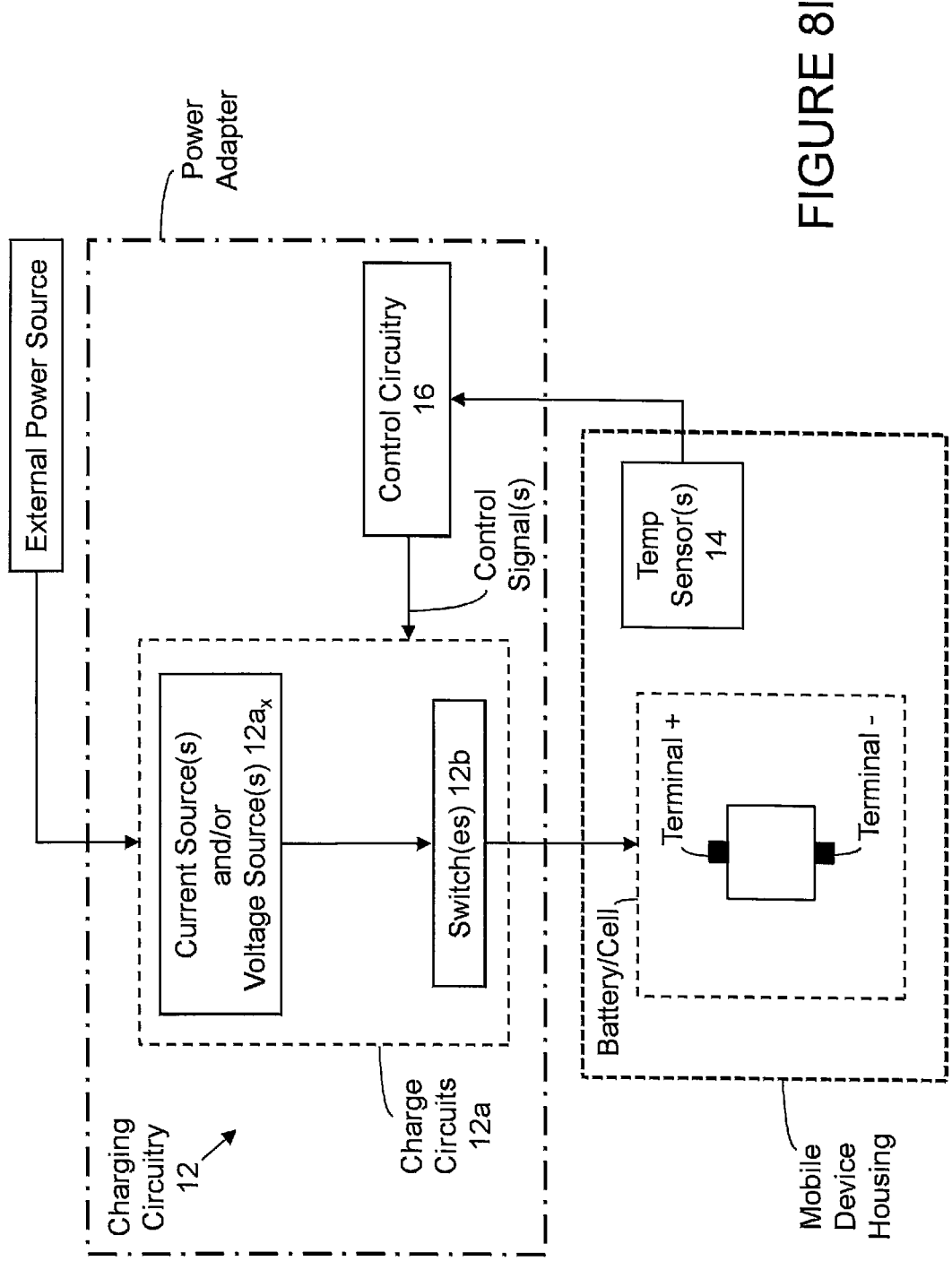
FIGS. 8I-8K illustrate, in block diagram form, exemplary embodiments of adaptive charging circuitry, in conjunction with a battery/cell, wherein the voltage source(s) and/or current source(s) and switch(es), which are located in a power adapter (that coupled to an external power source), are suitable to implement a pulse current charging technique; the control circuitry may be disposed in the power adapter or in the electronic device (illustrated here as a mobile device), according to certain aspects of the present inventions, wherein the circuitry and techniques may implement any of the embodiments to control or adapt the operating parameters or characteristics of one or more (or all) of the charge circuits described herein; notably, temperature sensors may be located in direct thermal communication with various components of the charging circuitry to generate data which is representative of operating temperature of one or more of the charge circuits (or components thereof) and/or in direct thermal communication with the housing of the mobile device to generate data which is representative of temperature of such housing; the exemplary embodiments of FIGS. 8A-8K may also include monitoring circuitry as illustrated herein and/or an application processor of the exemplary embodiments of FIGS. 7A-7G.
Figure 8J:
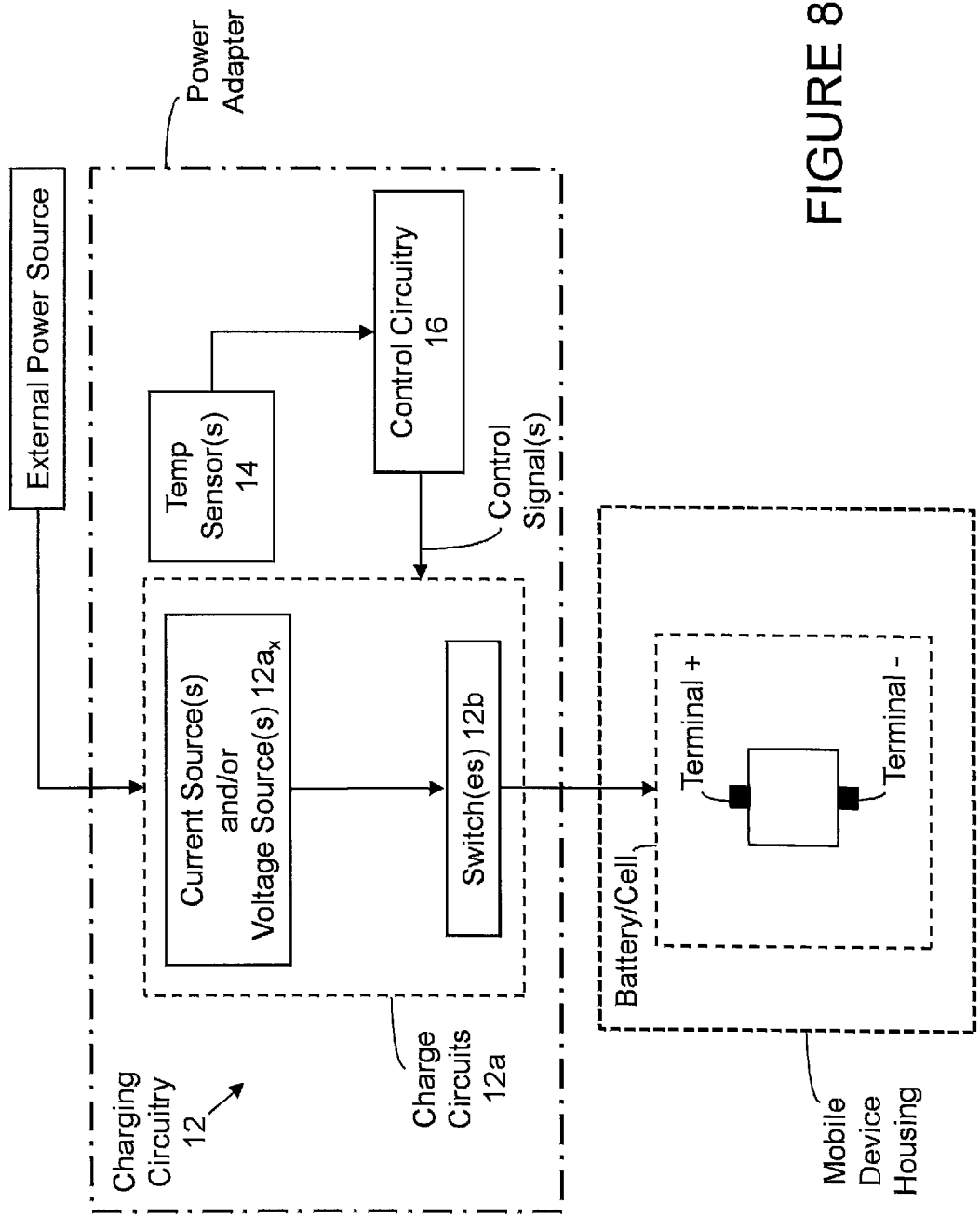
Figure 8K:
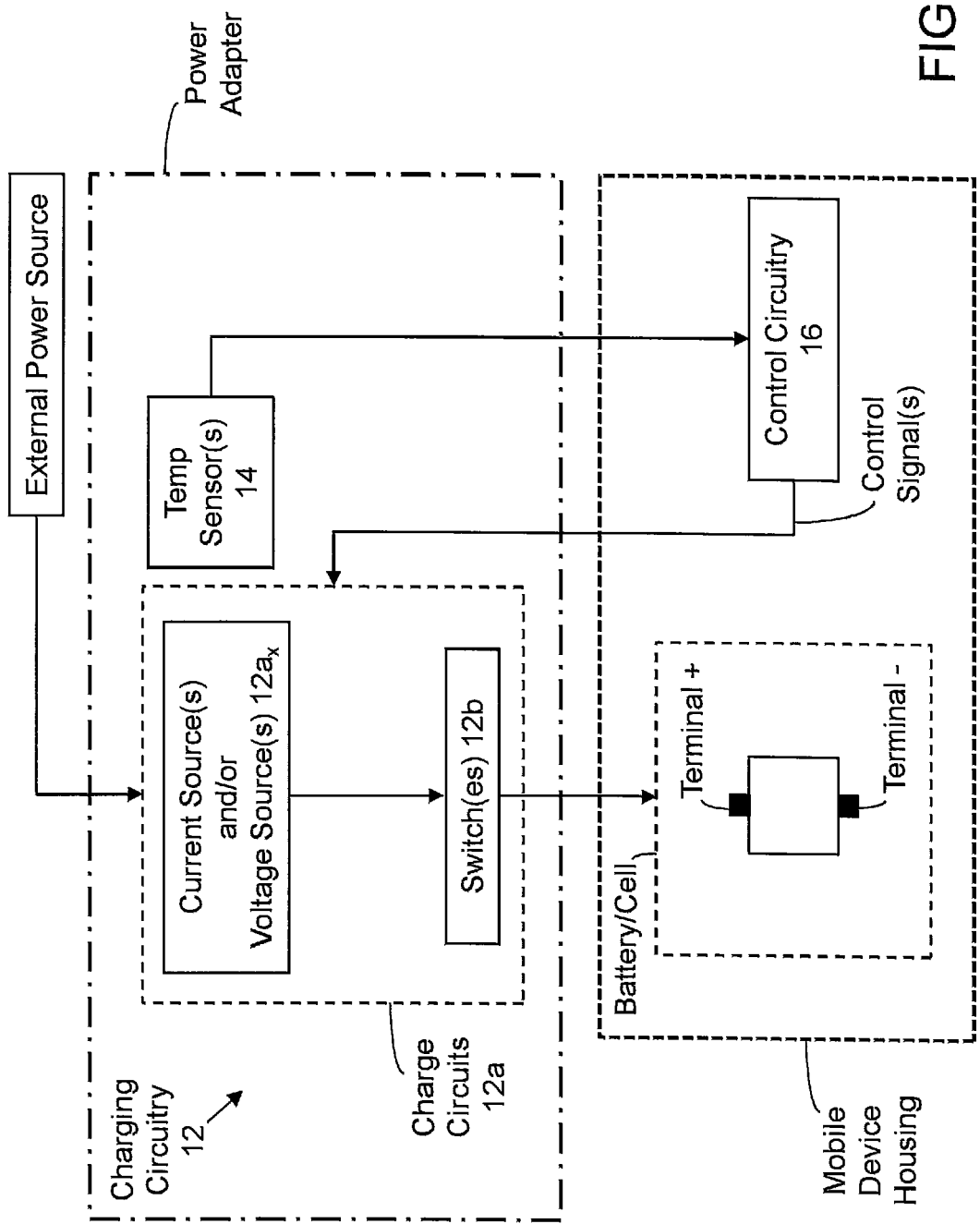

With reference to FIGS. 8I-8K, current/voltage sources 12$a_x$ and associated switch(es) 12b of the charge circuits 12a are disposed in a power adapter which connects between the external power supply and the mobile device. The control circuitry 16 may be disposed in the power adapter or the mobile device. Moreover, temperature sensor(s) may be disposed in the power adapter and/or the mobile device. Notably, current/voltage sources 12$a_x$ and associated switch(es) 12b may implement any of the circuit architectures or configurations of FIGS. 1A-1R.

Because current/voltage sources 12$a_x$ of the charging circuitry 12 are separated from the mobile device—and likely separated from physical and/or prolonged contact to the user (during a charging operation), the architecture of FIGS. 8A-8C, 8E, and 8H-8K may facilitate use of different limits or ranges in relation to determinations of out-of-specification (higher relative to embodiments where the current/voltage sources are in prolonged contact with the user during a charging operation). Indeed, in one embodiment, it may be unnecessary to adapt the control of charge circuits 12a based on or using an operating temperature of the current/voltage sources. (See, for example, FIG. 8A).

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions. Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

For example, as noted above, one or more of the present inventions may be employed in conjunction with the inventions and/or embodiments described and/or illustrated in U.S. patent application Ser. Nos. 13/626,605 and 13/657,841, which, as mentioned above, are incorporated in their entirety herein by reference.

Moreover, the battery/cell may be lithium ion technology/chemistry based battery/cell or other technology/chemistry (for example, lithium-cobalt dioxide, lithium-manganese dioxide, lithium-nickel dioxide and lithium-iron phosphate). The inventions described and/or illustrated herein may be implemented in conjunction with any battery or cell chemistries/technologies including, for example, silicon, lithium-ion, nickel-cadmium and other nickel metal hydride chemistries/technologies and lead acid. All battery or cell chemistries/technologies are intended to fall within the scope of the present inventions. It is to be understood that other embodiments may be utilized and operational changes may be made without departing from the scope of the present inventions. Indeed, the foregoing description of the exemplary embodiments of the inventions has been presented for the purposes of illustration and description. It is intended that the scope of the inventions not be limited solely to the description herein.

Further, as noted herein, control circuitry may perform or execute one or more applications, routines, programs and/or data structures that implement particular methods, techniques, tasks or operations described and illustrated herein. The functionality of the applications, routines or programs may be combined or distributed (for example, when distributed among associated or related circuitry, such circuitry is, in combination, control circuitry). Moreover, control circuitry 16 of the present inventions, or portions thereof, and/or one some or all of the functions or operations performed thereby, may be incorporated into power management circuitry. Moreover, certain functions or operations of control circuitry 16 may be distributed or performed by the management circuitry. In one embodiment, this circuitry may be disposed on a substrate which is/are physically disposed on, integrated with and/or fixed to the battery/cell. In another embodiment, such circuitry may be disposed on/in, integrated with and/or fixed to a separate substrate; all of which are intended to fall within the scope of the inventions.

As mentioned above, the inventions are not limited to processes and/or algorithms implemented in accordance with the flow charts of FIGS. 6A-6F. Such flow charts of operation are merely exemplary.

Further, although many of the embodiments are described and illustrated in connection with one or more temperature sensors 14 disposed/integrated on and/or in or fixed to the charge circuits 12a, the temperature sensors 14 may, in addition or in lieu thereof, be disposed/integrated on and/or in or fixed to the housing of the electronic or electrical device (which is powered by the battery/cell). In this embodiment, temperature data from such temperature sensors 14 is representative of the temperature of the housing of the electronic or electrical device (for example, a portion of the housing to which the user has physical contact). In these embodiments, the control circuitry may evaluate whether the data which is representative of the temperature(s) of the housing is out-of-specification (such temperature data is/are greater than a first predetermined value (for example, an upper limit), less than a second predetermined value (for example, a lower limit), outside of one or more predetermined ranges and/or differences between the temperature data associated with the two or more locations of the housing exceed one or more predetermined values or ranges); and, in response to such data being out-of-specification, implement modifications to the operation of elements of, for example, charge circuits 12a during the charging operation.

Thus, in one exemplary embodiment of this aspect of the inventions, the control circuitry employs data which is representative of the temperature of the housing of such device to determine an appropriate response (for example, adjust the operating characteristics of one or more (or all) of the charge circuits in order to reduce the temperature of the housing of the device). Such response may also consider or incorporate the operating efficiency(ies) of the charge circuits—as discussed herein—when assessing and implementing a response to the operating characteristics of the device during the charging sequence. In this embodiment, the temperature sensor(s) may be in direct thermal communication with a plurality of portions of the housing of the mobile device (for example, a mobile device such as a mobile telephone, laptop or tablet) to sense and generate data which is representative of temperature of such housing during the charging sequence.

At times, the terms battery and cell have been employed interchangeably to mean an electrical storage device that may be electrically charged and discharged. Such a device may include a single electrical cell, or may include several cells electrically connected in series and/or parallel to form a battery of larger electrical capacity. It shall be noted that the embodiments for adaptive charging described herein shall apply to either cells or batteries, as a single unit or multiple units electrically configured into a larger battery pack. Such battery pack may include separate monitor circuitry, as described herein, for each cell or a subset of cells, or for the entire battery. Moreover, control circuitry may be implemented in the same manner (i.e., control circuitry dedicated to each cell or a subset of cells, or for the entire battery. Any of the embodiments of the monitor circuitry and control circuitry described herein may be implemented in such multi-cell configurations. Indeed, all combinations and permutations thereof are intended to fall within the scope of the present invention.

Although several of the exemplary embodiments are described and/or illustrated in the context of charge circuits including switch(es) (for example, to facilitate implementation of and/or generate a pulse charging/re-charging sequence or operation (see, for example, FIGS. 3A-3D and 4A-4E), the charging circuitry described and/or illustrated herein may also be implemented without switch(es). For example, the present inventions may be implemented with any charging sequence, operation or cycle, for example, CCCV charging sequence and/or a step charging technique (see, for example, FIGS. 2A and 2B). In those embodiments where a CCCV charging sequence and/or a step charging sequence is employed, the charging circuitry may not include switch(es). With that in mind, the embodiments described and illustrated herein may or may not include switch(es). For the sake of brevity, such embodiments will not be re-illustrated without switch(es). Thus, the charge circuits set forth herein in the context of implementing a pulse charging technique are merely exemplary; and other circuitry and charging techniques may be employed whereby particular circuitry may be employed to implement such charging techniques. To be sure, however, all charging techniques, and circuits to implement such techniques, are intended to fall within the scope of the present inventions.

Moreover, as noted above, the predetermined range(s), limit(s) and/or value(s) may be stored in memory (for example, in a database or look-up table) during manufacture, test and/or calibration, and accessed by the control circuitry and/or processes of the present inventions during operation. The range(s), limit(s) and/or value(s) may be adjust and/or changed, after manufacture and/or test, at any time—for example, during normal operation (in situ) or during charging operation. Such adjustments and/or changes may be made locally (for example, by the user) or globally (for example, remotely from a central system/locale which "broadcasts" the information to multiple devices/systems in a geographic region (for example, a geographic region having the same or similar climate). Moreover, such modifications may be implemented manually or automatically by, for example, the user or central system/locale.

Figure 9:
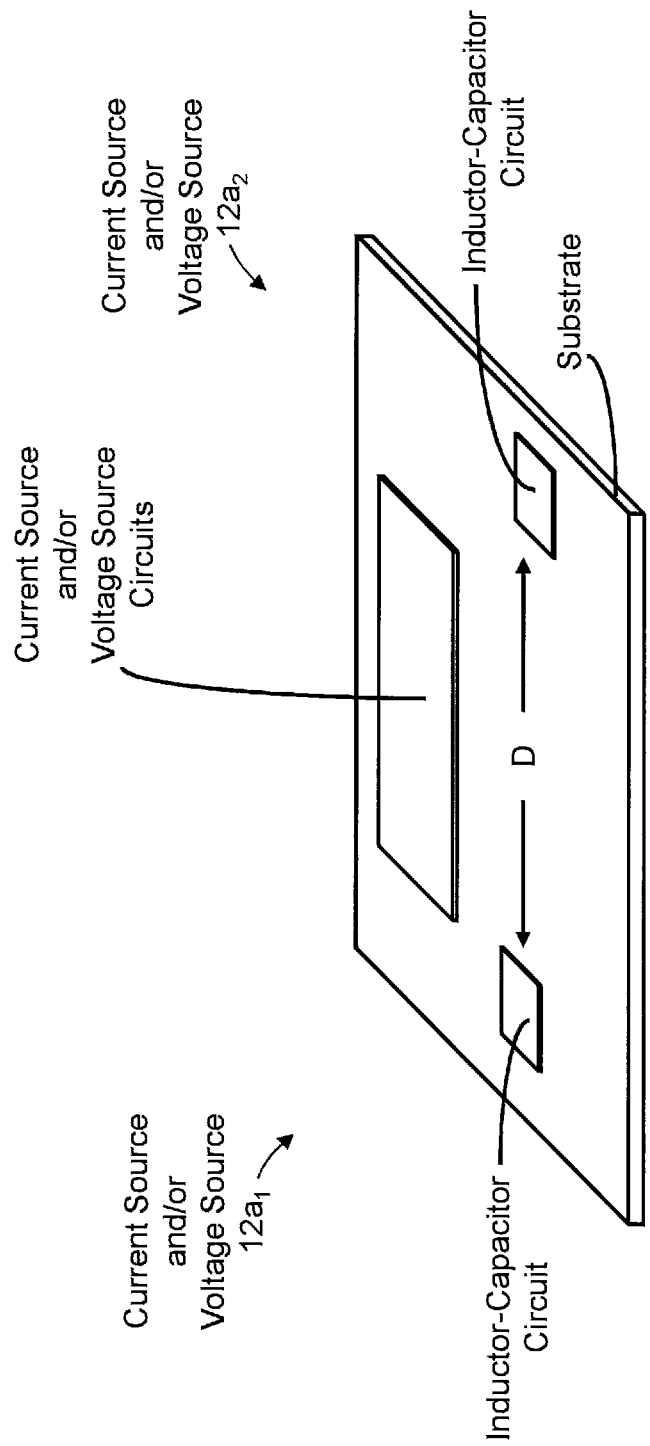
FIG. 9 illustrates a three dimensional block diagram view of an exemplary layout of an exemplary embodiment of the charging circuitry which includes two charge circuits each having a current source and/or voltage source circuit and an inductor-capacitor circuit; in this embodiment, the current source and/or voltage source circuits are integrated on/in a common die whereas the inductor-capacitor circuit are physically located, spaced and/or arranged so that the thermal output or generation of the inductor-capacitor circuit do not, in the aggregate, exceed a predetermined level or range (which may be time based or dependent) and/or the thermal profile of the charging circuitry (in total) does not exceed a predetermined level or range; notably switch(es), control circuitry and/or monitoring circuitry may also be disposed on the substrate; indeed, the temperature sensor(s) may be disposed on the substrate and/or on one or more elements of the charge circuits, for example, the current source and/or voltage source circuit and/or inductor(s) of each inductor-capacitor circuit of each current source and/or voltage source; notably, this exemplary layout may be employed in any of the embodiments of the charge circuits described and/or illustrated herein.

Further, one or more of the charge circuits may include elements that are integrated on a die and other elements that are discrete (and, in certain embodiments, spaced at least a predetermined length apart therefrom). For example, with reference to FIG. 9, in one embodiment, the current source and/or voltage source circuits of sources 12a$_1$ and 12a$_2$ are disposed in/on a common integrated circuit die and the inductor-capacitor circuit for each current source and/or voltage source circuit are discrete and separated from each other by a distance D (for example, for thermal and/or noise considerations as discussed in detail above).

Notably, current sources and/or voltage sources $12a_1$ and $12a_2$ of the charge circuits $12a$ may be independent sources or dependent sources. Indeed, the multiple charger circuits may include multiphase current source and/or voltage sources $12a_x$ (wherein the phase of the output of each source may be offset from the other source) or linear power sources; indeed, all types of sources are intended to fall within the scope of the present inventions.

Notably, a "circuit" means, among other things, a single component (for example, electrical/electronic) or a multiplicity of components (whether in integrated circuit form, discrete form or otherwise), which are active and/or passive, and which are coupled together to provide or perform a desired operation. In addition, "circuitry", means, among other things, a group of circuits (whether integrated or otherwise), one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

It should be further noted that the various circuits and circuitry disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the herein described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a fabrication process.

Moreover, the various circuits and circuitry, as well as techniques, disclosed herein may be represented via simulations using computer aided design and/or testing tools. The simulation of the charging circuitry, control circuitry and/or monitor circuitry, and/or techniques implemented thereby, may be implemented by a computer system wherein characteristics and operations of such circuitry, and techniques implemented thereby, are imitated, replicated and/or predicted via a computer system. The present inventions are also directed to such simulations of the inventive charging circuitry, control circuitry and/or monitor circuitry, and/or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" means that a particular feature, structure, or characteristic described in connection with the embodiment can be included in one some or all of the embodiments of the present inventions. The usages or appearances of the phrase "in one embodiment" or "in another embodiment" in the specification are not referring to the same embodiment, nor are separate or alternative embodiments necessarily mutually exclusive of one or more other embodiments. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, unless explicitly stated otherwise, each numerical value and range described and/or illustrated herein should be interpreted as being approximate as if the word "about" or "approximately" preceded the value of the value or range.

In the claims, the term "determine" and other forms (i.e., determining, determined and the like) means, among other things, calculate, assesses, determine and/or estimate and other forms thereof. Further, the term "battery" means an individual cell (which stores energy) and/or a plurality of cells arranged electrically in a series and/or parallel configuration. The term "substrate", in the claims, means one substrate, at least one substrate and one or more substrates. The term "out-of-specification", in the claims, means the temperature data is greater than a predetermined upper limit, less than a predetermined lower limit and/or outside a predetermined range. The term "within-specification" and "in-specification", collectively in the claims as "in-specification", means the temperature data is not "out-of-specification".

In addition, the terms "first," "second," and the like, herein do not denote any order, quantity, or importance, but rather are used to distinguish one element from another. Moreover, the terms "a" and "an" herein do not denote a limitation of quantity, but rather denote the presence of at least one of the referenced item. Further, the term "data" may mean, among other things, a current or voltage signal(s) whether in analog or a digital form (which may be a single bit (or the like) or multiple bits (or the like)).

The term "current-voltage source" in the claims is an abbreviation of first current source and/or voltage source described and/or illustrated herein. The term "current-voltage signal" in the claims is an abbreviation of current and/or voltage signal described and/or illustrated herein.

As used in the claims, the terms "comprises," "comprising," "includes," "including," "have," and "having" or any other variation thereof, are intended to cover a non-exclusive inclusion, such that a process, method, article, or apparatus that comprises a list of elements does not include only those elements but may include other elements not expressly listed or inherent to such process, method, article, or apparatus.

Further, the statement that one or more circuits, circuitry, nodes and/or components are "coupled" means that the circuits, circuitry, nodes and/or components are joined and/or operate (for example, physically or electrically) together either directly or indirectly, i.e., through one or more intermediate circuits, circuitry, nodes and/or components, so long as a link occurs; "directly coupled" means that two elements are directly joined, in contact and/or operate with each other.

What is claimed is:

1. A system to recharge a battery during a charging operation, the battery is disposed in a portable electronic device having a housing, the system comprising:
    charging circuitry to (i) generate a battery charge signal using a first charge signal and a second charge signal and (ii) apply the battery charge signal to the battery to charge the battery, the charging circuitry including:
        a first charge circuit to generate the first charge signal, the first charge circuit including:
            a first current-voltage source to generate a first signal, and
            a first inductor-capacitor circuit, associated with and coupled to the first current-voltage source, to generate a first DC current-voltage signal using the first signal;
        a second charge circuit, spaced apart from the first charge circuit, to generate the second charge signal, the second charge circuit including:
            a second current-voltage source to generate a second signal, and
            a second inductor-capacitor circuit, associated with and coupled to the second current-voltage source, to generate a second DC current-voltage signal using the second signal;
        a first temperature sensor configured to generate first temperature data during the charging operation;
        control circuitry electrically coupled to the first and/or second charge circuits and configured to:
            determine whether the first temperature data is out-of-specification,
            generate one or more control signals in response to the first temperature data being out-of-specification, and
            output the one or more control signals to control the operation of the charging circuitry; and
    wherein the battery, the first and second inductor-capacitor circuits, and the first temperature sensor are disposed in the housing of the portable electronic device.

2. The system of claim 1 wherein the first inductor-capacitor circuit and the second inductor-capacitor circuit are fixed to a common substrate and spaced apart by a first distance.

3. The system of claim 2 wherein the first current-voltage source and the second current-voltage source are disposed in the housing of the portable electronic device.

4. The system of claim 3 wherein the first current-voltage source and the second current-voltage source are fixed to a common substrate.

5. The system of claim 4 wherein the first current-voltage source and the second current-voltage source are disposed in a common integrated circuit.

6. The system of claim 1 wherein (i) the system further includes a node, electrically coupled between the first and second inductor-capacitor circuits and the battery, to sum the first and second DC current-voltage signals to generate a summed DC current-voltage signal, wherein the summed DC current-voltage signal is or is used to generate the battery charge signal.

7. The system of claim 1 wherein (i) the system further includes a node, electrically coupled to the first and second inductor-capacitor circuits, to sum the first and second DC current-voltage signals to generate a summed DC current-voltage signal and (ii) one or more switches, wherein each of the one or more switches is disposed between the battery and the first charge circuit or the second charge circuit.

8. The system of claim 7 wherein the one or more switches is/are fixed to the common substrate and generate a plurality of pulses using the summed DC current-voltage signal, and wherein the battery charge signal includes the plurality of pulses.

9. The system of claim 1 wherein the first and second current-voltage sources are programmable and responsive to the one or more control signals from the control circuitry.

10. The system of claim 1 further including a second temperature sensor adapted to generate second temperature data which is representative of the temperature of the housing, and
    wherein the control circuitry is further configured to: (i) determine whether the second temperature data is out-of-specification, and (ii) generate one or more control signals in response to the second temperature data being out-of-specification to adjust the first and/or second DC current-voltage signals.

11. The system of claim 1 further including a second temperature sensor adapted to generate second temperature data which is representative of the temperature of the first or second charge circuitry, and
    wherein the control circuitry is further configured to: (i) determine whether the second temperature data is out-of-specification, and (ii) generate one or more control signals in response to the second temperature data being out-of-specification to adjust the first and/or second DC current-voltage signals.

12. A method to adaptively charge a battery during a charging operation using charging circuitry, wherein (i) the battery is disposed in a portable electronic device having a housing and (ii) the charging circuitry includes a first charge circuit and a second charge circuit, wherein the first and second charge circuits are spaced apart, the method comprising:
    generating a first adjustable charge signal using the first charge circuit; the first charge circuit including: a first current-voltage source to generate a first signal, and a first inductor-capacitor circuit, associated with and coupled to the first current-voltage source, to generate the first adjustable charge signal using the first signal;
    generating a second adjustable charge signal using the second charge circuit;
    summing the first and second adjustable charge signals to provide a summed charge signal;
    generating a battery charge signal using the summed charge signal;
    applying the battery charge signal to the battery to recharge the battery;

generating first temperature data which is representative of the temperature of the first charge circuit, the second charge circuit, the battery and/or the housing of the mobile device;

determining whether the first temperature data is out-of specification during the charging operation; and in response to the first temperature data being out-of specification, generating one or more control signals to adjust the first adjustable charge signal and/or second adjustable charge signal using the first temperature data.

13. The method of claim 12 wherein generating the battery charge signal using the summed charge signal further includes generating a plurality of pulses using the summed charge signal, and wherein the battery charge signal includes the plurality of pulses.

14. The method of claim 12 wherein generating first temperature data includes generating first temperature data which is representative of the temperature of the first charge circuit and/or the housing of the mobile device.

15. The method of claim 12 wherein only a portion of each of the first and second charge circuits are spaced apart.

16. A system to recharge a battery during a charging operation, the battery is disposed in a portable electronic device having a housing, the system comprising:

charging circuitry to (i) generate a battery charge signal using first and second DC current-voltage signals and (ii) apply the battery charge signal to the battery to charge the battery during a charging operation, the charging circuitry includes:

a first current-voltage source to generate a first signal, a second current-voltage source to generate a second signal, a first inductor-capacitor circuit, associated with and electrically coupled to the first current-voltage source, to generate the first DC current-voltage signal using the first signal, and a second inductor-capacitor circuit, associated with and electrically coupled to the second current-voltage source, to generate the second DC current-voltage signal using the second signal, wherein the second inductor-capacitor circuit is spaced apart from the first inductor-capacitor circuit;

a first temperature sensor to generate first temperature data during the charging operation;

control circuitry electrically coupled to the first and second current-voltage sources and configured to:

determine whether the first temperature data is out-of-specification, generate one or more control signals to adjust the programmable battery charge signal in response to the first temperature data being out-of-specification, and output the one or more control signals to control the operation of the charging circuitry; and wherein the battery, the first and second current-voltage sources, first and second inductor-capacitor circuits, and the first temperature sensor are disposed in the housing of the portable electronic device.

17. The system of claim 16 wherein:
the first and second current-voltage sources are disposed in the housing of the portable electronic device, and
the first and second inductor-capacitor circuits and the first and second current-voltage sources are fixed to a common substrate.

18. The system of claim 16 wherein the first current-voltage source and the second current-voltage source are disposed in a common integrated circuit which is disposed in the housing of the portable electronic device.

19. The system of claim 16 wherein the system further includes a node, electrically coupled between (a) the first and second inductor-capacitor circuits and (b) the battery, to sum the first and second DC current-voltage signals to generate a summed DC current-voltage signal, wherein the summed DC current-voltage signal is or is used to generate the battery charge signal.

20. The system of claim 16 wherein the system further includes (i) a node, electrically coupled to the first and second inductor-capacitor circuits, to sum the first and second DC current-voltage signals to generate a summed DC current-voltage signal and (ii) one or more switches, disposed between the node and the battery, to generate a plurality of pulses using the summed DC current-voltage signal, and wherein the battery charge signal includes the plurality of pulses.

21. The system of claim 16 wherein the first and second current-voltage sources are programmable and responsive to the one or more control signals from the control circuitry.

22. The system of claim 16 further including a second temperature sensor adapted to generate second temperature data which is representative of the temperature of the housing, and wherein the control circuitry is further configured to: (i) determine whether the second temperature data is out-of-specification, and (ii) generate one or more control signals in response to the second temperature data being out-of-specification to adjust the first and/or second DC current-voltage signal.

23. The system of claim 16 further including a second temperature sensor adapted to generate second temperature data which is representative of the temperature of the first current-voltage source and/or the first inductor-capacitor circuit, and wherein the control circuitry is further configured to: (i) determine whether the second temperature data is out-of-specification, and (ii) generate one or more control signals in response to the second temperature data being out-of-specification to adjust the first and/or second DC current-voltage signal.

* * * * *